(12) United States Patent
Obata

(10) Patent No.: US 11,036,312 B2
(45) Date of Patent: Jun. 15, 2021

(54) POSITION POINTER AND REPLACABLE ELECTRONIC INK CARTRIDGE INCLUDING A PRESSURE SENSOR

(71) Applicant: Wacom Co., Ltd., Saitama (JP)

(72) Inventor: Masayuki Obata, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 596 days.

(21) Appl. No.: 13/922,050

(22) Filed: Jun. 19, 2013

(65) Prior Publication Data

US 2014/0085270 A1 Mar. 27, 2014

(30) Foreign Application Priority Data

Sep. 26, 2012 (JP) .............................. JP2012-212777

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01)

(58) Field of Classification Search
CPC .............................. G06F 3/03545; G06F 3/046
See application file for complete search history.

(56) References Cited

U.S. PATENT DOCUMENTS 5,206,785 A * 4/1993 Hukashima .......... G01D 5/2417
361/283.2
5,565,632 A * 10/1996 Ogawa ................ G06F 3/03545
73/862.041
5,576,502 A 11/1996 Fukushima et al.
(Continued)

FOREIGN PATENT DOCUMENTS

EP 2 708 993 A2 3/2014
JP 04096212 A 3/1992
(Continued)

OTHER PUBLICATIONS

Japanese Office Action, dated Jun. 22, 2016, for corresponding JP Application No. 2012-212777, 4 pages.
(Continued)

*Primary Examiner* — William Boddie
*Assistant Examiner* — Andrew B Schnirel
(74) *Attorney, Agent, or Firm* — Seed IP Law Group LLP

(57) ABSTRACT

An electronic ink cartridge is provided, which improves the mass productivity of a position pointer and which ensures reliability of a characteristic of a pressure sensor to detect writing pressure. The electronic ink cartridge includes a core member provided so as to extend outwardly from a distal end portion of a tubular member in a direction of a center axis of the tubular member, a pressure sensor accommodated in a hollow portion of the tubular member to sense pressure applied to the core member, a connection member provided fixedly on the tubular member to interpose the pressure sensor between the connection member and the core member along the direction of the center axis of the tubular member, and a connection terminal, which is formed on a proximal end face of the connection member and from which an electric characteristic corresponding to the pressure sensed by the pressure sensor is extracted.

11 Claims, 18 Drawing Sheets

(56) References Cited

U.S. PATENT DOCUMENTS

| | | | |
|---|---|---|---|
| 5,633,471 A * | 5/1997 | Fukushima | G01L 1/20 178/19.04 |
| 5,774,602 A * | 6/1998 | Taguchi | G06F 3/03545 382/188 |
| 6,727,439 B2 | 4/2004 | Chao et al. | |
| 7,926,154 B2 | 4/2011 | Hong et al. | |
| 2002/0011989 A1* | 1/2002 | Ericson | G06F 3/03545 345/158 |
| 2004/0233178 A1* | 11/2004 | Silk | G06F 1/3203 345/179 |
| 2004/0246211 A1* | 12/2004 | Perkins | B43K 21/033 345/79 |
| 2007/0195068 A1 | 8/2007 | Kable et al. | |
| 2008/0238885 A1* | 10/2008 | Zachut | G06F 3/03545 345/174 |
| 2009/0076770 A1* | 3/2009 | Fukushima | G06F 3/046 702/150 |
| 2009/0084614 A1* | 4/2009 | Fukushima | G06F 3/046 178/19.03 |
| 2009/0126174 A1 | 5/2009 | Hong et al. | |
| 2011/0090146 A1 | 4/2011 | Katsurahira | |
| 2013/0193532 A1 | 8/2013 | Horie et al. | |
| 2013/0329335 A1 | 12/2013 | Obata | |
| 2014/0009863 A1 | 1/2014 | Obata | |

FOREIGN PATENT DOCUMENTS

| | | |
|---|---|---|
| JP | 06-33226 U | 4/1994 |
| JP | 08-227336 A | 9/1996 |
| JP | 08-335132 A | 12/1996 |
| JP | 10-228345 A | 8/1998 |
| JP | 2002244806 A | 8/2002 |
| JP | 2006-163652 A | 6/2006 |
| JP | 2009124155 A | 6/2009 |
| JP | 2012-156923 A | 8/2012 |
| JP | 2013156066 A | 8/2013 |
| JP | 2013254816 A | 12/2013 |
| JP | 2014013862 A | 1/2014 |

OTHER PUBLICATIONS

Extended European Search Report, dated Nov. 15, 2016, for corresponding EP Application No. 13182715.6-1972 / 2713243, 9 pages.

Indian Office Action, dated Oct. 25, 2018, for Indian Application No. 2030/DEL/2013, 7 pages.

* cited by examiner

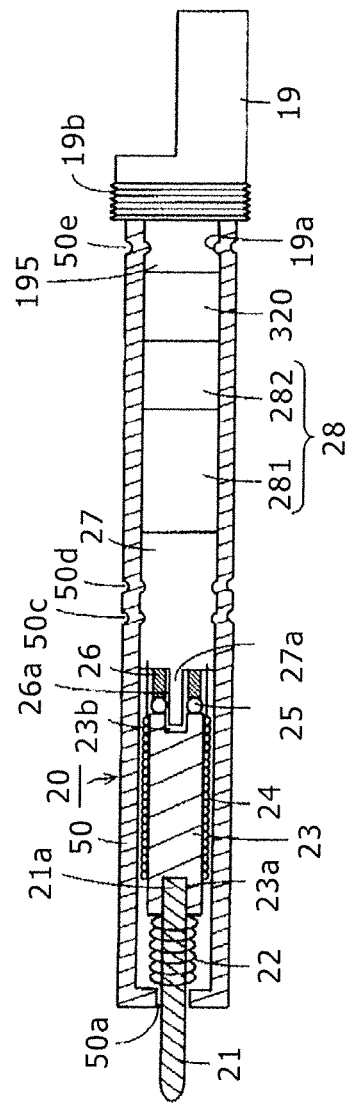
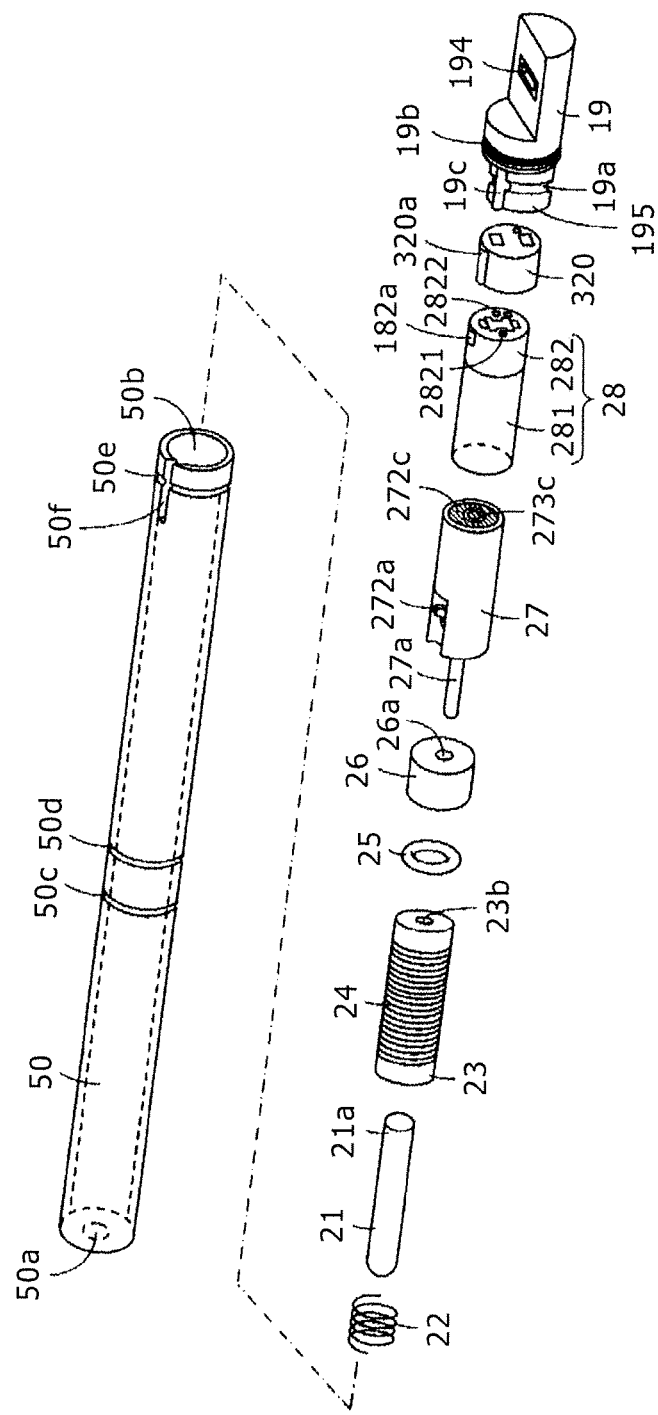
FIG. 9A
FIG. 9B

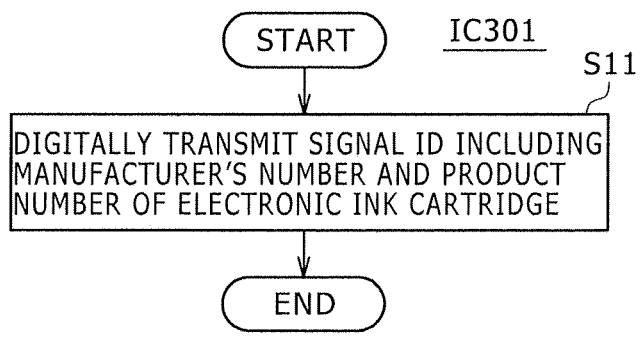
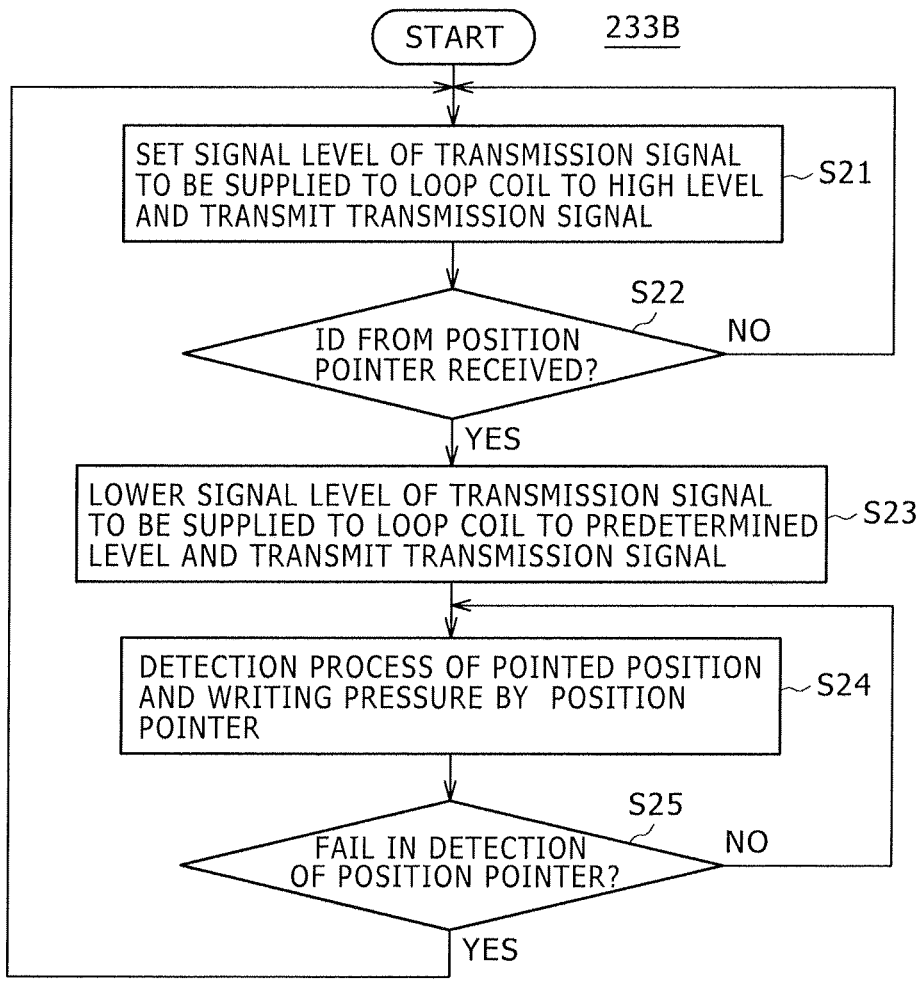

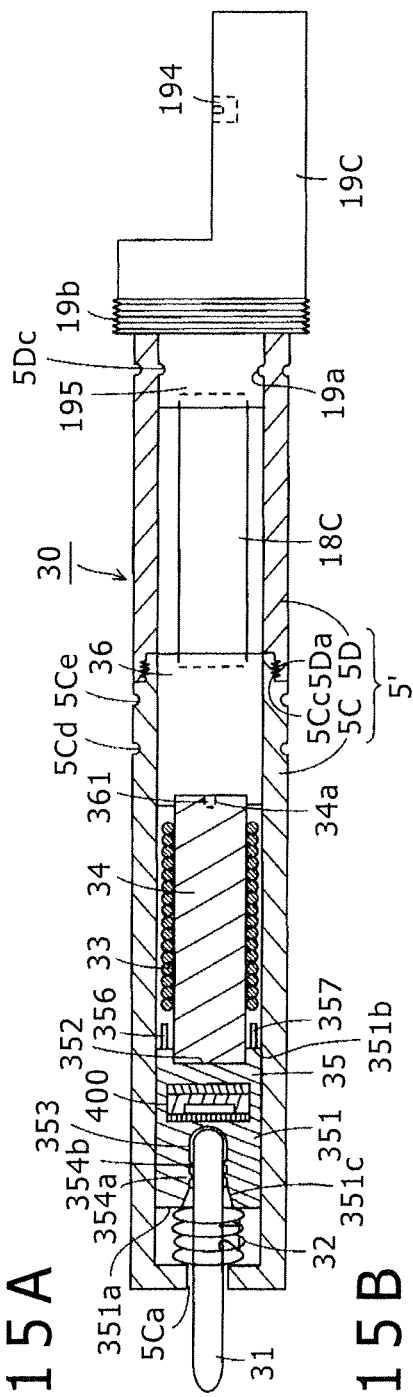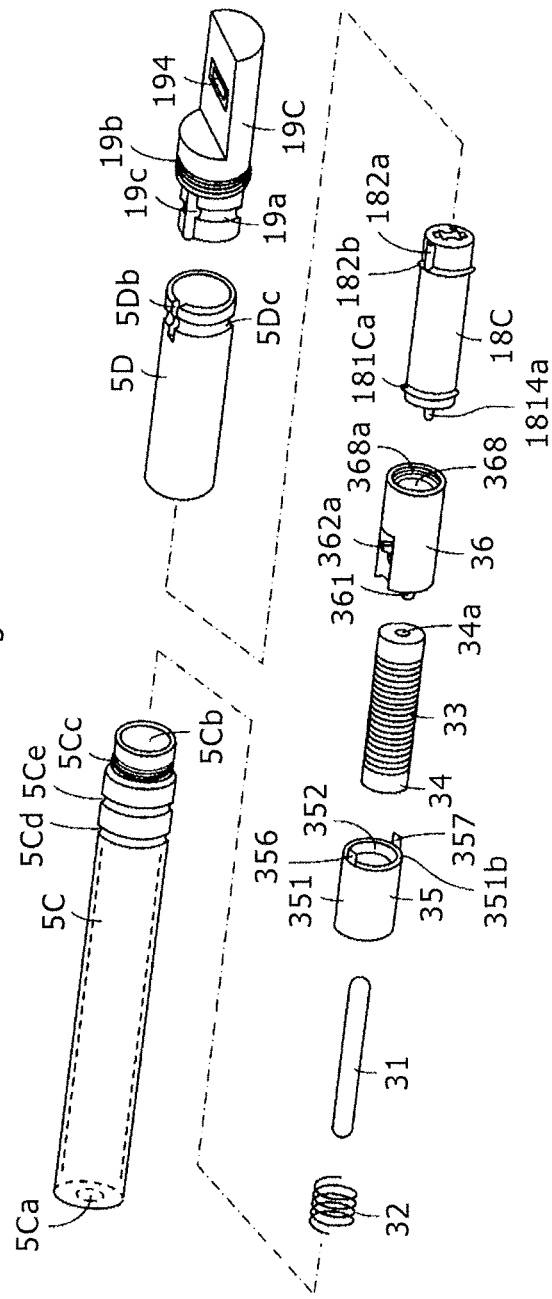
FIG.15A
FIG.15B

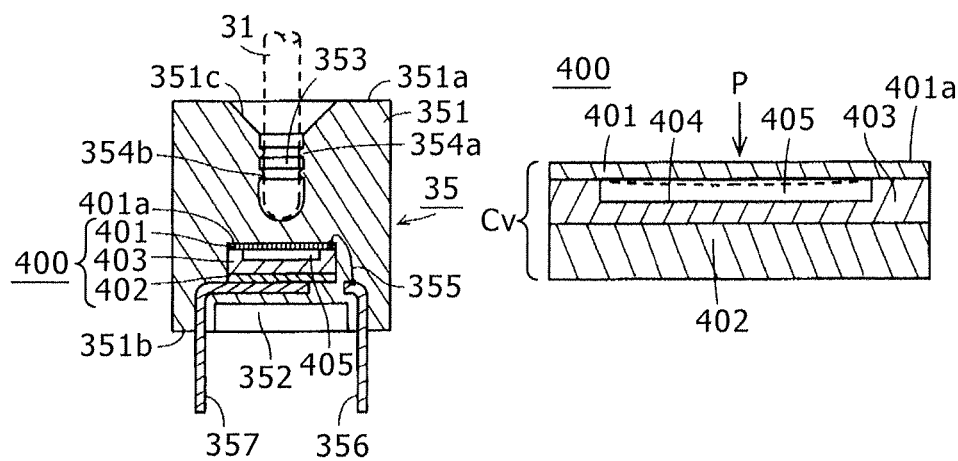
FIG.16A FIG.16B
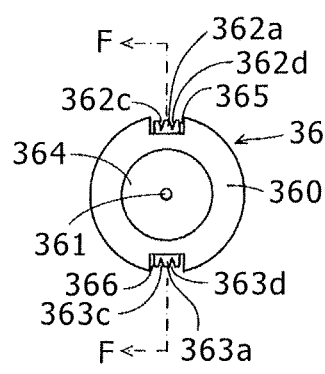
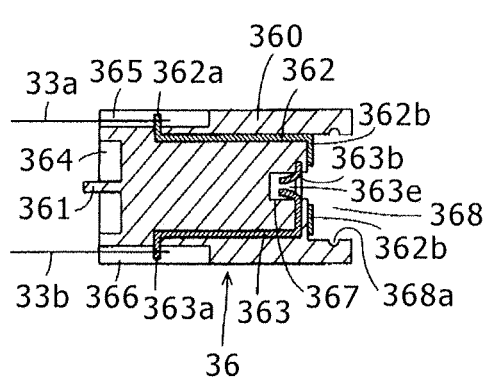
FIG.17A FIG.17B
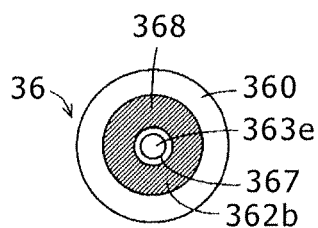
FIG.17C

POSITION POINTER AND REPLACABLE ELECTRONIC INK CARTRIDGE INCLUDING A PRESSURE SENSOR

CROSS-REFERENCE TO RELATED APPLICATION

The present application claims priority under 35 U.S.C. 119(a) to Japanese Patent Application No. 2012-212777, filed Sep. 26, 2012, which is incorporated by reference herein.

BACKGROUND

Technical Field

The present invention relates to a position pointer in a shape of a pen for use with a position detection apparatus, and particularly to an electronic ink cartridge accommodated in a housing of the position pointer.

Description of the Related Art

In recent years, a position inputting apparatus is used as an inputting device for a portable apparatus, a tablet type PC (personal computer) and so forth. The position inputting apparatus is configured of a position pointer, in the shape of a pen for example, and a position detection apparatus having an inputting face on which a pointing operation or inputting of symbols, figures and so forth using the position pointer is performed. As the position inputting apparatus of the type described, apparatus of various detection types such as an electromagnetic induction type and a capacitive coupling type have been known.

A recent position inputting apparatus includes a pressure sensor provided in a pen-shaped position pointer for sensing pressure applied to a core member serving as a pen tip so that the position pointer has a wring pressure detection function. Based on the writing pressure detection function, it can be detected whether or not a user places the position pointer into contact with the inputting face of the position detection apparatus ("pen down" operation) or with what writing pressure the user operates the position pointer on the inputting face after the pen down operation.

As the pressure sensor provided on the position pointer, pressure sensors of various sensing types are available including those of a type wherein pressure applied to the core member is sensed as a variation of the inductance, and those of another type wherein pressure applied to the core member is sensed as a variation of the capacitance.

For example, Patent Document 1 (Japanese Patent Laid-Open No. 2002-244806) discloses a position pointer which includes a pressure sensor which varies the inductance of a coil forming a resonance circuit. Pressure applied to a core member is transmitted as a variation of a resonance frequency (or a phase) of a resonance circuit to a position detection apparatus so that the wring pressure can be detected by the position detection apparatus.

FIG. 22 is a sectional view of a conventional position pointer 100 which detects the writing pressure from a variation of the inductance. As depicted in FIG. 22, the position pointer 100 is configured such that a ferrite core 104 on which a coil 105 is wound and a ferrite chip 102 are opposed to each other with an O-snap ring 103 interposed therebetween such that the ferrite chip 102 moves toward the ferrite core 104 when pressing pressure (writing pressure) is applied to a core member 101. The O-snap ring 103 used here is a ring-shaped elastic member made of an elastic material such as synthetic resin or synthetic rubber and having a cross section of a shape of the alphabetical letter "O."

In a case 111 of the position pointer 100, a printed board 114, a board holder 113, connecting wires 116 and a buffer member 117 are accommodated in addition to the parts described above. The printed board 114 has a plurality of resonant capacitors 115a to 115h disposed thereon for setting a resonance frequency of a resonance circuit when no pressure is applied to the core member to a desire value. The board holder 113 holds the printed board 114. The connecting wires 116 connect the coil 105 to the resonant capacitors 115a to 115h of the printed board 114 to configure a resonance circuit. The members accommodated in the case 111 are fixed at respective positions by a cap 112.

If the ferrite chip 102, against which the core member 101 abuts, moves toward the ferrite core 104 in response to pressing force applied to the core member 101, then the inductance of the coil 105 wound on the ferrite core 104 varies in response to the movement of the ferrite core 104. Thereupon, the phase (resonance frequency) of an electromagnetic induction signal transmitted from the coil 105 of the resonance circuit varies. The position detection apparatus receives the variation of the phase (resonance frequency) of the electromagnetic induction signal from the position pointer by a loop coil, to thereby detect the writing pressure applied to the core member of the position pointer.

Another type of position pointer is known which includes a pressure sensor, wherein the capacitance of a capacitor forming a resonance circuit is varied. In the position pointer, pressure applied to a core member is transmitted as a variation of the resonance frequency (or the phase) of the resonance circuit to a position detection apparatus.

For example, Patent Document 2 (Japanese Patent Laid-Open No. Hei 4-96212) discloses a position pointer which uses, as a capacitor which configures a resonance circuit, a variable capacitor the capacitance of which varies in response to pressure applied to a core member. In the position pointer, a variation of the capacitance of the variable capacitor is transmitted as a variation of the resonance frequency (or the phase) of the resonance circuit to a position detection apparatus so that the writing pressure can be detected by the position detection apparatus.

The variable capacitor described in Patent Document 2 includes two mechanical structural parts accommodated in an elongated tubular housing—a first conductive member attached to a first end face of cylindrical dielectric member, and a second conductive member disposed on a second end face side of the dielectric member opposite from the first end face and having flexibility such that the second conductive member can be displaced elastically. An opposing face of the second conductive member to the dielectric member is shaped so as to swell (bulge) toward the dielectric member side, for example, in a dome shape.

Further, the variable capacitor disclosed in Patent Document 2 includes spacer means for spacing the second conductive member and the second end face of the dielectric member from each other by a small distance except a portion thereof, and a part for applying relative pressure (or displacement) between the second conductive member and the dielectric member. The part which applies the relative pressure or displacement is coupled to the core member of the position pointer of a pen shape. If writing pressure is applied to the position pointer from the first end portion of the housing, then the flexible second conductive member is displaced toward the dielectric member side by force applied in an axial direction to the core member. Consequently, the second conductive member is biased so as to contact the second end face of the dielectric member. Then, the dome-shaped swelling end face of the flexible second conductive member contacts the second end face of the dielectric member over a contacting area corresponding to the pressing force. Therefore, the capacitance formed between the second conductive member and the first conductive member, with the dielectric member interposed therebetween, varies.

PRIOR ART DOCUMENTS

Patent Documents

Patent Document 1
Japanese Patent Laid-Open No. 2002-244806
Patent Document 2
Japanese Patent Laid-Open No. Hei 4-96212

BRIEF SUMMARY

Problems to be Solved by the Invention

As described above, in the position pointer disclosed in Patent Document 1, such component parts as the core member 101, ferrite chip 102, O-snap ring 103, ferrite core 104 on which the coil 105 is wound, printed board 114, and board holder 113 which holds the printed board 114 are successively accommodated directly into the space on the inner side of the tubular housing 111 and assembled. Similarly, also in the position pointer disclosed in Patent Document 2, such component parts as a variable capacitor are successively accommodated directly into a space on the inner side of a tubular housing and assembled in addition to such component parts as a core member, a ferrite core on which a coil is wound, a printed board and a board holder which holds the printed board.

In this manner, in order to construct a position pointer, conventionally the parts described above must be successively assembled in a housing in the direction of a center axis, and there is a problem that the position pointers are not suitable for mass production.

Further, whichever one of a pressure sensor of the type wherein pressure applied to the core member is sensed as a variation of the inductance and another pressure sensor of the type wherein pressure applied to the core member is sensed as a variation of the capacitance is used, it is necessary to adjust the variation characteristic of the inductance or the capacitance with respect to applied pressure so that a detection characteristic or a writing pressure characteristic of a desired "pen down" can be obtained. However, it is conventionally necessary to adjust such characteristics after component parts are assembled in the housing of the position pointer, which is very cumbersome.

Besides, if the component parts accommodated in the housing are subject to positional displacement in the housing, then this gives rise to a variation of a circuit constant, resulting in the problem that there is the possibility that normal use of the position pointer may be disabled. For example, in the case of Patent Document 1, if the center axes of the ferrite chip 102 and the ferrite core 104 are displaced from each other or the like, then a circuit constant varies. Consequently, there is the possibility that the variation of the inductance by approaching movement of the ferrite chip 102 may be displaced (shifted) from a desired variation. Similarly, in the case of Patent Document 2, if the center axes of the flexible second conductive member and the dielectric member are displaced from each other or the like, then a circuit constant varies. Consequently, there is the possibility that the variation of the capacitance with respect to the pressure applied to the core member may be displaced from a desired variation.

Therefore, a possible solution may include a method of assembling a group of parts at a portion which is elastically biased, such as an O-snap ring and a conductive member, as a module in advance. However, in recent years, it is demanded for a position pointer of a shape of a pen to have a narrower (thinner) shape in view of miniaturization of a portable electronic apparatus such as a PDA or a highly-functional portable telephone terminal (smartphone). Thus, if the part group at the portion which is elastically biased is assembled in advance as a modularized part, then it becomes difficult to miniaturize the modularized part. Therefore, there is a problem that this provides a difficulty in thinning the position pointer of a shape of a pen.

Further, when a predetermined part group is assembled to produce a modularized part, time is required for the assembly. Accordingly, the worker must first take time to assemble the modularized part, then to combine the assembled modularized part with other parts into the case 111. Therefore, another problem is that the productivity is low.

Taking the foregoing into consideration, an aspect of the present invention solves the problems described above with a position pointer which includes a pressure sensor that senses pressure applied to a core member.

Means for Solving the Problems

In order to solve the subject described above, the present invention provides an electronic ink cartridge including:
a tubular member including a hollow portion;
a core member disposed so as to extend outwardly from a distal end portion of the tubular member in a direction of a center axis of the tubular member;
a pressure sensor, which is accommodated in the hollow portion of the tubular member and which senses pressure applied to the core member;
a connection member, which is disposed to interpose the pressure sensor between the connection member and the core member along the direction of the center axis of the tubular member and which locks the pressure sensor to the tubular member in the direction of the central axis, wherein the pressure sensor is coupled to the connection member in the direction of the center axis of the tubular member to sense the pressure applied to the core member; and
a connection terminal, which is formed on a proximal end face of the connection member and from which an electric characteristic corresponding to the pressure sensed by the pressure sensor is extracted.

In the present specification, the term "electronic ink cartridge" is used to refer to a structure that accommodates at least the core member and the pressure sensor, from among the component parts of the position pointer, in the hollow portion of its tubular member, and that is to be accommodated in a housing of the position pointer. The electronic ink cartridge, wherein all of principal components of the position pointer are accommodated in the hollow portion of the tubular member, allows for assembly of the position pointer only by accommodating the electronic ink cartridge into the housing of the position pointer similarly to an ink cartridge of a writing-tool ballpoint pen. Therefore, in the present specification, the tubular member that accommodates therein parts or principal component parts of the position pointer of the electromagnetic induction type is referred to as electronic ink cartridge.

In the electronic ink cartridge according to the present invention which has such a configuration as described above, the pressure sensor is accommodated in the hollow portion of the tubular member, and the connection member is fixed to the tubular member on the second end side of the tubular member in the direction of the center axis. Accordingly, the pressure sensor disposed closer to the core member side than the connection member in the direction of the center axis of the tubular member is directly or indirectly coupled to the connection member in the direction of the center axis of the tubular member. Further, the pressure sensor is locked in the tubular member in the direction of the center axis of the tubular member so that it is acted upon by pressure applied to the core member from the first end portion side of the tubular member. Consequently, the pressure sensor accommodated in the tubular member senses the pressure applied to the core member, which is provided so as to extend outwardly from the first end portion side of the tubular member.

Accordingly, with the electronic ink cartridge according to the present invention, the pressure sensor is positioned by being accommodated in the tubular member, and when the electronic ink cartridge is accommodated in the housing of the position pointer, a stable and highly reliable electric characteristic can be maintained.

Further, in the electronic ink cartridge according to the present invention, a connection terminal, from which an electric characteristic corresponding to pressure applied to the core member and sensed by the pressure sensor can be extracted, is formed on the end face of the connection member on the opening side of the tubular member. This electric characteristic may be not only an electric characteristic of the pressure sensor itself, such as a pressure versus inductance characteristic where the pressure sensor is of the type which senses pressure applied to the core member as a variation of the inductance, or a pressure versus capacitance characteristic where the pressure sensor is of the type which senses pressure applied to the core member as a variation of the capacitance, but also may be other electric characteristics. For example, where the pressure sensor is configured to sense inductance or capacitance which forms a resonance circuit, a resonance frequency versus pressure characteristic of the resonance circuit can be extracted to the connection terminal of the connection member.

Further, other electronic circuit connected to the pressure sensor, such as an IC or other components of a resonance circuit that includes the pressure sensor as a component thereof, can be connected readily to the connection terminal provided on the end face of the connection member. In this instance, since it is also easy to connect the components of the IC or the resonance circuit in a juxtaposed relationship in the direction of the center axis of the tubular member, this further contributes to narrowing (thinning) of the position pointer.

Further, by incorporating only the electronic ink cartridge according to the present invention or the electronic ink cartridge and peripheral parts necessary for the electronic ink cartridge into the housing of a shape of a pen, the position pointer according to the present invention can be configured. Accordingly, mass production of the position pointer is facilitated.

Effect of the Invention

By using the electronic ink cartridge according to the present invention, since fabrication of the position pointer is facilitated, the mass productivity can be improved and the reliability of a characteristic of the pressure sensor can be assured. Further, by using the electronic ink cartridge according to the present invention, it is also possible to achieve thinning of the position pointer.

BRIEF DESCRIPTION OF THE DRAWINGS

FIGS. 9A and 9B are views depicting an electronic ink cartridge according to a second embodiment of the present invention.

FIG. 13 is a view depicting a flow chart illustrating processing operation of part of the position pointer of the second embodiment according to the present invention.

FIG. 14 is a view depicting a flow chart illustrating processing operation of part of the position detection apparatus which is used together with the position pointer of the second embodiment according to the present invention.

FIGS. 15A and 15B are views depicting an electronic ink cartridge according to a third embodiment of the present invention.

FIGS. 16A and 16B are views depicting an example of components of the electronic ink cartridge according to the third embodiment.

FIGS. 17A to 17C are views depicting an example of components of the electronic ink cartridge according to the third embodiment.

DETAILED DESCRIPTION

First Embodiment

Figure 22:
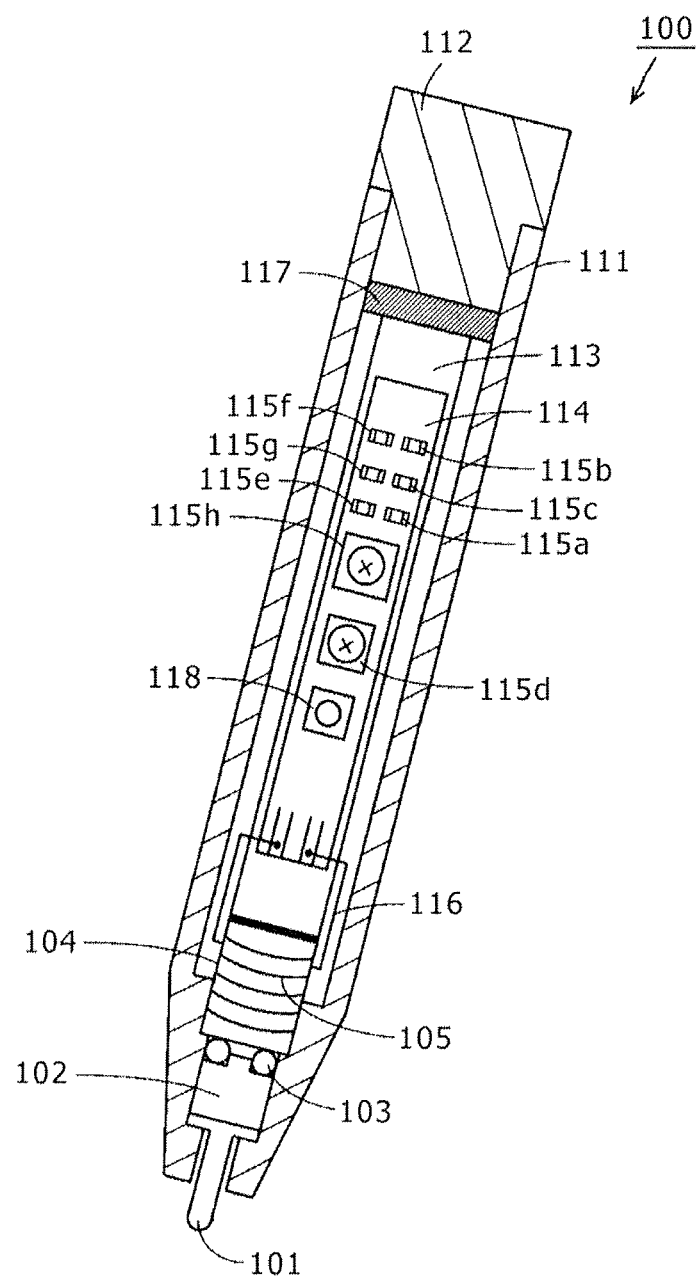
FIG. 22 is a view depicting an example of a configuration of a conventional position pointer of the electromagnetic induction type.

A first embodiment is directed to a position pointer of the electromagnetic induction type, to which an electronic ink cartridge according to the present invention is applied. As an example of a pressure sensor, the inductance which configures a resonance circuit provided in a position pointer of the electromagnetic induction type is of the type which varies in response to pressure applied to a core member. In the present first embodiment, the pressure sensor which varies the inductance which configures a resonance circuit has a configuration similar to that of the conventional example described hereinabove with reference to FIG. 22.

FIGS. 1A to 8 are views depicting an electronic ink cartridge according to a first embodiment of the present invention and an example of a configuration of a position pointer in which the electronic ink cartridge of the first embodiment is used.

The position pointer of the first embodiment includes a push switch which is operable in a state in which a user grasps a housing of the position pointer and has a configuration which can change the resonance frequency of a resonance circuit by on/off operation of the push switch. It is to be noted that this push switch is provided at a position proximate to a core member on a peripheral portion of the housing and is also called a side switch. It is to be noted that an on/off operation of the push switch is detected in such a manner as hereinafter described by a position detection apparatus. However, the push switch is allocated to various functions such as, for example, a determination operation input on an electronic apparatus such as a personal computer, in which the position detection apparatus is built, or to which the position detection apparatus is externally connected.

Figure 2A:
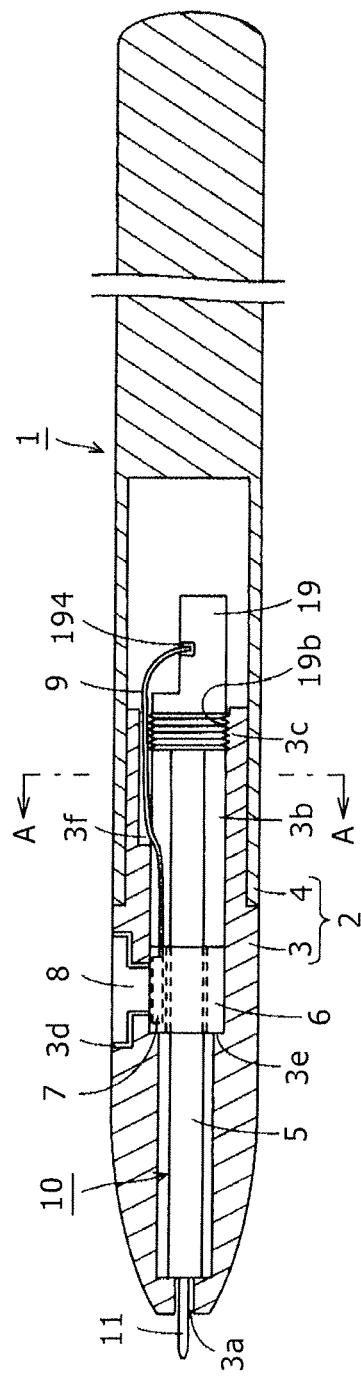
FIGS. 2A to 2C are views depicting a configuration of a position pointer according to an embodiment in which the electronic ink cartridge according to the embodiment is incorporated.

FIG. 2A shows an outline of a general configuration of a position pointer 1 of the present first embodiment. The position pointer 1 has a shape of a pen and includes a cylindrical housing 2, and component parts of the position pointer 1 are accommodated in an internal space of the housing 2. In FIG. 2A, only the housing 2 of the position pointer 1 is depicted in cross-section in order to facilitate understandings of an internal configuration of the housing 2.

The housing 2 of the position pointer 1 of the present first embodiment is made of non magnetic material, for example, resin and configured from a cylindrical lower half 3 having an opening 3a on the pen tip side of the housing 2, and a cylindrical upper half 4 fitted with and coupled to the lower half 3 concentrically.

Figure 1A:
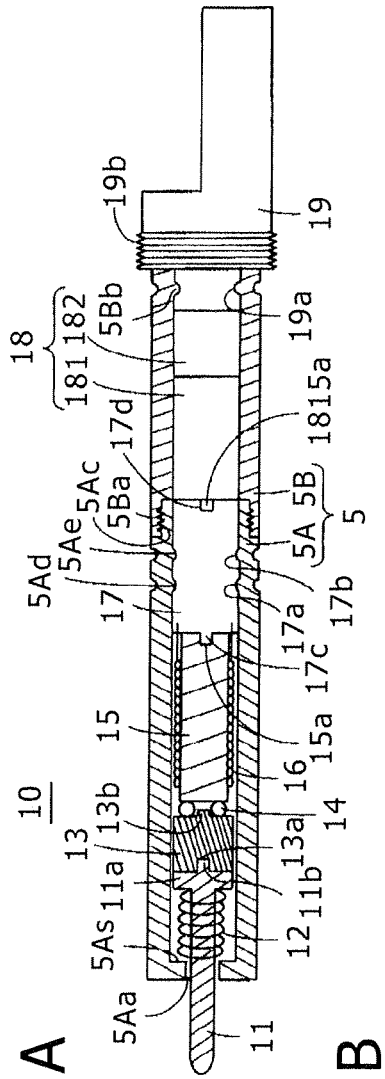
FIGS. 1A and 1B are views depicting an electronic ink cartridge according to a first embodiment of the present invention.

In the inside of the lower half 3, a hollow portion 3b having, for example, a circular sectional shape is provided, and an electronic ink cartridge 10 wherein basic component parts of the position pointer of the electromagnetic induction type are accommodated in a tubular member 5 as depicted in FIG. 1A is disposed in the hollow portion 3b. Further, a through-hole 3d is perforated at a portion of a peripheral side face of the lower half 3, and a pressing element 8 is provided in the through-hole 3d. Consequently, a push switch 7 provided below the pressing element 8 can be depressed by the pressing element 8. Details of an internal configuration of the position pointer 1 are hereinafter described.

Example of the Configuration of the Electronic Ink Cartridge 10

Figure 1B:
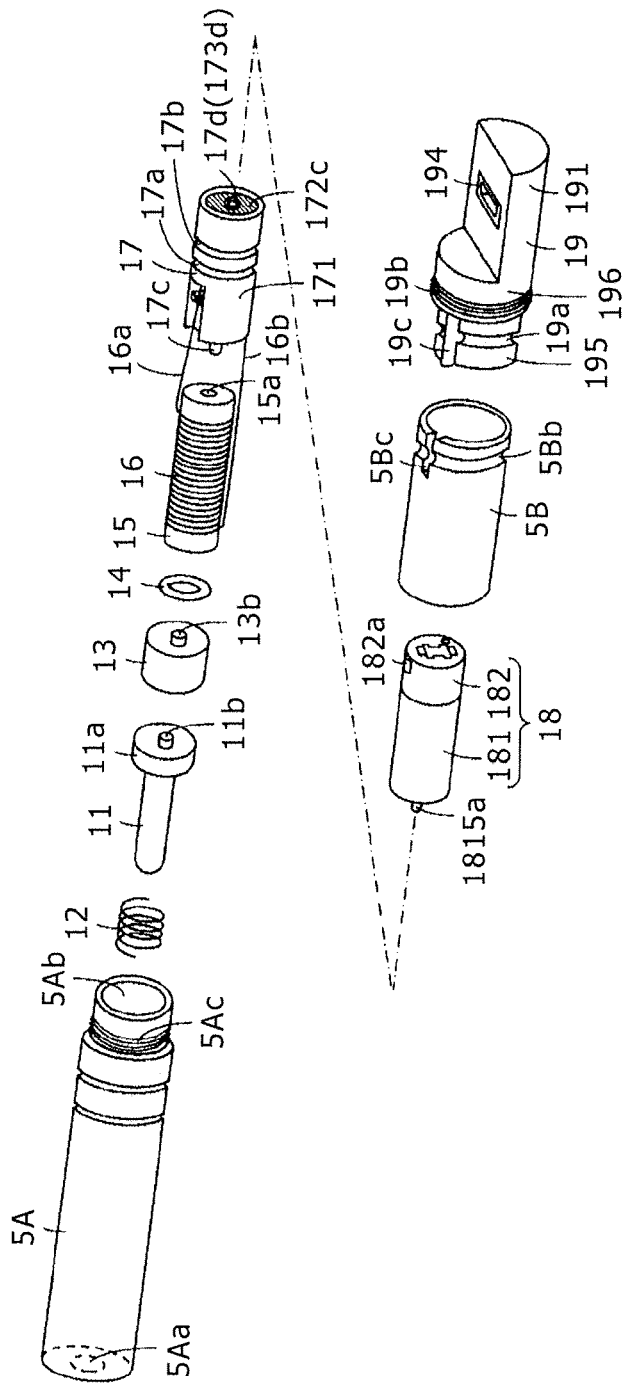
Figure 2C:
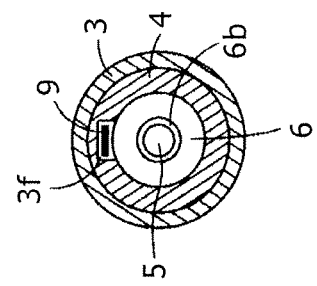
Figure 2B:
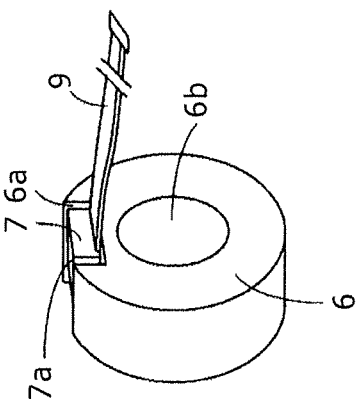

An example of a configuration of the electronic ink cartridge 10 of the present first embodiment is described with reference to FIGS. 1A and 1B, and FIGS. 3A to 6. FIG. 1A is a sectional view depicting an internal configuration of the electronic ink cartridge 10. The electronic ink cartridge 10 of the present example is configured such that basic component parts of the position pointer of the electromagnetic induction type are accommodated in the hollow portion of the tubular member 5. In particular, a core member 11, a coil 16 having variable inductance, and a capacitor circuit 18 including a capacitor which cooperates with the coil 16 to configure a resonance circuit are accommodated in the hollow portion of the tubular member 5. The diameter (inner diameter) of the hollow portion of the tubular member 5 is fixed. Further, in the present example, also the outer diameter of the tubular member 5 is fixed. The tubular member 5 is configured from a nonmagnetic material such as nonmagnetic metal, resin material, glass or ceramics, in the present example, from SUS305 or SUS310S. Further, as shown in FIGS. 2A to 2C, the tubular member 5 is accommodated in a state in which the direction of the center axis thereof coincides with the direction of the center axis of the housing 2 of the position pointer 1.

It is to be noted that, for the convenience of description, some of the internal component parts of the tubular member 5 of the electronic ink cartridge 10 (a connection member 17 and the capacitor circuit 18 hereinafter described) are not depicted in cross-section in FIG. 1A, but a cross-sectional view of them is prepared separately as hereinafter described. Meanwhile, FIG. 1B is an exploded perspective view depicting a general configuration of the electronic ink cartridge 10.

The tubular member 5 in the present first embodiment is configured from a first tubular member 5A and a second tubular member 5B as two separate members separate from each other in the direction of the center axis. In the present example, the first tubular member 5A and the second tubular member 5B have a narrow shape such that the outer diameter thereof is, for example, 2.5 mm and the inner diameter thereof is 1.5 mm to 2 mm.

An opening 5Aa that allows a distal end of the core member 11 to extend outwardly therethrough is provided on a first end side of the first tubular member 5A in the direction of the center axis (axial direction). The diameter of the opening 5Aa is smaller than the inner diameter of the first tubular member 5A, and therefore, a stepped portion 5As is formed on the first end side of the first tubular member 5A in the direction of the center axis. On the other hand, a second end side of the first tubular member 5A in the direction of the center axis is formed to have the entire inner diameter thereof as an opening 5Ab. Meanwhile, the second tubular member 5B has an opening corresponding to the entire inner diameter thereof at each of the opposite end sides thereof in the direction of the center axis.

Further, as depicted in FIG. 1A, on the outer circumference side face of the opening 5Ab of the first tubular member 5A, a threaded portion 5Ac is formed which engages with a threaded portion 5Ba formed on an inner wall face of the opening of the second tubular member 5B on the first end side. Further, on an inner wall face of the second tubular member 5B in the proximity of the opening on the second end side, a ring-shaped protrusion 5Bb which fits with a ring-shaped grooved portion 19a formed on an outer periphery of a cap 19 made of nonmagnetic material, for example, resin, is formed, for example, by constricting the second tubular member 5B at the position.

Further, as shown in FIG. 1B, at a predetermined position of the second tubular member 5B in a circumferential direction of the opening end on the second end side, a cut-out 5Bc for positioning is formed along the direction of the center axis. Further, a protrusion 19c which engages with the cut-out 5Bc of the second tubular member 5B is formed on the cap 19. The cap 19 is locked in the second tubular member 5B by forcing the protrusion 19c into the second tubular member 5B to be inserted into the cut-out 5Bc so that the ring-shaped grooved portion 19a and the ring-shaped protrusion 5Bb are fitted with each other.

Further, as depicted in FIGS. 1A and 1B, a coil spring 12, the core member 11, a ferrite chip 13 as an example of a second magnetic member, an O-snap ring 14, a ferrite core 15 as an example of a first magnetic member on which the coil 16 is wound, and the connection member 17 are accommodated in a juxtaposed relationship in this order as viewed from the opening 5Aa in the first tubular member 5A such that the center axis of the parts may coincide with each other.

The core member 11 in the present embodiment is configured, for example, from resin and has a distal end portion of a diameter extending from the opening 5Aa of the first tubular member 5A and a flange portion 11a. The core member 11 further has a protrusion 11b provided substantially at the center of an upper face of the flange portion 11a. The flange portion 11a has a diameter a little smaller than the inner diameter of the first tubular member 5A so that it can move in the direction of the center axis in the first tubular member 5A.

The ferrite chip 13 has a cylindrical shape of a diameter a little smaller than the inner diameter of the first tubular member 5A so that it can move in the direction of the center axis in the first tubular member 5A. Further, the ferrite chip 13 has, on an end face thereof on the core member 11 side in the direction of the center axis, a recessed portion 13a into which the protrusion 11b formed on the upper face of the flange portion 11a of the core member 11 is fitted. The core member 11 is adhered to the ferrite chip 13 by bonding agent or the like in a state in which the protrusion 11b and the recessed portion 13a fit with each other. Further, a protrusion 13b is formed at the center of an end face of the ferrite chip 13 on the ferrite core 15 side in the direction of the center axis.

The O-snap ring 14 is configured from an elastic member, for example, an elastic rubber which has an outer diameter smaller than the inner diameter of the first tubular member 5A and has an inner diameter greater than the diameter of the protrusion 13b. In this instance, the O-snap ring 14 has a circular cross section having a diameter selected so as to be greater than the height of the protrusion 13b of the ferrite chip 13.

The ferrite core 15 has a cylindrical shape, and the diameter thereof including the wound coil 16 is a little smaller than the inner diameter of the first tubular member 5A. A recessed portion 15a, into which a positioning protrusion 17c at a position of the center axis formed on the connection member 17 is to be fitted, is formed on an end face of the ferrite core 15 on the connection member 17 side in the direction of the center axis.

The connection member 17 mechanically connects the ferrite core 15 and the capacitor circuit 18 to each other and establishes electric connection between the coil 16 wound on the ferrite core 15 and the capacitors of the capacitor circuit 18.

Figure 3A:
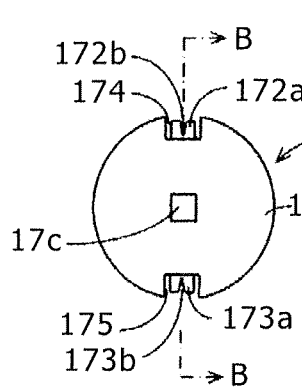
FIGS. 3A to 3C are views depicting an example of components of the electronic ink cartridge according to the first embodiment.
Figure 3B:
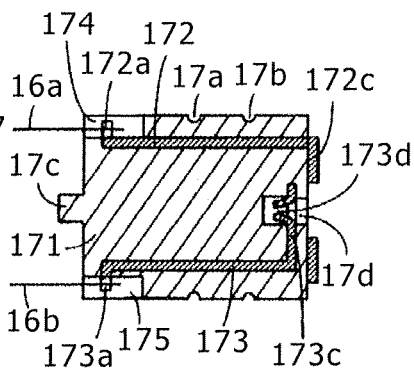
Figure 3C:
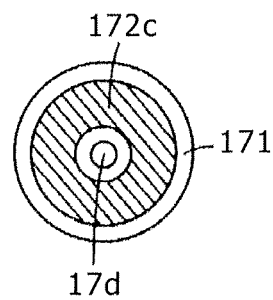

FIGS. 3A to 3C are views depicting an example of a configuration of the connection member 17. FIG. 3A is a view of the connection member 17 as viewed from the side on which the connection member 17 is connected to the ferrite core 15, and FIG. 3B is a sectional view taken along line B-B of FIG. 3A. Further, FIG. 3C is a view of the connection member 17 as viewed from the side on which the connection member 17 is connected to the capacitor circuit 18.

As depicted in FIGS. 3A and 3B, the connection member 17 is formed by insert molding terminal members 172 and 173 formed from conductive material having elasticity for establishing electric connection between a first end 16a and a second end 16b of the coil 16 and the first end and the second end of the capacitor circuit 18 in a main body portion 171. The main body portion is formed from a nonmagnetic member, in the present example, from resin, having a cylindrical shape having an outer diameter substantially equal to the inner diameter of the first tubular member 5A.

Ring-shaped recessed grooves 17a and 17b are formed at predetermined positions of an outer peripheral face of the main body portion 171 of the connection member 17. Meanwhile, as shown in FIG. 1A, ring-shaped protrusions 5Ad and 5Ae are formed by constricting the first tubular member 5A at positions thereof relative to which the ring-shaped recessed grooves 17a and 17b are positioned when the connection member 17 is accommodated therein, such that they project to the inner wall face side of the first tubular member 5A. If the connection member 17 is inserted into the first tubular member 5A in the direction of the center axis, then the connection member 17 is fixed to the first tubular member 5A by fitting engagement between the ring-shaped recessed grooves 17a and 17b on the outer peripheral face of the connection member 17 and the ring-shaped protrusions 5Ad and 5Ae on the inner wall face of the first tubular member 5A.

Further, the positioning protrusion 17c described hereinabove is formed at the center of an end face of the main body portion 171 of the connection member 17 on the ferrite core 15 side. In the present example, the protrusion 17c has a shape of a quadrangular prism. The ferrite core 15 and the connection member 17 are coupled to each other by fitting the protrusion 17c of the connection member 17 into the recessed portion 15a formed on the end face of the ferrite core 15 and adhering the end face of the ferrite core 15 and the flat face of the main body portion 171 of the connection member 17 to each other, for example, by bonding agent.

Further, as depicted in FIG. 3A, recessed grooves 174 and 175 are formed at positions of a peripheral side face of the main body portion 171 of the connection member 17 spaced by an angular distance of 180 degrees from each other such that they extend in the direction of the center axis of the cylinder. First end portions 172a and 173a of the terminal members 172 and 173 are erected uprightly in the recessed grooves 174 and 175 in a direction perpendicular to the peripheral direction, respectively. Further, at the first end portions 172a and 173a of the terminal members 172 and 173 erected uprightly in this manner, V-shaped notches 172b and 173b are formed as depicted in FIG. 3A.

Thus, the first end 16a of the coil 16 is force fitted into the V-shaped notch 172b of the first end portion 172a of the terminal member 172 so as to establish electric connection therebetween as depicted in FIG. 3B. Further, the second end 16b of the coil 16 is force fitted into the V-shaped notch 173b at the first end portion 173a of the terminal member 173 to establish electric connection therebetween. The ferrite core 15 having the coil 16 wound thereon and the connection member 17 connected to each other in this manner can be handled as one ferrite core module. It is to be noted that the first end 16a and the second end 16b of the coil 16 are connected to the first end portions 172a and 173a of the terminal members 172 and 173 erected uprightly in the recessed grooves 174 and 175 of the connection member 17 without extending outwardly from the outer peripheral face of the connection member 17. Accordingly, the first end 16a and the second end 16b of the coil 16 are not brought into contact with the inner wall face of the first tubular member 5A.

The second end portion of the terminal member 172 of the connection member 17 is formed as a ring-shaped electrode conductor 172c at an end face thereof opposing the end face of the capacitor circuit 18 as depicted in FIGS. 3B and 3C. Further, at the center of the end face of the connection member 17 opposing the end face of the capacitor circuit 18, a recessed hole 17d is formed at a position spaced apart from the ring-shaped electrode conductor 172c, as depicted in FIGS. 3B and 3C.

A second end portion 173c of the terminal member 173 of the connection member 17 is positioned in the recessed hole 17d. At the portion of the second end portion 173c of the terminal member 173 which is positioned in the recessed hole 17d, which portion corresponding to a bent portion of the terminal member 173 having elasticity, an insertion hole 173d is formed. The ring-shaped electrode conductor 172c at the second end portion of the terminal member 172 and the second end portion 173c of the terminal member 173 configured in such a manner as described above are provided for connection between first and second terminals of the capacitor circuit 18 as hereinafter described.

Accommodation of the Component Parts into the First Tubular Member 5A of the Electronic Ink Cartridge 10

The component parts are assembled and accommodated into the first tubular member 5A of the electronic ink cartridge 10 in the following manner.

Referring to FIG. 1B, the connection member 17 and the ferrite core 15 on which the coil 16 is wound are connected to each other first. In particular, the protrusion 17c at the position of the center axis formed on the connection member 17 and the recessed portion 15a formed on the ferrite core 15 are fitted with each other. Further, the first end 16a and the second end 16b of the coil 16 wound on the ferrite core 15 are connected to the first end portions 172a and 173a of the terminal members 172 and 173 provided on the connection member 17, respectively.

Then, the recessed portion 13a formed on the ferrite chip 13 and the protrusion 11b formed on the upper face of the flange portion 11a of the core member 11 are fitted with each other, and the coil spring 12 is mounted on the tip end side of the core member 11. Further, the O-snap ring 14 is disposed around the protrusion 13b of the ferrite chip 13, and the core member 11 and the ferrite chip 13 are inserted into the hollow portion of the first tubular member 5A in the direction of the center axis from the opening 5Ab side toward the distal end on the opening 5Aa side. The core member 11 extends on the distal end side thereof outwardly from the opening 5Aa of the first tubular member 5A in a state in which it is normally biased toward the opposite side from the distal end side.

Then, the connection member 17 and the ferrite core 15 having the coil 16 wound thereon, which are connected to each other, are inserted in the direction of the center axis into the first tubular member 5A in such a manner that the ferrite core 15 is opposed to the ferrite chip 13 with the O-snap ring 14 interposed therebetween.

At this time, the ring-shaped recessed grooves 17a and 17b on the outer peripheral face of the connection member 17 are fitted with the ring-shaped protrusions 5Ad and 5Ae provided on the inner wall face of the first tubular member 5A to fix the connection member 17 to the first tubular member 5A. In the present embodiment, the coil spring 12 is disposed on the distal end side of the core member 11 in the hollow portion of the first tubular member 5A in such a state that it engages at the first end thereof with the stepped portion 5As on the distal end side of the core member 11 in the hollow portion of the first tubular member 5A. Therefore, the flange portion 11a of the core member 11, ferrite chip 13 and O-snap ring 14 on the second end side of the coil spring 12 are normally biased toward the connection member 17 side fixed to the first tubular member 5A by the elastic biasing force of the coil spring 12. Consequently, rattling of the members is prevented.

In this state, the end face of the connection member 17 on the opposite side from the joining portion to the ferrite core 15 is exposed through the opening 5Ab of the first tubular member 5A. Accordingly, the ring-shaped electrode conductor 172c of the terminal member 172 formed on the end face of the connection member 17 and the second end portion 173c of the terminal member 173 are exposed through the opening 5Ab and can be contacted from the outside (refer to FIGS. 1A and 1B, and FIG. 3C).

It is to be noted that the ring-shaped protrusions 5Ad and 5Ae on the inner wall face of the first tubular member 5A are formed at such positions that the end face of the connection member 17 on the side it is coupled to the capacitor circuit 18 lies flush with the end face of the opening 5Ab of the first tubular member 5A.

In the present embodiment, a pressure sensor which senses pressure applied to the core member 11 is configured from the ferrite chip 13, O-snap ring 14, and ferrite core 15 on which the coil 16 is wound. The ring-shaped electrode conductor 172c of the terminal member 172 and the second end portion 173c of the terminal member 173 both formed on the end face of the connection member 17 exposed at the opening 5Ab are connected to the first end 16a and the second end 16b of the coil 16 wound on the ferrite core 15 as described hereinabove, respectively. The ring-shaped electrode conductor 172c and the second end portion 173c are connection terminals for establishing electric connection between the first end 16a and the second end 16b of the coil 16 and the first end and the second end of the capacitor circuit 18, respectively.

Accordingly, the ring-shaped electrode conductor 172c of the terminal member 172 and the second end portion 173c of the terminal member 173 as the connection terminals formed on the end face of the connection member 17 exposed at the opening 5Ab exhibit an inductance value, which varies in response to pressure applied to the core member 11, as an electric characteristic of the pressure sensor.

Therefore, the inductance value of the coil 16 can be measured by electrically contacting probe terminals connected to an inductance measuring instrument with the ring-shaped electrode conductor 172c of the terminal member 172 and the second end portion 173c of the terminal member 173 provided on the end face of the connection member 17. It is to be noted that the inductance of the coil 16 measured by the inductance measuring instrument in this instance is that in a state in which no pressing force is applied to the core member 11.

Then, by determining the value of the capacitance of the capacitor circuit 18 in response to the measured inductance value of the coil 16, the resonance frequency of the resonance circuit configured from the coil 16 and the capacitor circuit 18 can be set to a desired value. In particular, even if the inductance value of the coil 16 has some dispersion, the resonance frequency of the resonance circuit configured from the coil 16 and the capacitor circuit 18 can be set to a desired frequency by determining (setting) the capacitance of the capacitor circuit 18 in accordance with the inductance values of such coils 16.

The dispersion of the inductance value of the coil 16 is compensated for by the value of the capacitance set to the capacitor circuit 18 in such a manner as described above. The capacitor circuit 18 having the capacitance value set so that a desired resonance frequency is obtained is connected to the connection member 17 in the direction of the center axis as shown in FIGS. 1A and 1B. Then, in a state in which the capacitor circuit 18 is accommodated, the second tubular member 5B is screwed with the first tubular member 5A at the threaded portions 5Ac and 5Ba. Then, the cap 19 is inserted into the second tubular member 5B and then the opening of the second tubular member 5B is closed up, whereby the assembly of the tubular member 5 is completed.

Figure 4:
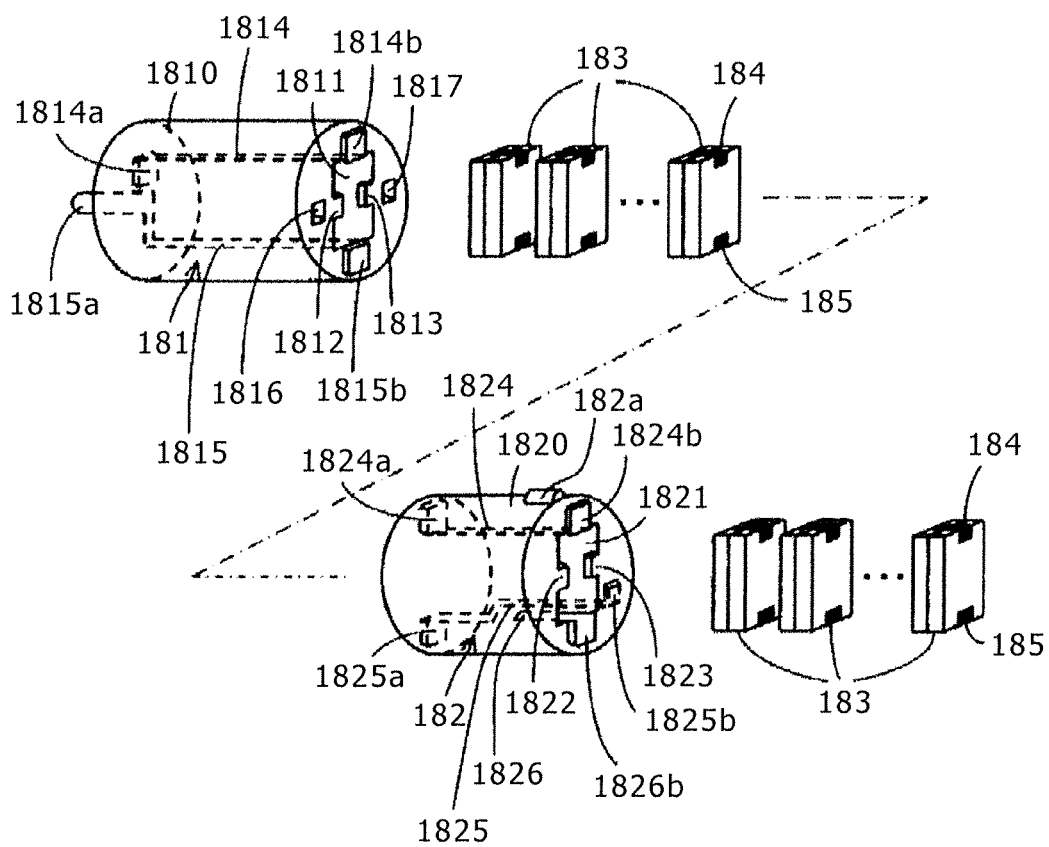
FIG. 4 is a view depicting an example of components of the electronic ink cartridge according to the first embodiment.
Figure 5:
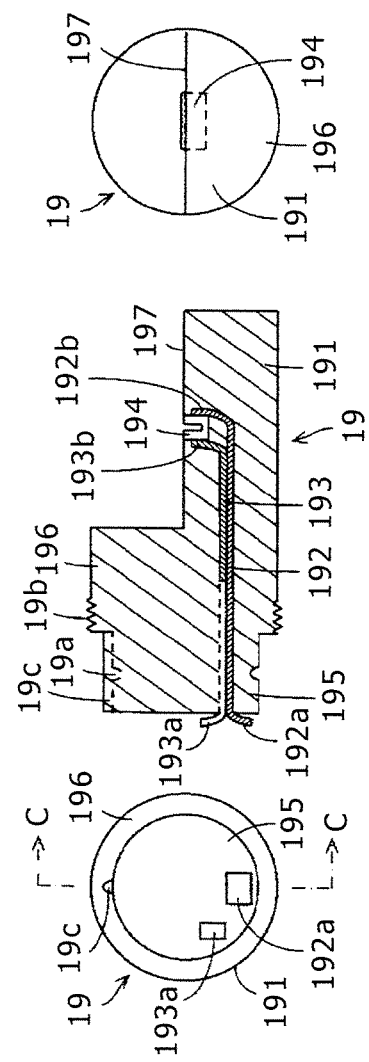
FIGS. 5A to 5C are views depicting an example of components of the electronic ink cartridge according to the first embodiment.

Now, a configuration of the capacitor circuit 18 is described. FIG. 4 is a view depicting an example of a configuration of the capacitor circuit 18 in the present embodiment.

In the present first embodiment, the capacitor circuit 18 includes a configuration wherein a first capacitor circuit 181 and a second capacitor circuit 182 are coupled to each other in the direction of the center axis as depicted in FIGS. 1A and 1B, and FIG. 4. The first capacitor circuit 181 is connected, when the push switch is in one state, for example, in an off state, in parallel to the coil 16 to configure a resonance circuit. Meanwhile, the second capacitor circuit 182 is connected, when the push switch is in an on state, in parallel to the coil 16 and the first capacitor circuit 181 to configure a resonance circuit. The values of the capacitance of the first capacitor circuit 181 and the second capacitor circuit 182 are set in order to set the resonance frequencies of the resonance circuits configured by them to desired frequencies.

The first capacitor circuit 181 and the second capacitor circuit 182 are connected in parallel to each other such that a plurality of chip capacitors 183 are stacked and accommodated in the inside of tubular holders 1810 and 1820 made of, for example, resin as depicted in FIG. 4.

In the case of the present example, for each of the chip capacitors 183, a multilayer ceramic capacitor disclosed, for example, in Japanese Patent Laid-Open No. 2009-124155 is used. Each of the chip capacitors 183 of the present example is formed in a shape of a parallelepiped, and a first electrode 184 and a second electrode 185 of each chip capacitor 183 are formed on its end faces opposing each other and extending perpendicularly to the stacking direction of the capacitors in an exposed state across the entire length in the stacking direction, as indicated in solid black in FIG. 4.

Accordingly, by stacking the chip capacitors 183, the first electrodes 184 and the second electrodes 185 of all of the stacked number of chip capacitors are connected to each other, and the chip capacitors 183 are connected in parallel to each other. The values of capacitance of the first capacitor circuit 181 and the capacitance of the second capacitor circuit 182 are each set by the value of the capacitance of each of the chip capacitors 183 accommodated in the holders 1810 and 1820, respectively, and the number of the chip capacitors 183 accommodated therein.

It is to be noted that the depth of the hollow portions 1811 and 1821 of the holders 1810 and 1820, namely, the number of stacked chip capacitors 183, is set in view of the degree in dispersion of the inductance value of the coil 16 described hereinabove. Then, when the number of chip capacitors 183 accommodated in the hollow portions 1811 and 1821 does not satisfy a predetermined number as a result of optimization of the value of the capacitance by stacking the chip capacitors 183, in the present example, a dummy chip capacitor or capacitors having substantially no capacitance are accommodated so that the number of chip capacitors 183 in the hollow portions 1811 and 1821 is always equal to the predetermined number.

In the case of the present example, on the opening side of the hollow portions 1811 and 1821 of the holders 1810 and 1820, elastically deformable pawl portions 1812, 1813 and 1822, 1823 are formed such that they project from wall faces of the holders 1810 and 1820 opposing each other toward the hollow portions 1811 and 1821 side, respectively. The chip capacitors 183 elastically deforms the pawl portions 1812, 1813 and 1822, 1823 to ride over them until they are accommodated into the hollow portions 1811 and 1821, respectively. Then, the pawl portions 1812, 1813 and 1822, 1823 engage with an upper face of the uppermost ones of the chip capacitors 183 accommodated in the hollow portions 1811 and 1821 to lock the chip capacitors 183 entirely in the hollow portions 1811 and 1821, respectively.

On the holder 1810 of the first capacitor circuit 181, paired terminal members 1814 and 1815 are provided in such a manner as to extend through the holder 1810 between the opposite end faces in the direction of the center axis as indicated by broken lines in FIG. 4. The terminal member 1814 is provided in such a manner as to connect to the first electrode 184 of all of the chip capacitors 183 accommodated in the hollow portion 1811. Meanwhile, the terminal member 1815 is provided in such a manner as to connect to the second electrode 185 of all of the chip capacitors 183 accommodated in the hollow portion 1811.

A first end 1814a of the terminal member 1814 is led out to the end face side opposing the connection member 17 and is abutted against and electrically connected to the ring-shaped electrode conductor 172c at the second end of the terminal member 172 of the connection member 17 as indicated by a broken line in FIG. 4. Meanwhile, a second end 1814b of the terminal member 1814 is provided such that it is bent to the outer side with respect to the hollow portion 1811 on the end face side opposing the second capacitor circuit 182 as depicted in FIG. 4.

Then, a first end 1815a of the terminal member 1815 is led out as a rod-like member projecting from a central portion of the end face opposing the connection member 17, and is inserted into the insertion hole 173d formed in the connection member 17 to be electrically connected to the end portion 173c of the terminal member 173 as depicted in FIG. 4. Meanwhile, a second end 1815b of the terminal member 1815 is provided such that it is bent to the outer side with respect to the opening of the hollow portion 1811 on the end face side opposing the second capacitor circuit 182 as depicted in FIG. 4.

On the holder 1820 of the second capacitor circuit 182, terminal members 1824 and 1825 are provided such that they extend through the holder 1820 between the opposite end faces in the direction of the center axis as indicated by broken lines in FIG. 4. A further (third) terminal member 1826 is provided on the holder 1820.

The terminal member 1824 is provided such that it is connected to the first electrode 184 of all of the chip capacitors 183 accommodated in the hollow portion 1821. The terminal member 1825 is provided such that it extends through the holder 1820 between the opposite end faces in the direction of the center axis without being connected to the chip capacitors 183 in the hollow portion 1821. Further, the terminal member 1826 is provided such that it is connected to the second electrode 185 of all of the chip capacitors 183 accommodated in the hollow portion 1821. However, first end of the terminal member 1826 exists in the holder 1820 and is not exposed to the outside while only the second end of the terminal member 1826 is exposed to the outside.

A first end 1824a of the terminal member 1824 is led out to the end face side opposing the first capacitor circuit 181 as indicated by a broken line in FIG. 4 and is abutted against and electrically connected to the second end 1814b of the terminal member 1814 of the first capacitor circuit 181. Meanwhile, a second end 1824b of the terminal member 1824 is provided such that it is bent to the outer side with respect to the opening of the hollow portion 1821 on the end face side opposing the end face of the cap 19 as depicted in FIG. 4.

A first end 1825a of the terminal member 1825 is led out to the end face side opposing the first capacitor circuit 181 as indicated by a broken line in FIG. 4 and is abutted against and electrically connected to the second end 1815b of the terminal member 1815 of the first capacitor circuit 181. Meanwhile, a second end 1825b of the terminal member 1825 is provided such that it is led out and exposed to a side portion of the opening of the hollow portion 1821 on the end face side opposing the cap 19 as depicted in FIG. 4.

A second end 1826b of the terminal member 1826 connected to the second electrode 185 of all of the chip capacitors 183 accommodated in the hollow portion 1821 is provided such that it is bent to the outer side with respect to the opening of the hollow portion 1821 on the end face side opposing the end face of the cap 19 as depicted in FIG. 4.

Further, a protrusion 182a is formed at a predetermined position of an outer peripheral portion of the holder 1820 of the second capacitor circuit 182 such that it extends along the direction of the center axis. The protrusion 182a is provided for positioning the second capacitor circuit 182 in a peripheral direction in the second tubular member 5B. The cut-out 5Bc is formed in the second tubular member 5B in the direction of the center axis from the opening end on the second end side of the second tubular member 5B as described hereinabove. The protrusion 182a of the second capacitor circuit 182 is inserted in the cut-out 5Bc to position the second capacitor circuit 182 in the peripheral direction.

Further, on the end face of the holder 1810 of the first capacitor circuit 181 opposing the holder 1820 of the second capacitor circuit 182, fitting recessed holes 1816 and 1817 are formed as depicted in FIG. 4. On the end face of the holder 1820 of the second capacitor circuit 182 opposing the holder 1810 of the first capacitor circuit 181, though not shown, protrusions are formed for fitting with the fitting recessed holes 1816 and 1817 of the holder 1810.

In this instance, though not shown, the fitting recessed holes 1816 and 1817 of the holder 1810 are bent in an L shape, and the protrusions of the holder 1820 are bent at an end thereof in an L shape. Consequently, if the protrusions of the holder 1820 are fitted into the fitting recessed holes 1816 and 1817 of the holder 1810, then the protrusions of the holder 1820 are elastically biased and inserted into the fitting recessed holes 1816 and 1817. As a result, the first capacitor circuit 181 and the second capacitor circuit 182 are connected to each other by the bent portions of the protrusions of the holder 1820 and the fitting recessed portions 1816 and 1817 so that the coupling therebetween may not be undone easily.

After a value of the inductance of the coil 16 accommodated in the first tubular member 5A is measured in such a manner as described above, a value of the capacitance, which forms a parallel resonance circuit with the coil 16 having the inductance to provide a desired resonance frequency, is calculated. Then, the plurality of chip capacitors 183 are accommodated into the holder 1810 of the first capacitor circuit 181 so that the calculated capacitance value may be obtained.

After the value of the capacitance of the first capacitor circuit 181 is set based on the measured value of the inductance so that a desired resonance frequency may be obtained, the value of the capacitance of the second capacitor circuit 182 is set. The value of the capacitance of the first capacitor circuit 181 can be set from the measured value of the inductance of a desired resonance frequency when the push switch (side switch) 7 is not operated (in one of a switch off state and a switch on state).

On the other hand, the value of the capacitance of the second capacitor circuit 182 is set in order that a desired resonance frequency is obtained when the push switch (side switch) 7 is operated (in the other of the switch off state and the switch on state). The value depends on the measured value of the inductance and the value of the capacitance of the first capacitor circuit 181.

In particular, the inductance of the coil accommodated in the first tubular member 5A is measured in the same state as an actual use state. Since the resonance frequency of the resonance circuit configured from the coil 16 and the first capacitor circuit 181 is known, the value of the capacitance of the first capacitor circuit 181 can be calculated. Accordingly, as the capacitance value of the first capacitor circuit 181, a value equal to or proximate to the calculated value of the capacitance is set.

Further, since the resonance frequency after transition by operating the push switch (side switch) 7 is known, also the value of the capacitance which the second capacitor circuit 182 to be connected in parallel to the first capacitor circuit 181 should have can be calculated depending upon the measured value of the inductance and the value of the capacitance of the first capacitor circuit 181.

This is described more particularly. The inductance of the coil accommodated in the first tubular member 5A in the same state as an actual use state is represented by L1; the resonance frequency when the push switch 7 is not operated is represented by f1; and the capacitance of the first capacitor circuit 181 is represented by C1. In this instance, since $f1 = 1/\{2 \cdot \pi \cdot (L1 \cdot C1)^{1/2}\}$, the capacitance C1 is calculated as $$C1 = 1/\{4 \cdot \pi^2 \cdot f1^2 \cdot L1\}$$

In particular, since the resonance frequency is f1 and the inductance of the coil accommodated in the first tubular member 5A in a state same as an actual use state is measured as L1, the capacitance C1 of the first capacitor circuit 181 can be calculated. Further, if the value actually set as the capacitance of the first capacitor circuit 181 is C11 proximate to C1 by measurement of the capacitance, then where the resonance frequency when the push switch 7 is operated is represented by f2 and the capacitance of the second capacitor circuit 182 by C2, then the resonance frequency f2 is given as $f2=1/\{2\cdot\pi\cdot(L1\cdot(C11+C2))^{1/2}\}$, and the value C2 to be set as the capacitance of the second capacitor circuit 182 is calculated as $$C2=1/\{4\cdot\pi_2\cdot f2^2\cdot L1\}-C11$$

FIGS. 5A to 5C show an example of a configuration of the cap 19.

FIG. 5A is a view of the cap 19 as viewed from the face side opposing the capacitor circuit 18, and FIG. 5B is a sectional view taken along line C-C of FIG. 5A. Further, FIG. 5C is a view of the cap 19 as viewed from the side opposite from said face side opposing the capacitor circuit 18.

The cap 19 is provided such that terminal members 192 and 193 made of dielectric material are insert-molded on a main body 191 made of nonmagnetic material, in the present example, made of resin. The cap 19 includes a connector 194 with which a distal end of a flexible lead portion 9 led out from a push switch 7 hereinafter described is fitted.

As depicted in FIGS. 1A and 1B, and FIG. 5C, the main body 191 of the cap 19 generally has a cylindrical shape. The face side of the main body 191 opposing the capacitor circuit 18 is formed as a reduced diameter portion 195 having a diameter such that the reduced diameter portion 195 is inserted into the second tubular member 5B of the electronic ink cartridge 10. While, the other portion of the main body 191 is formed as an increased diameter portion 196 having a diameter greater than the outer diameter of the tubular member 5. A portion of the increased diameter portion 196 of the cap 19 on the opposite side from the side opposing the capacitor circuit 18 has such a shape that a cylindrical shape portion is partly cut away in the direction of the center axis. In the example of the figures, the increased diameter portion 196 is cut away at one half of the cylindrical shape portion thereof such that a flat face 197 parallel to the direction of the center axis is formed.

As described hereinabove, the ring-shaped grooved portion 19a which fits with the ring-shaped protrusion 5Bb provided on the inner wall of the opening of the second tubular member 5B is formed on the reduced diameter portion 195 of the cap 19. Further, the protrusion 19c is formed in the direction of the center axis of the cap 19 on the reduced diameter portion 195 of the cap 19 for engaging with the positioning cut-out 5Bc formed on the opening end side of the second tubular member 5B. Furthermore, a threaded portion 19b is formed on the increased diameter portion 196 of the cap 19 for threadedly engaging with a threaded portion formed on the inner wall face of the housing of the position pointer 1 as hereinafter described.

The terminal members 192 and 193 are provided to establish electric connection between the capacitor circuit 18 and the connector 194 provided on the flat face 197 formed on the increased diameter portion 196. In particular, a first end 192a of the terminal member 192 is led out such that it elastically abuts against the second end 1826b of the terminal member 1826 on the end face of the second capacitor circuit 182 on the face of the reduced diameter portion 195 of the cap 19 opposing the capacitor circuit 18. A second end 192b of the terminal member 192 is connected to the first end of the connector 194. Meanwhile, a first end 193a of the terminal member 193 is led out such that it elastically abuts against the second end 1825b of the terminal member 1825 on the end face of the second capacitor circuit 182 on the face of the reduced diameter portion 195 of the cap 19 opposing the capacitor circuit 18. A second end 193b of the terminal member 193 is connected to the second end of the connector 194. It is to be noted that the first end of the connector 194 is connected to a first end of the push switch 7 hereinafter described while the second end of the connector 194 is connected to a second end of the push switch 7.

Assembly of Parts of the Second Tubular Member 5B of the Electronic Ink Cartridge 10

In the present first embodiment, the first capacitor circuit 181 having capacitance whose value has been set in such a manner as described hereinabove is connected to the connection member 17 first. In particular, the first end 1815a of the terminal member 1815 of the first capacitor circuit 181 formed in a shape of a rod is inserted into the insertion hole 173d of the connection member 17 and connected to the second end portion 173c of the terminal member 173 provided on the connection member 17. Further, the first end 1814a of the terminal member 1814 is connected so as to abut against the ring-shaped electrode conductor 172c of the connection member 17.

Then, the first capacitor circuit 181 connected to the connection member 17 is accommodated into the hollow portion of the second tubular member 5B. Then, the threaded portion 5Ba formed on the inner wall face of the opening of the second tubular member 5B on the first end side and the threaded portion 5Ac formed on the outer peripheral side face of the opening 5Ab of the first tubular member 5A are screwed with each other to form a unitary tubular body. At this time, the first capacitor circuit 181 is rotated to set a position thereof in a peripheral direction in advance so that the fitting recessed holes 1816 and 1817 on the end face of the first capacitor circuit 181 opposing the second capacitor circuit 182 are engaged with the fitting protrusions of the second capacitor circuit 182.

Thereafter, while the second capacitor circuit 182 having capacitance whose value has been set in such a manner as described hereinabove is mechanically and electrically connected to the first capacitor circuit 181 as described hereinabove with reference to FIG. 4 while the protrusion 182a is engaged with the positioning cut-out 5Bc of the second tubular member 5B.

Then, the reduced diameter portion 195 of the cap 19 is inserted into the second tubular member 5B in such a manner that the protrusion 19c is engaged with the positioning cut-out 5Bc. Consequently, the ring-shaped grooved portion 19a of the cap 19 and the ring-shaped protrusion 5Bb of the second tubular member 5B are fitted with each other to lock the cap 19 in the second tubular member 5B. At this time, the first end 1825b of the terminal member 1825 and the second end 1826b of the terminal member 1826 are connected to the first end 193a of the terminal member 193 and the first end 192a of the terminal member 192 of the cap 19, respectively.

The electronic ink cartridge 10 is assembled in such a manner as described above. In the electronic ink cartridge 10, the resonance frequency of the parallel resonance circuit configured from the coil 16 and the capacitor circuit 18 built therein is adjusted already in both of the states in which the push switch 7 is off and on. Accordingly, in the present embodiment, when the electronic ink cartridge 10 is accommodated into the housing 2 of the position pointer 1, adjustment of the resonance frequency is no longer required.

Equivalent Circuit to the Electronic Ink Cartridge 10

Figure 6:
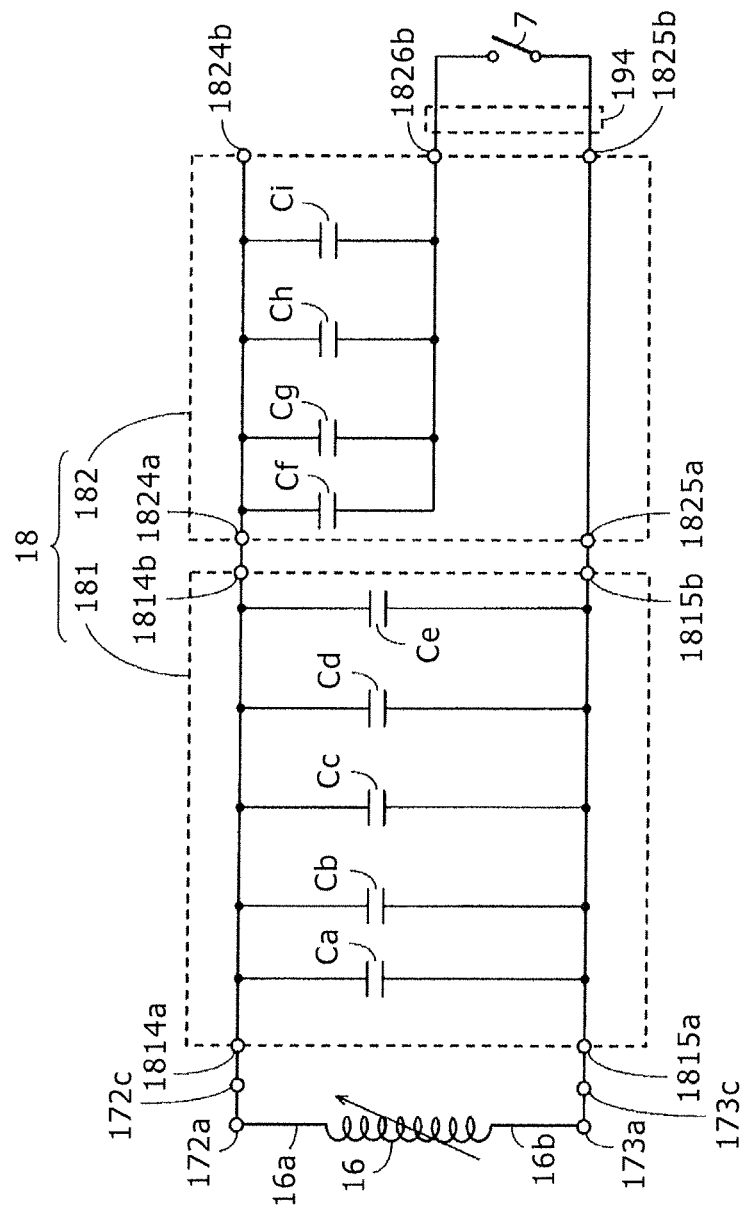
FIG. 6 is a circuit diagram depicting an example of an equivalent circuit of the electronic ink cartridge according to the first embodiment.

An equivalent circuit to the electronic circuit part including the coil 16, capacitor circuit 18 and push switch 7 of the electronic ink cartridge 10 described hereinabove is depicted in FIG. 6. In this instance, the first end 16a and the second end 16b of the coil 16 are connected to the first end portion 172a of the terminal member 172 and the first end portion 173a of the terminal member 173 of the connection member 17, respectively.

In a state in which the first capacitor circuit 181 of the capacitor circuit 18 is coupled to the connection member 17 as described hereinabove, the first end portion 172a of the terminal member 172 of the connection member 17 is connected to the first end 1814a of the terminal member 1814 of the first capacitor circuit 181 of the capacitor circuit 18 through the ring-shaped electrode conductor 172c of the terminal member 172 of the connection member 17. Further, the first end portion 173a of the terminal member 173 of the connection member 17 is connected to the first end 1815a of the terminal member 1815 of the first capacitor circuit 181 through the second end portion 173c of the terminal member 173 of the connection member 17.

Accordingly, as depicted in FIG. 6, the chip capacitors 183 accommodated in the first capacitor circuit 181 are connected in parallel to each other to the coil 16. FIG. 6 illustrates a state in which capacitances Ca to Ce of the five chip capacitors 183 are connected in parallel to the inductance of the coil 16. It is to be noted that the capacitances Ca to Ce of the chip capacitors 183 may be equal to each other or may be different from each other. Since the capacitances Ca to Ce are connected in parallel to each other, the capacitance of the entire first capacitor circuit 181 is equal to the simple sum of the capacitances of the chip capacitors 183 accommodated in the first capacitor circuit 181.

On the other hand, in a state in which the second capacitor circuit 182 is coupled to the first capacitor circuit 181, the second end 1814b of the terminal member 1814 of the first capacitor circuit 181 and the first end 1824a of the terminal member 1824 of the second capacitor circuit 182 are electrically connected to each other. Further, the second end 1815b of the terminal member 1815 of the first capacitor circuit 181 and the first end 1825a of the terminal member 1825 of the second capacitor circuit 182 are electrically connected to each other. Further, as depicted in FIG. 6, the push switch 7 is connected between the second end 1826b of the terminal member 1826 and the second end 1825b of the terminal member 1825 of the second capacitor circuit 182 through the connector 194 of the cap 19.

Accordingly, when the second end 1826b of the terminal member 1826 and the second end 1825b of the terminal member 1825 are short-circuited, an equivalent state in which the push switch 7 is on is entered. In this state, the chip capacitors 183 accommodated in the second capacitor circuit 182 are connected in parallel to each other to the coil 16 in addition to the chip capacitors 183 of the first capacitor circuit 181. It is to be noted that FIG. 6 illustrates a state in which capacitances Cf to Ci of the four chip capacitors 183 are accommodated in the second capacitor circuit 182 and connected in parallel to the inductance of the coil 16. Also in this state, the capacitances Cf to Ci of the chip capacitors 183 may be equal to each other or may be different from each other.

In the present first embodiment, the core member 11, the coil 16 configuring a pressure sensor and having variable inductance (including the ferrite chip 13, O-snap ring 14 and ferrite core 15) and the connection member 17 are accommodated in a juxtaposed state in this order in the direction of the center axis in the hollow portion of the first tubular member 5A in such a manner as described above. Further, on the end face of the connection member 17, the ring-shaped electrode conductor 172c and the second end portion 173c connected to the first end 16a and the second end 16b of the coil 16 are formed in a state in which they can be contacted as connection terminals from the outside. Accordingly, when pressure is applied to the core member 11, inductance of the coil 16 corresponding to the applied pressure appears at the connection terminals. Therefore, if an electric characteristic (inductance) obtained at the connection terminals is measured, then a variation characteristic of the inductance with respect to the pressure applied to the core member 11 can be known. Further, it can be confirmed whether or not the electronic ink cartridge 10 has a desired writing pressure detection characteristic.

Further, in the present embodiment, the connection terminals connected to the first end 16a and the second end 16b of the coil 16 and provided on the connection member 17 are exposed from the first tubular member 5A. Therefore, the position pointer 1 can be configured only by coupling the first capacitor circuit 181 to the connection member 17 such that the first and second electrodes of the first capacitor circuit 181, which forms the capacitor circuit 18 having a desired capacitance value, are connected to the connection terminals. Therefore, the configuration is simplified significantly.

Furthermore, in the present embodiment, all of the core member 11, coil 16 having variable inductance, connection member 17 and capacitor circuit 18 are inserted in the electronic ink cartridge 10, and the electronic ink cartridge 10 is assembled in a state in which adjustment of the resonance frequency has been done already. Accordingly, the position pointer 1 can be configured only by accommodating the electronic ink cartridge 10 into the housing of the position pointer 1. Therefore, the position pointer 1 in which the electronic ink cartridge 10 can be handled like a replacement core of a boll-point pen can be implemented.

Further, as described hereinabove, in the present embodiment, all component parts are disposed in a juxtaposed state in order in the direction of the center axis in the tubular member 5 of the electronic ink cartridge 10 so as to establish not only electric connection but also mechanical coupling thereof. Therefore, there is an effect also that a narrow electronic ink cartridge of such a diameter as, for example, 2.5 mm as in the case of the example described hereinabove can be implemented readily. It is to be noted that the second capacitor circuit 182 is necessitated where the push switch 7 is disposed in the position pointer 1. However, where the push switch 7 is not disposed in the position pointer 1, the position pointer 1 can be used by connecting the second capacitor circuit 182 to the first capacitor circuit 181 and short-circuiting the second end 1826b of the terminal member 1826 and the second end 1825b of the terminal member 1825. Alternatively, it is also possible to configure the capacitor circuit 18 solely from the first capacitor circuit 181 without connecting the second capacitor circuit 182.

Accommodation of the Electronic Ink Cartridge into the Housing of the Position Pointer The electronic ink cartridge 10 of the present embodiment is mounted on the lower half 3 of the housing 2 of the position pointer 1 and accommodated into the housing 2 as depicted in FIG. 2A. On the lower half 3 of the housing 2, the push switch 7 is provided in such a manner as described below before the electronic ink cartridge 10 is inserted.

In particular, the through-hole 3d, for example, of a circular shape or an elliptical shape is provided at part of the peripheral side face of the lower half 3, and the pressing element 8 for depressing the push switch 7 is disposed in the through-hole 3d. The pressing element 8 is made of an elastic material such as, for example, elastic rubber.

The push switch 7 is disposed in a portion 6a formed by cutting away part of a ring-shaped member 6, whose outer diameter is substantially equal to the inner diameter of the lower half 3, in a circumferential direction as depicted in FIG. 2B. This ring-shaped member 6 has a through-hole 6b of a diameter greater than the outer diameter of the tubular member 5 of the electronic ink cartridge 10.

In the present embodiment, a stepped portion 3e is formed by making the diameter of the hollow portion 3b of the lower half 3 on the opening 3a side a little smaller than the diameter of the other portion. The ring-shaped member 6 is engaged with the stepped portion 3e such that the position thereof in the direction of the center axis is restricted, and is fixed to the lower half 3, for example, by bonding agent. Consequently, the ring-shaped member is positioned such that a depressed face 7a (refer to FIG. 2B) of the push switch 7 comes to the position corresponding to the pressing element 8 in the direction of the center axis.

In the case of the present example, a lead portion (hereinafter referred to as flexible lead portion) 9 formed of a flexible wiring board for electric connection is led out from the push switch 7 as depicted in FIG. 2B. Further, a portion of an annular part of the lower half 3, which is screwed with the cap 19 portion of the electronic ink cartridge 10, includes a guide groove 3f such that it cooperates with the cap 19 to provide an air gap therebetween as depicted in FIG. 2C, which is a sectional view taken along line A-A of FIG. 2A. The flexible lead portion 9 led out from the push switch 7 can be led out to the outside of the lower half 3 through the guide groove 3f as depicted in FIGS. 2A and 2C.

In this manner, in the present first embodiment, the electronic ink cartridge 10 is inserted in the direction of the center axis of the lower half 3 of the housing 2, in the inside of which the push switch 7 is attached, from the side opposite to the core member 11 side. In this instance, the electronic ink cartridge 10 is inserted in the direction of the center axis of the lower half 3 through the through-hole 6b of the ring-shaped member 6 such that the core member 11 extending outwardly from the tubular member 5 extends to the outside from the opening 3a of the lower half 3 of the housing 2 as depicted in FIG. 2A.

The opening 3a of the lower half 3 has a diameter greater than the diameter of the core member 11 but smaller than the diameter of the tubular member 5 of the electronic ink cartridge 10. Accordingly, the electronic ink cartridge 10 engages, on the core member 11 side of the tubular member 5 thereof, with the end portion of the inner wall of the lower half 3 on the opening 3a side to restrict the position thereof in the direction of the center axis.

Before the electronic ink cartridge 10 is inserted into the lower half 3, the flexible lead portion 9 led out from the push switch 7 is led out to the cap 19 side of the electronic ink cartridge 10 through the guide groove 3f. Then, the threaded portion 19b of the cap 19 of the electronic ink cartridge 10 is screwed into a threaded portion 3c of the lower half 3 thereby to fix the electronic ink cartridge 10 to the lower half 3.

Thereafter, a distal end of the flexible lead portion 9 led out from the push switch 7 is fitted with the connector 194 formed on the cap 19 of the electronic ink cartridge 10 to establish electric connection. Thereafter, the upper half 4 is force fitted with the lower half 3 to complete the position pointer 1 of the present embodiment.

In the position pointer 1 of the present embodiment, the electronic ink cartridge 10 can be removably attached to the lower half 3 and can be exchanged readily as described above. Further, the push switch 7 can be connected after the electronic ink cartridge 10 is attached to the lower half 3, and there is an additional advantage that this connection can be carried out readily.

Circuit Configuration for Pointed Position Detection and Writing Pressure Detection In the position pointer 1 of the present embodiment, if pressing force (writing pressure) is applied to the core member 11, then the ferrite chip 13 is displaced toward the ferrite core 15 side through the O-snap ring 14, whereupon the inductance of the coil 16 varies and the resonance frequency varies in response to the variation of the inductance. In other words, the resonance frequency (phase) of an electromagnetic induction signal to be transmitted from the coil 16 of the resonance circuit varies. Accordingly, if the position pointer 1 of the present example is used, then the position detection apparatus which has such a circuit configuration depicted in FIG. 7 as described below can detect a pointed position by the position pointer 1 and the writing pressure by the position pointer 1.

Figure 7:
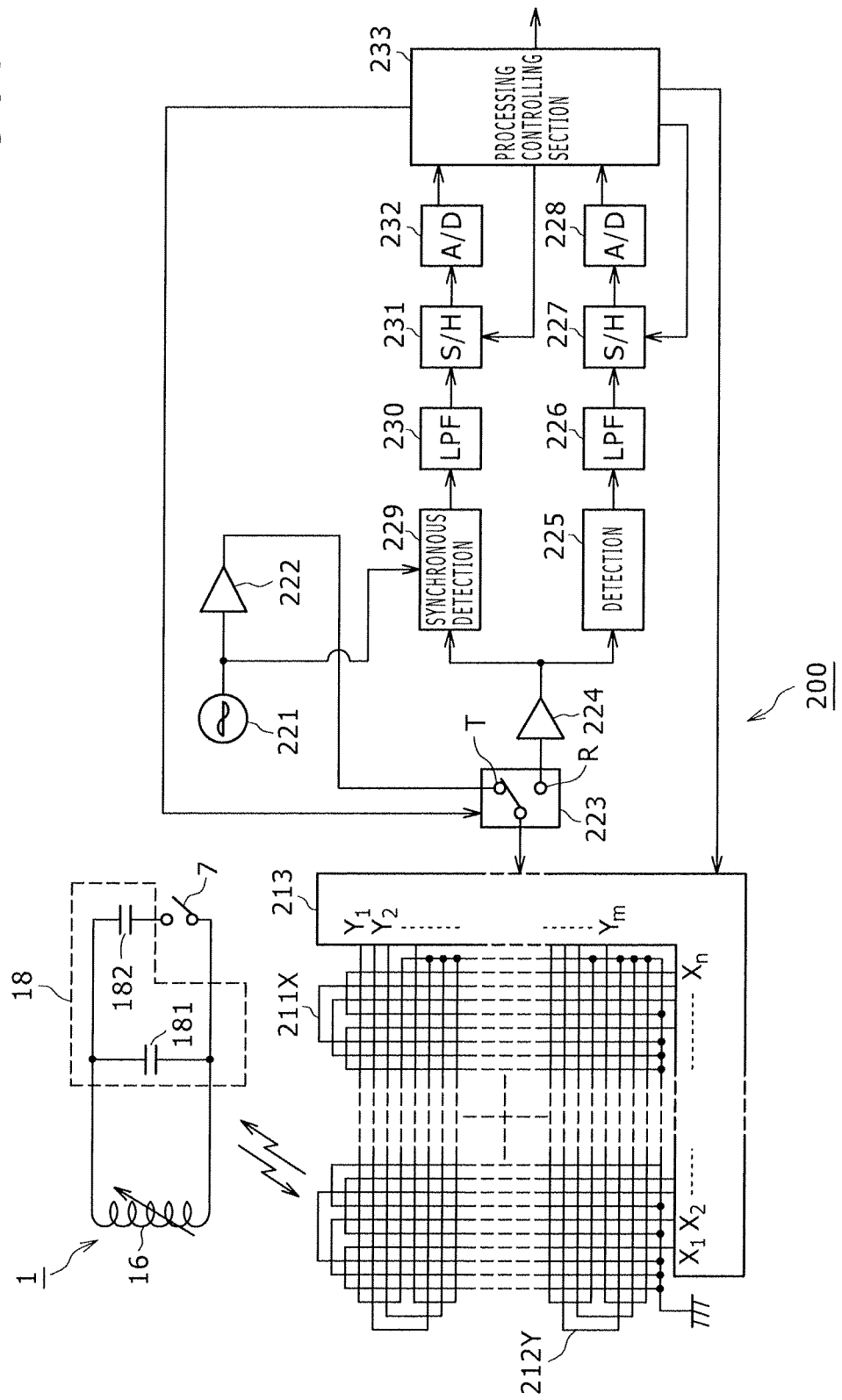
FIG. 7 is a view depicting an equivalent circuit of the position pointer which includes the electronic ink cartridge according to the first embodiment together with a position detection apparatus.

An example of a circuit configuration of the position detection apparatus 200 which carries out detection of a pointed position and detection of writing pressure using the position pointer 1 described above is described with reference to FIG. 7. FIG. 7 is a block diagram depicting an example of a circuit configuration of the position pointer 1 and the position detection apparatus 200.

In the position pointer 1, as described hereinabove, the capacitance value of the capacitor circuit 18 connected in parallel to the coil 16 is varied in response to on-off operations of the push switch 7 to vary the resonance frequency of the resonance circuit. In the position detection apparatus 200, a frequency displacement (phase) of the resonance frequency of the resonance circuit of the position pointer 1 is detected to carry out detection of writing pressure or detection of an operation situation of the push switch 7 as hereinafter described.

In the position detection apparatus 200, an X-axis direction loop coil group 211X and a Y-axis direction loop coil group 212Y are stacked to form a position detection coil. The loop coil groups 211X and 212Y are configured, for example, from n and m rectangular loop coils, respectively. The loop coils which configure the loop coil groups 211X and 212Y are disposed in a juxtaposed relationship at equal distances from each other and in a successively overlapping relationship with each other.

The position detection apparatus 200 further includes a selection circuit 213 to which the X-axis direction loop coil group 211X and the Y-axis direction loop coil group 212Y are connected. The selection circuit 213 successively selects one of the loop coils of the two loop coil groups 211X and 212Y.

The position detection apparatus 200 further includes an oscillator 221, a current driver 222, a switch circuit 223, a reception amplifier 224, a detector 225, a low-pass filter 226, a sample hold circuit 227, and an A/D conversion circuit 228. The position detection apparatus 200 further includes a synchronous detector 229, another low-pass filter 230, another sample hold circuit 231, another A/D conversion circuit 232, and a processing controlling section 233. The processing controlling section 233 is configured, for example, of a microcomputer.

The oscillator 221 generates an AC signal of a frequency f0. The AC signal generated by the oscillator 221 is supplied to the current driver 222 and the synchronous detector 229. The current driver 222 converts the AC signal supplied thereto from the oscillator 221 into current and outputs the current to the switch circuit 223. Then switch circuit 223 changes a connection destination (a transmission side terminal T or a reception side terminal R) to which a loop coil selected by the selection circuit 213 is to be connected under the control of the processing controlling section 233. Of such connection destinations, to the transmission side terminal T and the reception side terminal R, the current driver 222 and the reception amplifier 224 are connected, respectively.

An induction voltage generated in the loop coil selected by the selection circuit 213 is sent to the reception amplifier 224 through the selection circuit 213 and the switch circuit 223. The reception amplifier 224 amplifies the induction voltage supplied thereto from the loop coil and outputs the amplified induction voltage to the detector 225 and the synchronous detector 229.

The detector 225 detects an induction voltage generated in a loop coil, namely, a reception signal, and outputs the detected reception signal to the low-pass filter 226. The low-pass filter 226 has a cutoff frequency sufficiently lower than the frequency f0 described above, and converts the output signal of the detector 225 into a DC signal and outputs the DC signal to the sample hold circuit 227. The sample hold circuit 227 holds a voltage value of the output signal of the low-pass filter 226 at a predetermined timing, particularly, at a predetermined timing within a reception period and outputs the held voltage value to the A/D (Analog to Digital) conversion circuit 228. The A/D conversion circuit 228 converts an analog output of the sample hold circuit 227 into a digital signal and outputs the digital signal to the processing controlling section 233.

On the other hand, the synchronous detector 229 synchronously detects an output signal of the reception amplifier 224 with an AC signal from the oscillator 221 and outputs a signal of a level having a phase difference between the signals to the low-pass filter 230. The low-pass filter 230 has a cutoff frequency sufficiently lower than the frequency f0, and converts the output signal of the synchronous detector 229 into a DC signal and outputs the DC signal to the sample hold circuit 231. The sample hold circuit 231 holds a voltage value of the output signal of the low-pass filter 230 at a predetermined timing and outputs the held voltage value to the A/D (Analog to Digital) conversion circuit 232. The A/D conversion circuit 232 converts an analog output of the sample hold circuit 231 into a digital signal and outputs the digital signal to the processing controlling section 233.

The processing controlling section 233 controls the components of the position detection apparatus 200. In particular, the processing controlling section 233 controls selection of a loop coil by the selection circuit 213, changeover of the switch circuit 223, and timings of the sample hold circuits 227 and 231. The processing controlling section 233 controls transmission of electromagnetic induction signals with a fixed transmission duration from the X-axis direction loop coil group 211X and the Y-axis direction loop coil group 212Y based on input signals from the A/D conversion circuits 228 and 232.

In each loop coil of the X-axis direction loop coil group 211X and the Y-axis direction loop coil group 212Y, an induction voltage is generated by an electromagnetic induction signal transmitted from the position pointer 1. The processing controlling section 233 calculates coordinate values of a pointed position in the X axis direction and the Y axis direction of the position pointer 1 based on the level of the voltage values of the induction voltages generated in the loop coils. Further, the processing controlling section 233 detects based on the level of a signal corresponding to a phase difference between the transmitted electromagnetic induction signal and the received electromagnetic induction signal whether or not the push switch 7 is depressed.

In this manner, in the position detection apparatus 200, the position of the position pointer 1 positioned closely thereto can be detected by the processing controlling section 233. Besides, the processing controlling section 233 of the position detection apparatus 200 can detect the writing pressure applied to the core member of the position pointer 1 and detect whether or not the push switch 7 on the position pointer 1 is switched on by detecting the phase (frequency displacement) of the received signal.

Modifications to the First Embodiment

It is to be noted that, while the electronic ink cartridge 10 of the first embodiment described hereinabove is structured such that the tubular member 5 is configured from the first tubular member 5A and the second tubular member 5B connected to each other, the tubular member 5 may otherwise be structured in the following manner. In particular, the tubular member 5 is configured only from the first tubular member 5A, and the core member 11, the pressure sensor (coil spring 12, ferrite chip 13, O-snap ring 14 and ferrite core 15 on which the coil 16 is wound) and the connection member 17 are accommodated in the tubular member 5.

Figure 8:
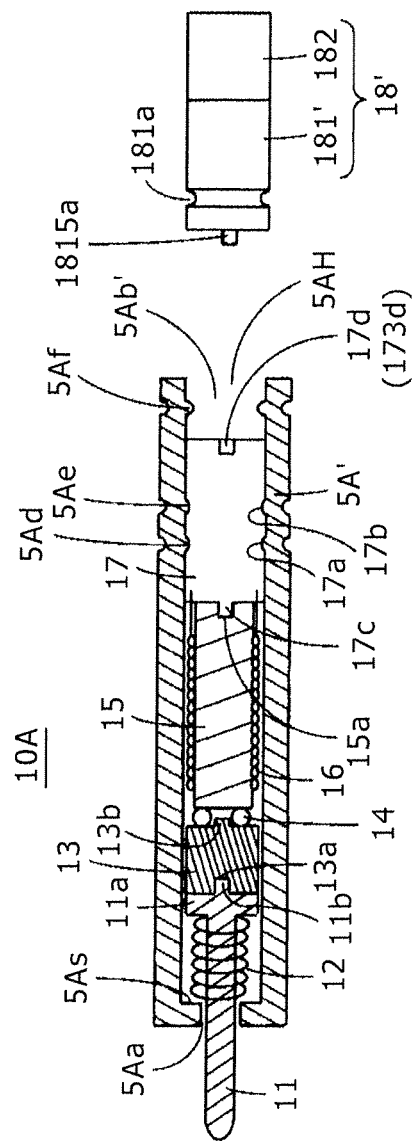
FIG. 8 is a view depicting a modification to the electronic ink cartridge of the first embodiment.

FIG. 8 is a view depicting an example of a configuration of the electronic ink cartridge 10A of a modification to the first embodiment, and like elements to those of the electronic ink cartridge 10 of the first embodiment described above are denoted by like reference symbols. As shown in FIG. 8, in the electronic ink cartridge 10A of the present example, the tubular member 5A' is different from the first tubular member 5A in the first embodiment described above in the configuration in the proximity of the opening 5Ab' to which the connection member 17 is fixed.

In particular, in the present example, a threaded portion for threaded engagement with the second tubular member 5B is not formed in the proximity of the opening 5Ab' of the tubular member 5A'. Instead, the tubular member 5A' is formed a little longer in the direction of the center axis than the first tubular member 5A. Further, a recessed portion 5AH is configured between an end face of the connection member 17 on which connection terminals to the capacitor circuit 18' are formed and an end face of the opening 5Ab' of the tubular member 5A'. Further, a ring-shaped protrusion 5Af is formed on an inner wall face of the recessed portion 5AH.

Meanwhile, on a peripheral side face of the first capacitor circuit 181' of the capacitor circuit 18', a ring-shaped recessed groove 181a for fitting with the ring-shaped protrusion 5Af of the recessed portion 5AH is formed in the proximity of the end face on the connection side to the connection member 17.

Further, in the present modification, the core member 11, coil spring 12, ferrite chip 13, O-snap ring 14, ferrite core 15 on which the coil 16 is wound and connection member 17 are inserted into the tubular member 5A' and ring-shaped recessed grooves 17a and 17b of the connection member 17 are fitted with the ring-shaped protrusions 5Ad and 5Ae to fix the connection member 17 to the tubular member 5A'.

Thereafter, the first capacitor circuit 181' of the capacitor circuit 18' is inserted into the recessed portion 5AH to insert and fit the rod-shaped first end 1815a of the terminal member 1815 into the insertion hole 173d of the terminal member 173 in the recessed hole 17d of the connection member 17 so as to be connected to the end portion 173c. Further, the first end 1814a of the terminal member 1814 is fitted with and connected to the ring-shaped electrode conductor 172c of the connection member 17 to establish connection therebetween. Then, the ring-shaped recessed groove 181a is fitted with and locked by the ring-shaped protrusion 5Af.

Then, in the present example, the resulting block in this state is accommodated into the lower half 3 of the housing 2 of the position pointer 1, and then by screwing the cap 19 with the threaded portion 3c of the lower half 3, the electronic ink cartridge 10A can be accommodated into and fixed to the position pointer 1 similarly as in the case depicted in FIG. 2A. It is to be noted that, in this instance, a recessed portion into which part of the second capacitor circuit 182 of the capacitor circuit 18 in the direction of the center axis is to be fitted may be formed on the end face side of the cap 19 opposing the capacitor circuit 18 such that the first ends 192a and 193a of the terminal members 192 and 193 of the cap 19 in the first embodiment described hereinabove are formed on the bottom of the recessed portion.

It is to be noted that, while the modification described above is directed to the case in which the position pointer 1 includes the push switch (side switch) 7, if the position pointer 1 does not include the push switch 7, then the connector on the cap 19 for connecting to the push switch 7 is not required. In this instance, the cap 19 may include connection terminals for connecting the first capacitor circuit 181 and the second capacitor circuit 182 in parallel to each other. In particular, where the second capacitor circuit 182 is used as the capacitor circuit 18 together with the first capacitor circuit 181, connection terminals for allowing conduction of the first end 1825a of the second capacitor circuit 182 and the second end 1826b of the terminal member 1826 shown in FIG. 6 are provided on the cap 19.

It is to be noted that, in the case of the configuration of the position pointer which does not include the push switch 7, the capacitor circuit 18 may be configured solely from the first capacitor circuit 181, or from the first capacitor circuit 181 and the second capacitor circuit 182 which is connected in parallel to the first capacitor circuit 181. In this instance, without providing the cap 19, an end portion of the capacitor circuit 18 may be abutted against a wall portion formed inside the housing 2 of the position pointer 1 so that the electronic ink cartridge may not move in the axial direction in the position pointer 1. It is to be noted that, in this instance, naturally a protective cap may be placed at the end portion of the capacitor circuit 18 in the direction of the center axis such that the protective cap is abutted against the wall portion formed inside the housing 2 of the position pointer 1.

Second Embodiment

The pressure sensor provided in the electronic ink cartridge of the first embodiment described above is configured such that the position of the ferrite core as the first magnetic member is fixed while the ferrite chip as the second magnetic member is biased in the direction of the center axis in response to pressing force applied to the core member to vary the distance between the ferrite core and the ferrite chip, to thereby vary the inductance of the coil wound on the ferrite core in response to the pressing force.

In a pressure sensor provided in an electronic ink cartridge of a second embodiment described below, a ferrite core as the first magnetic member is biased in the direction of the center axis in response to pressing force applied to a core member to vary the distance between the ferrite core and a ferrite chip, to thereby vary the inductance of a coil wound on the ferrite core in response to the pressing force.

Further, in the present second embodiment, an information transmission circuit is provided in a position pointer such that, as information relating to an electronic ink cartridge or the position pointer, for example, identification information (ID) of the electronic ink cartridge or the position pointer is transmitted to a position detection apparatus. The identification information (ID) is an example of information relating to an electronic ink cartridge. As the identification information, information which specifies a manufacturer, a product number, a production date, a production lot number, a position detection method such as an electromagnetic induction method or a capacitive method, a writing pressure detection method based on an inductive variation or a capacitive variation and so forth of an electronic ink cartridge or a position pointer may be registered into a semiconductor device such as a memory or a register.

The position pointer according to the second embodiment to be described below transmits identification information of an electronic ink cartridge to a position detection apparatus. To this end, in the present second embodiment, the position pointer includes an ID transmission circuit 300 as an information transmission circuit. Further, in the present second embodiment, the ID transmission circuit 300 is accommodated in an ID package 320 of a cylindrical shape, which is in turn accommodated in a tubular member.

FIGS. 9A and 9B are views depicting an example of a configuration of an electronic ink cartridge 20, which is a principal component of the position pointer according to the second embodiment. FIG. 9A is a sectional view depicting an internal configuration of the electronic ink cartridge 20. Also in the present example, for the convenience of description, some of the internal component parts of a tubular member 50 of the electronic ink cartridge 20 are not depicted in cross-section in FIG. 9A, but a cross-sectional view of them is prepared separately as hereinafter described. Meanwhile, FIG. 9B is an exploded perspective view depicting a general configuration of the electronic ink cartridge 20. In the present second embodiment, like elements to those in the first embodiment are denoted by like reference symbols.

It is to be noted that the configuration of the housing of the position pointer of the present second embodiment and the attachment structure of the push switch 7 to the housing are similar to those in the first embodiment, and therefore, illustration and description of them are omitted.

As depicted in FIGS. 9A and 9B, also in the electronic ink cartridge 20, component parts of the position pointer of the electromagnetic induction type are accommodated in the tubular member 50. However, in the present second embodiment, the tubular member 50 is not configured from separate members but is formed as a single part member. Also the tubular member 50 in the present second embodiment has a narrow shape having an outer diameter of, for example, 2.5 mm and an inner diameter of, for example, 1.5 mm to 2 mm. Further, the tubular member 50 is configured from a material of a nonmagnetic substance such as a nonmagnetic metal material, a resin material, glass or a ceramic material, for example, from SUS305 or SUS310S.

On the first end side of the tubular member 50 in the direction of the center axis, an opening 50a for allowing a distal end of a core member 21 to extend outwardly therethrough is provided. The opening 50a has a diameter smaller than the inner diameter of the tubular member 50. Meanwhile, the second end side of the tubular member 50 in the direction of the center axis is formed to have the entire inner diameter thereof as an opening 50b. On the opening 50b side, a cut-out 50f is formed for positioning in a peripheral direction such that it extends along the direction of the center axis similarly as in the case of the second tubular member 5B in the first embodiment described hereinabove.

As depicted in FIGS. 9A and 9B, a coil spring 22, the core member 21, a ferrite core 23 as an example of a first magnetic member on which a coil 24 is wound, an O-snap ring 25, a ferrite chip 26 as an example of a second magnetic member, a connection member 27, a capacitor circuit 28 and an ID package 320 are accommodated in a juxtaposed relationship in this order as viewed from the opening 50*a* side in the tubular member 50. The parts mentioned are accommodated in such a state that the directions of the center axes thereof extend along the direction of the center axis of the tubular member 50. The cap 19 is inserted in the opening 50*b* of the tubular member 50 to close up the opening 50*b* of the tubular member 50.

It is to be noted that, in the present second embodiment, different from the case of the first embodiment, at a point of time at which the connection member 27 is accommodated to a predetermined position of the tubular member 50 in the direction of the center axis, side peripheral face positions 50*c* and 50*d* of the tubular member 50 corresponding to a side peripheral face of the connection member 27 are constricted to form protrusions on the inner peripheral face of the tubular member 50. Thus, the connection member 27 is pressed against and held and fixed by the tubular member 50 to restrict the position of the connection member 27 so as not to move in the direction of the center axis.

On the inner wall face of the tubular member 50 in the proximity of the opening 50*b* on the second end side, a ring-shaped protrusion 50*e* for fitting with a ring-shaped grooved portion 19*a* formed on an outer periphery of the reduced diameter portion 195 of the cap 19 made of a nonmagnetic material such as, for example, resin is formed, for example, by constricting the tubular member 50 at the position. Accordingly, when the cap 19 is inserted into the tubular member 50, the ring-shaped grooved portion 19*a* formed on the outer periphery of the reduced diameter portion 195 of the cap 19 and the ring-shaped protrusion 50*e* formed on the inner wall face of the tubular member 50 are fitted with each other to pressure-retain the cap 19 thereby to prevent the cap 19 from being separated from the opening 50*b*.

The configuration of the components accommodated in the inside of the tubular member 50 and assembly of the electronic ink cartridge 20 as well as adjustment of the resonance frequency are described further.

The core member 21 in the present second embodiment is configured, for example, from resin. As depicted in FIG. 9B, the core member 21 has a shape of a rod extending outwardly from the opening 50*a* of the tubular member 50. Further, in the present second embodiment, a recessed portion 23*a* with which the core member 21 is to be fitted is formed substantially at the center of an end face of the ferrite core 23, on which the coil 24 is wound, on the core member 21 side in the direction of the center axis. The core member 21 is force fitted, on the opposite side 21*a* thereof to the side extending from the opening 50*a*, in the recessed portion 23*a* of the ferrite core 23 and coupled to the ferrite core 23. In the present embodiment, the core member 21 is removably fitted in the ferrite core 23 and accordingly can be inserted into and removed from the electronic ink cartridge 20.

A recessed portion 23*b* for positioning is formed substantially at the center of an end face of the ferrite core 23 on the opposite side from the core member 21 side in the direction of the center axis. A protrusion 27*a* formed on the end face of the connection member 27 is inserted into the recessed portion 23*b* of the ferrite core 23, through an O-snap ring 25 made of elastic material such as, for example, rubber, and through the ferrite chip 26 as depicted in FIG. 9A. In the present example, a through-hole 26*a* into which the protrusion 27*a* of the connection member 27 is inserted is formed in the ferrite chip 26. The length of the protrusion 27*a* of the connection member 27 in the direction of the center axis is set to a length over which the protrusion 27*a* is inserted in the recessed portion 23*b* of the ferrite core 23, with the O-snap ring 25 and the ferrite chip 26 interposed therebetween, and the ferrite core 23 can be displaced toward the connection member 27 in the direction of the center axis in response to pressing force applied to the core member 21.

Figures 10A, 10B, 10C:
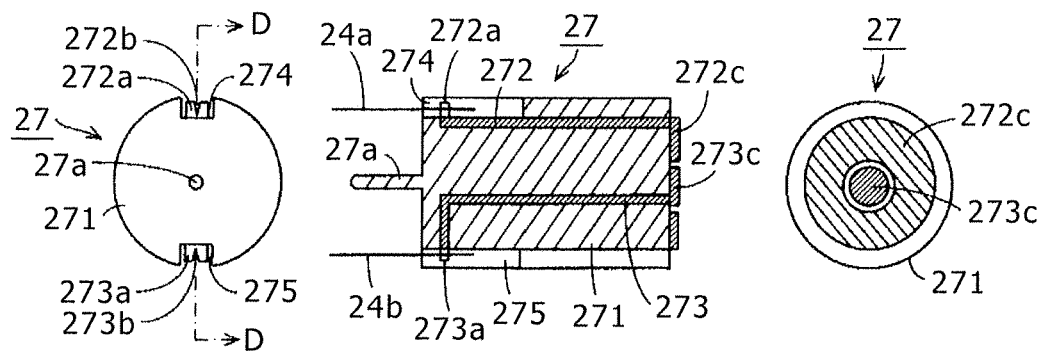
FIGS. 10A to 10D are views depicting an example of components of the electronic ink cartridge according to the second embodiment.

FIGS. 10A to 10D are views depicting an example of a configuration of the connection member 27. FIG. 10A is a view of the connection member 27 as viewed from the side opposing the end face of the ferrite core 23, and FIG. 10B is a sectional view taken along line D-D of FIG. 10A. FIG. 10C is a view of the connection member 27 as viewed from the side on which the connection member 27 is connected to the capacitor circuit 28.

Similarly to the connection member 17 in the first embodiment, the connection member 27 is formed by insert-molding terminal members 272 and 273 having elasticity for establishing electric connection to a first end 24*a* and a second end 24*b* of the coil 24 and the first end and the second end of the capacitor circuit 28, respectively, in a main body portion 271 formed from a cylindrical resin member as depicted in FIGS. 10A and 10B. The protrusion 27*a* for positioning is formed at the center of the end face of the main body portion 271 on the ferrite core 23 side. In the present example, the protrusion 27*a* has a shape of a rod having a circular cross section.

Further, as depicted in FIGS. 10A and 10B, recessed grooves 274 and 275 are formed at positions spaced, in the present example, by an angular distance of 180 degrees from each other on a peripheral side face of the main body portion 271 of the connection member 27 such that they extend along the direction of the center axis of the cylindrical shape. First end portions 272*a* and 273*a* of the terminal members 272 and 273 are erected in a direction perpendicular to the peripheral direction in the recessed grooves 274 and 275, respectively. The first end portions 272*a* and 273*a* of the terminal members 272 and 273 in the erected state has V-shaped notches 272*b* and 273*b* formed thereon as depicted in FIG. 10A. As depicted in FIG. 10B, the first end 24*a* of the coil 24 is force fitted into the V-shaped notch 272*b* of the first end portion 272*a* of the terminal member 272 to establish electric connection therebetween and the second end 24*b* of the coil 24 is force fitted into the V-shaped notch 273*b* of the first end portion 273*a* of the terminal member 273 to establish electric connection therebetween.

The second end portion of the terminal member 272 of the connection member 27 is formed as a ring-shaped electrode conductor 272*c* on an end face thereof opposing the end face of the capacitor circuit 28 as depicted in FIGS. 10B and 10C.

Meanwhile, the second end portion of the terminal member 273 of the connection member 27 is formed as a circular conductor 273*c* on the inner side of the ring-shaped electrode conductor 272*c* in a non-contacting relationship with the ring-shaped electrode conductor 272*c* at the second end portion of the terminal member 272. The ring-shaped electrode conductor 272*c* at the second end portion of the terminal member 272 and the circular conductor 273*c* at the second end portion of the terminal member 273 configured in such a manner as described above are connected to first and second terminals of the capacitor circuit 28 as hereinafter described.

In this instance, the connection of the first end 24a and the second end 24b of the coil 24 to the V-shaped notch 272b of the first end portion 272a of the terminal member 272 and the V-shaped notch 273b of the first end portion 273a of the terminal member 273 of the connection member 27 is carried out in a state in which the protrusion 27a of the connection member 27 is inserted in the recessed portion 23b of the ferrite core 23 through the through-hole 26a of the ferrite chip 26 and the through-hole of the O-snap ring 25. Accordingly, the ferrite core 23 having the coil 24 wound thereon and the connection member 27 which are connected to each other with the O-snap ring 25 and the ferrite chip 26 interposed therebetween can be handled as a single unitized component part.

It is to be noted that the first end 24a and the second end 24b of the coil 24 are connected to the first end portions 272a and 273a of the terminal members 272 and 273 in the recessed grooves 274 and 275 of the connection member 27, respectively, and the first end 24a and the second end 24b of the coil 24 do not contact with the inner wall face of the tubular member 50.

In the present second embodiment, a unitized part group is formed such that the connection member 27 is opposed to the second end face of the ferrite core 23, on which the coil 24 is wound, with the O-snap ring 25 and the ferrite chip 26 interposed therebetween, and the protrusion 27a formed on the end face of the connection member 27 is inserted in the recessed portion 23b of the ferrite core 23. The unitized part group is inserted into the hollow portion, in which the coil spring 22 is inserted in advance, of the tubular member 50 from the opening 50b side toward the opening 50a side. The core member 21 is force fitted in the ferrite core 23 in a state in which the distal end side of the core member 21 extends outwardly from the opening 50a of the tubular member 50. The core member 21 may be accommodated into the tubular member 50 after it is force fitted into the ferrite core 23 in advance or may be penetrated into the opening 50a of the tubular member 50 and force fitted into the ferrite core 23 after the ferrite core 23 and so forth are accommodated into the tubular member 50.

In the present second embodiment, after the connection member 27 is inserted to a predetermined position in the direction of the center axis in the tubular member 50, at which it is pressed a little into the hollow portion of the tubular member 50 against the biasing force of the coil spring 22, the tubular member 50 is caulked (constricted) at the positions 50c and 50d described hereinabove of the tubular member 50 by a predetermined jig. Consequently, the connection member 27 is fixed to the tubular member 50 so that it does not move in the direction of the center axis in the tubular member 50.

In this state, the ferrite core 23, to which the core member 21 is coupled, O-snap ring 25 and ferrite chip 26 are normally biased toward the connection member 27 side by the coil spring 22 disposed on the core member 21 side in the hollow portion of the tubular member 50. Consequently, rattling of the members which configure the position pointer is prevented.

At this time, the ring-shaped electrode conductor 272c and the circular conductor 273c which serve as connection terminals are exposed in the tubular member 50 on the end face of the connection member 27 in the tubular member 50 on the capacitor circuit 28 side.

Therefore, in the present second embodiment, in order to measure the inductance of the coil 24 in this state, a measuring jig including electrode terminals for electrically connecting to the ring-shaped electrode conductor 272c and the circular conductor 273c of the connection member 27 is inserted into the tubular member 50. This measuring jig is connected to the inductance measuring instrument so that the inductance of the coil 24 in a state in which no pressing force is applied to the core member 21 is measured.

After the inductance of the coil 24 is measured, capacitance, which cooperates with the coil 24 having the inductance to form a parallel resonance circuit to provide a desired resonance frequency, is calculated in a similar manner as in the first embodiment described hereinabove. Then, the capacitor circuit 28 whose capacitance is set equal to the calculated capacitance value is accommodated into the tubular member 50.

While the capacitor circuit 28 is configured from a first capacitor circuit 281 and a second capacitor circuit 282, it has a configuration substantially similar to that of the capacitor circuit 18 which is configured from the first capacitor circuit 181 and the second capacitor circuit 182 in the first embodiment. However, since the ring-shaped electrode conductor 272c and the circular conductor 273c are formed on the end face of the connection member 27 as shown in FIG. 10C, the first capacitor circuit 281 which configures the capacitor circuit 28 is different in that it includes terminal members of a shape different from that of the terminal members formed on the end face of the connection member 17 of the first capacitor circuit 181 shown in FIGS. 3A to 3C.

Figure 10D:
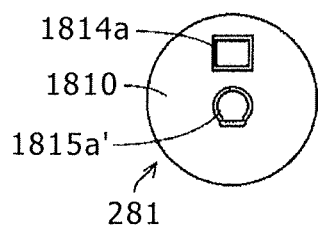

In particular, as shown in FIG. 10D, the first end 1814a of the terminal member 1814 of the first capacitor circuit 281 provided on an end face of the holder 1810 of the first capacitor circuit 281 opposing the connection member 27 has a shape corresponding to the width of the ring-shaped electrode conductor 272c of the connection member 27. However, a first end 1815a' of the terminal member 1815 has a circular shape and elastically abuts against the circular conductor 273c of the connection member 27. The configuration of the other part of the first capacitor circuit 281 is similar to that of the first capacitor circuit 181.

On an end face of the second capacitor circuit 282 opposing the ID package 320, in the present example, fitting recessed holes 2821 and 2822 for fitting with fitting protrusions 3251 and 3252 formed on an end face of the ID package 320 hereinafter described are formed (refer to FIG. 9B). The configuration of the other part of the second capacitor circuit 282 is similar to that of the capacitor circuit 182 in the first embodiment.

Figures 11A, 11B, 11C:
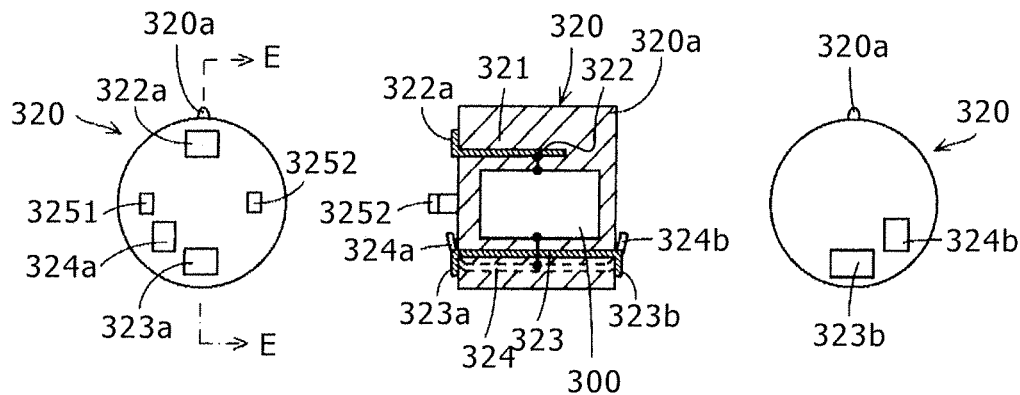
FIGS. 11A to 11C are views depicting an example of components of the electronic ink cartridge according to the second embodiment.

FIGS. 11A to 11C depict an example of a configuration of the ID package 320, and FIG. 11A is a view depicting an end face of the ID package 320 on the second capacitor circuit 282 side. FIG. 11B is a sectional view taken along line E-E of FIG. 11A. Meanwhile, FIG. 11C is a view depicting an end face of the ID package 320 on the cap 19 side.

The ID package 320 accommodates the ID transmission circuit 300 in a package 321 formed from resin of a cylindrical shape and has three terminal members 322, 323 and 324 as shown in FIG. 11B. A first end of the ID transmission circuit 300 is electrically connected to the terminal member 322, and a second end of the ID transmission circuit 300 is electrically connected to the terminal member 324.

As shown in FIG. 11A, a first end 322a of the terminal member 322 is exposed on an end face of the ID package 320 on the second capacitor circuit 282 side such that it abuts against the second end 1824b of the terminal member 1824 formed on an end face of the second capacitor circuit 282 on the ID package 320 side. Further, a first end 323a of the terminal member 323 is exposed on the end face of the ID package 320 on the second capacitor circuit 282 side such that it abuts against the second end 1826b of the terminal member 1826 formed on the end face of the second capacitor circuit 282 on the ID package 320 side. Furthermore, a first end 324a of the terminal member 324 is exposed on the end face of the ID package 320 on the second capacitor circuit 282 side such that it abuts against the second end 1825b of the terminal member 1825 formed on the end face of the second capacitor circuit 282 on the ID package 320 side.

Further, as shown in FIG. 11C, a second end 323b of the terminal member 323 and a second end 324b of the terminal member 324 are exposed to the end face of the ID package 320 on the cap 19 side. Only if the terminal member 322 is connected to the first end of the ID transmission circuit 300 in the ID package 320, then the second end thereof is included in the ID package 320 without being led out to the end face of the ID package 320 on the cap 19 side.

On a peripheral portion of the ID package 320, a protrusion 320a extending along the direction of the center axis for engaging with the groove 50f formed on the tubular member 50 on the opening 50b side and extending in the axial direction is formed. Further, in the present example, the fitting recessed holes 2821 and 2822 similar to the fitting recessed holes 1816 and 1817 (refer to FIG. 4) formed on the end face of the first capacitor circuit 181 described hereinabove are formed on the end face of the second capacitor circuit 282 on the ID package 320 side.

Further, as shown in FIGS. 11A and 11B, the fitting protrusions 3251 and 3252 for fitting with the fitting recessed holes 2821 and 2822 formed on the end face of the second capacitor circuit 282 on the ID package 320 side are formed on the end face of the ID package 320 on the second capacitor circuit 282 side. The fitting protrusions 3251 and 3252 and the fitting recessed holes 2821 and 2822 have configurations similar to those of the fitting protrusions and the fitting recessed holes for coupling of the first and second capacitor circuits 181 and 182 described hereinabove. The ID package 320 is coupled to the second capacitor circuit 282 by fitting the fitting protrusions 3251 and 3252 thereof into the fitting recessed holes 2821 and 2822 of the second capacitor circuit 282.

In this instance, the protrusion 182a of the second capacitor circuit 282 and the protrusion 320a of the ID package 320 are engaged with the groove 50f of the tubular member 50 to carry out positioning of the second capacitor circuit 282 and the ID package 320 in a peripheral direction. Consequently, the second end 1824b of the terminal member 1824, second end 1826b of the terminal member 1826 and second end 1825b of the terminal member 1825 on the end face of the second capacitor circuit 282 are abutted against and electrically connected to the first end 322a of the terminal member 322, first end 323a of the terminal member 323 and first end 324a of the terminal member 324 of the ID package 320, respectively.

Thereafter, the reduced diameter portion 195 of the cap 19 is inserted into the tubular member 50 to fit the ring-shaped protrusion 50e of the tubular member 50 into the ring-shaped grooved portion 19a of the reduced diameter portion 195 to fix the cap 19 to the tubular member 50. Consequently, the second end 324b of the terminal member 324 and the second end 323b of the terminal member 323 on the end face of the ID package 320 on the cap 19 side are connected to the first end 192a of the terminal member 192 and the first end 193a of the terminal member 193 of the cap 19, respectively. In this instance, the length of the reduced diameter portion 195 of the cap 19 in the direction of the center axis is adjusted in response to the thickness of the ID package 320 in the direction of the center axis.

The electronic ink cartridge 20 is assembled in such a manner as described above. In the present electronic ink cartridge 20, when pressing force in the direction of the center axis is applied to the core member 21, the ferrite core 23 is displaced to the ferrite chip 26 side through the O-snap ring 25 to vary the distance between the ferrite core 23 and the ferrite chip 26 thereby to vary the inductance of the coil 24. Then, similarly as in the first embodiment, the resonance frequency (phase) of an electromagnetic induction signal transmitted from the coil 24 of the resonance circuit of the position pointer varies in response to the variation of the inductance of the coil 24. Consequently, a pointed position and writing pressure by the position pointer can be detected.

Then, the electronic ink cartridge 20 is accommodated into the housing 2 similarly to the electronic ink cartridge 10 in the first embodiment.

The position pointer of the present second embodiment can achieve working-effects quite similar to those achieved by the first embodiment described hereinabove although it is different in configuration for varying the inductance of the coil for writing pressure detection from the first embodiment.

Further, in the electronic ink cartridge 20 of the present second embodiment, when the ID package 320 is accommodated into the tubular member 50 in such a manner as described above, the ID transmission circuit 300 is placed into a state in which it is connected in parallel between the opposite ends of the coil 16. It is to be noted that it is also possible to connect the ID package 320 in such a manner as to be exposed from the tubular member 50.

Information Transmission Using the ID Transmission Circuit 300

Figure 12:
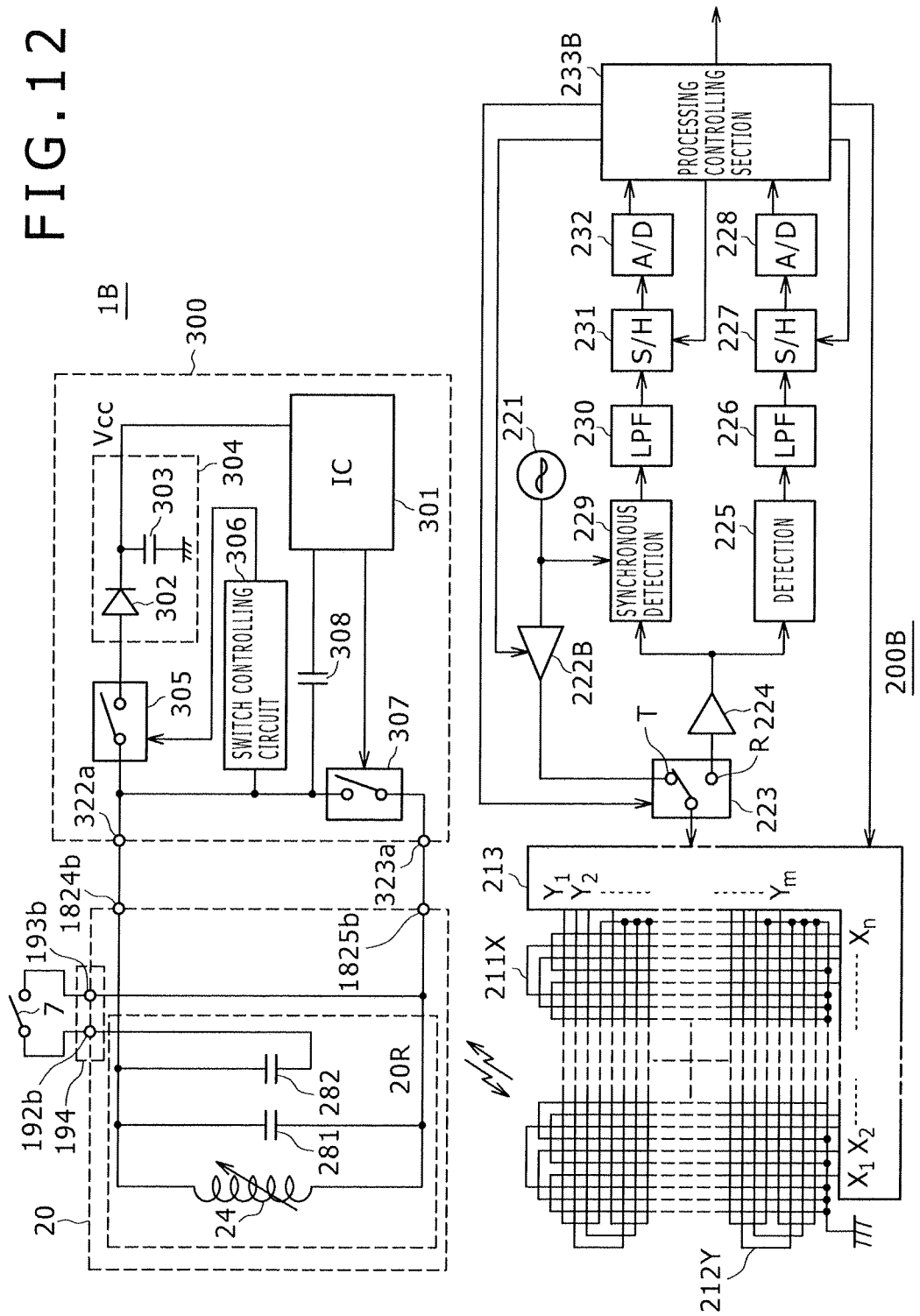
FIG. 12 is a view depicting an equivalent circuit of a position pointer which includes the electronic ink cartridge according to the second embodiment together with a position detection apparatus.

FIG. 12 is a view depicting a circuit configuration of the position pointer 1B and a position detection apparatus 200B where the configuration is adopted to allow identification information (ID) of the position pointer or an electronic ink cartridge to be transmitted to the position detection apparatus. In FIG. 12, the electronic ink cartridge 20 is depicted as a parallel resonance circuit 20R wherein the first capacitor circuit 281 is connected in parallel to the coil 24 whose inductance varies in response to the writing pressure and to which a series circuit of the second capacitor circuit 282 and the push switch 7 is connected in parallel. The push switch 7 is connected to the connector 194 of the cap 19 of the electronic ink cartridge 10 as depicted in FIG. 2.

The ID transmission circuit 300 of the position pointer 1B includes an IC (Integrated Circuit) 301 as an ID generation controlling circuit as depicted in FIG. 12. This IC 301 is configured such that it operates by a power supply voltage Vcc obtained by rectifying an AC signal received by the parallel resonance circuit 20R through an electromagnetic coupling from the position detection apparatus 200B via a rectification circuit (power supply circuit) 304 configured from a diode 302 and a capacitor 303. In the ID transmission circuit 300 of the present example, a switch circuit 305 which normally exhibits an open state (is normally open) is provided between the connection end (1824b) of the parallel resonance circuit 20R and the power supply circuit 304. The switch circuit 305 is configured, for example, from a semiconductor switch circuit and exhibits, in its open state, a high impedance state.

The switch circuit 305 is controlled so that it is switched on by a switch controlling signal from a switch controlling circuit 306. The switch controlling circuit 306 generates a switch controlling signal from an AC signal received by the parallel resonance circuit 20R through electromagnetic coupling from the position detection apparatus 200B.

Further, in the ID transmission circuit 300, a switch circuit 307 is connected in parallel to the parallel resonance circuit 20R configured from the coil 24 and the capacitor circuit 28 (281 and 282). The switch circuit 307 is configured so as to be controlled between on and off by the IC 301.

The IC 301 in the present example stores a manufacturer's number and a product number of the electronic ink cartridge 20 or the position pointer 1B and controls the switch circuit 307 between on and off to transmit an ID signal including the manufacturer's number and the product number, for example, as a digital signal of 8 bits to the position detection apparatus 200B.

On the other hand, the position detection apparatus 200B of the example of FIG. 12 is configured such that it includes a current driver 222B, whose gain can be variably adjusted by a gain controlling signal from the outside, in place of the current driver 222 whose gain is fixed in the configuration of the position detection apparatus 200 depicted in FIG. 7. The position detection apparatus 200B is further configured such that it includes a processing controlling section 233B in place of the processing controlling section 233 in the configuration of the position detection apparatus 200. The other components of the position detection apparatus 200B are quite similar to those of the position detection apparatus 200 described hereinabove with reference to FIG. 7.

The current driver 222B is configured such that it receives a gain controlling signal from the processing controlling section 233B to vary the signal level of the transmission signal.

Further, the processing controlling section 233B is configured, for example, of a microcomputer. The processing controlling section 233B transfers an electromagnetic induction signal to and from the position pointer 1B to carry out detection of a position pointed to by the position pointer 1B and detection of writing pressure applied to the position pointer 1B similarly to the processing controlling section 233 described hereinabove. In addition, the processing controlling section 233B supplies a signal for transmission signal level control to the current driver 222B and supplies an on/off controlling signal for controlling the transmission signal between on and off to the switch circuit 307. Further, the processing controlling section 233B carries out a reception process of an ID signal from the position pointer 1B. The processing controlling section 233B detects the on/off signal from the position pointer 1B as a digital signal of several bits, for example, 8 bits, to detect an ID signal as hereinafter described.

In the following, transfer of an ID signal between the position pointer 1B and the position detection apparatus 200B and a position detection operation and a writing pressure detection operation are described. FIG. 13 is a flow chart illustrating processing operation of the IC 301 of the position pointer 1B. As hereinafter described, the process is started when the switch circuit 305 is switched on and the power supply voltage Vcc is supplied from the power supply circuit 304 to the IC 301.

In a state in which the switch circuit 305 is off and the power supply voltage Vcc is not supplied from the power supply circuit 304 to the IC 301, operation of the IC 301 is stopped. At this time, as viewed from the connection end to the parallel resonance circuit 20R, in the present example, as viewed from the second terminal 1824b of the terminal member 1824 and the second end 1825b of the terminal member 1825 of the second capacitor circuit 182 of the capacitor circuit 18, the ID transmission circuit 300 exhibits a high impedance state. This is equivalent to a state in which substantially nothing is connected to the connection end to the parallel resonance circuit 20R. Accordingly, at this time, a capacitance component is not connected in parallel to the parallel resonance circuit 20R, and the resonance frequency of the parallel resonance circuit 20R is not influenced by the ID transmission circuit 300. It is to be noted that an electromagnetic induction signal transmitted from the position detection apparatus 200B is supplied as a synchronizing signal for transfer of an electromagnetic induction signal to and from the position detection apparatus 200B to the IC 301 through a capacitor 308.

FIG. 14 is a flow chart illustrating processing operation of the processing controlling section 233B of the position detection apparatus 200B. When power is supplied to the position detection apparatus 200B, the processing of FIG. 14 is executed repetitively.

In particular, the processing controlling section 233B first supplies a gain controlling signal for increasing the signal level of a transmission signal to the current driver 222B. Consequently, the AC signal of the frequency f0 from the oscillator 221 is set to a high level by the current driver 222B and supplied to the loop coil groups 211X and 212Y through the selection circuit 213 (step S21 of FIG. 14).

In the position pointer 1B, the electromagnetic induction signal in the form of the AC signal of the high level from the position detection apparatus 200B is received by the parallel resonance circuit 20R. At this time, in response to the high signal level of the AC signal from the position detection apparatus 200B, the switch controlling circuit 306 generates a switch controlling signal for switching "on" the switch circuit 305 based on the AC signal received by the parallel resonance circuit 20R. If the switch circuit 305 is switched "on" in accordance with the switch controlling signal, then the power supply voltage Vcc generated by rectifying the AC signal received by the parallel resonance circuit 20R is supplied from the power supply circuit 304 to the IC 301.

When the power supply voltage Vcc is supplied to the IC 301, the IC 301 starts operation. The IC 301 generates an ID signal including a manufacturer's number and a product number of the electronic ink cartridge 20 as a digital signal. The electromagnetic induction signal when the switch circuit 307 is controlled between on and off by the digital signal is transmitted from the position pointer 1B to the position detection apparatus 200B (step S11 of FIG. 13).

In particular, when the switch circuit 307 is off, the parallel resonance circuit 20R can carry out a resonance operation by the AC signal transmitted thereto from the position detection apparatus 200B and send back the electromagnetic induction signal to the position detection apparatus 200B. The loop coil of the position detection apparatus 200B receives the electromagnetic induction signal from the parallel resonance circuit 20R of the position pointer 1B. On the other hand, when the switch circuit 307 is on, the parallel resonance circuit 20R is placed into a state in which the resonance operation with the AC signal from the position pointer 1B is inhibited. Therefore, the electromagnetic induction signal is not sent back from the parallel resonance circuit 20R to the position detection apparatus 200B, and the loop coil of the position detection apparatus 200B does not receive any signal from the position pointer 1B.

In the present example, the processing controlling section 233B of the position detection apparatus 200B carries out detection of presence or absence of a reception signal from the position pointer 1B repetitively eight times to receive a digital signal of 8 bits. In particular, at step S21, the processing controlling section 233B controls the gain of the current driver 222B to establish a state in which the transmission signal is signaled with the signal level thereof set high and successively carries out transmission and reception eight times at timings similar to that used for coordinate detection in order to detect the ID signal of 8 bits from the position pointer 1B.

On the other hand, the IC 301 of the position pointer 1B generates a digital signal of 8 bits corresponding to an ID signal to be transmitted and controls the switch circuit 307 between on and off in synchronism with transmission and reception of the electromagnetic induction signal to and from the position detection apparatus 200B in response to a digital signal of 8 bits. For example, when a bit of the ID signal is "1," the switch circuit 307 is switched on. Consequently, as described hereinabove, the electromagnetic induction signal is not sent back from the position pointer 1B to the position detection apparatus 200B as described hereinabove. On the other hand, if the bit of the ID signal is "0," then the switch circuit 307 is switched off. Consequently, the electromagnetic induction signal is sent back from the position pointer 1B to the position detection apparatus 200B as described hereinabove.

Accordingly, the processing controlling section 233B of the position detection apparatus 200B can carry out detection of presence or absence of a reception signal from the position pointer 1B successively by eight times to receive an ID signal in the form of a digital signal of 8 bits.

The processing controlling section 233B of the position detection apparatus 200B carries out such processing as described above to determine whether or not an ID signal from the position pointer 1B is received (step S22). If the processing controlling section 233B determines that an ID signal has not been able to be received in a predetermined period of time, then the processing returns to step S21 to carry out transmission of a transmission signal of a high level repetitively by a predetermined number of times. It is to be noted that, when an ID signal has not been able to be received even if the processing controlling section 233B carries out the reception process of an ID signal repetitively by the predetermined number of times, the processing controlling section 233B determines that the position pointer 1B does not have a function of signaling an ID signal. Thus, the processing controlling section 233B skips the reception process of an ID signal.

Then, if it is determined at step S22 that an ID signal is received, then the processing controlling section 233B lowers the gain of the current driver 222B to lower the signal level of the transmission signal to a predetermined level (normal use level) lower than the high level at step S21, then transmit the transmission signal (step S23). The predetermined level at this time is a level, at which detection of a pointed position and detection of writing pressure by the position pointer 1B can be carried out through cooperation with the parallel resonance circuit 20R of the position pointer 1B but at which the switch controlling circuit 306 of the position pointer 1B cannot switch "on" the switch circuit 305.

If the signal level of the electromagnetic induction signal transmitted from the position detection apparatus 200B is set to the predetermined level (normal use level) in this manner, then the switch controlling circuit 306 of the position pointer 1B does not output a switch controlling signal for switching on the switch circuit 305. Therefore, supply of the power supply voltage Vcc from the power supply circuit 304 to the IC 301 stops, and the IC 301 is disabled. Consequently, the processing of the flow chart of FIG. 13 is ended and the position pointer 1B stops the transmission of the ID signal.

However, the state in which the signal level of the electromagnetic induction signal transmitted from the position detection apparatus 200B is set to the predetermined level (normal use state) is a state quite similar to that in the case of FIG. 7. Therefore, the processing controlling section 233B of the position detection apparatus 200B carries out a process of transferring the electromagnetic induction signal to and from the parallel resonance circuit 20R of the position pointer 1B to detect a pointed position and writing pressure by the position pointer 1B in such a manner as described hereinabove in connection with the first embodiment (step S24).

Then, the processing controlling section 233B monitors sending back of the electromagnetic induction signal from the parallel resonance circuit 20R of the position pointer 1B and determines whether or not a state in which the position pointer 1B cannot be detected is established based on that sending back of the electromagnetic induction signal disappears (step S25). If it is determined at step S25 that the position pointer 1B has been able to be detected, then the processing controlling section 233B returns the processing to step S24. On the other hand, if it is determined at step S25 that it has become impossible to detect the position pointer 1B, then the processing controlling section 233B returns the processing to step S21. At step S21, a gain controlling signal for setting the signal level of the transmission signal to the high level is supplied to the current driver 222B so that the signal level of the transmission signal to be supplied to the loop coil groups 211X and 212Y is set to the high level. Then, the processing controlling section 233B repeats the processes of the steps beginning with step S21.

With the second embodiment described hereinabove with reference to FIGS. 11A to 14, an ID signal for identifying the electronic ink cartridge 20 or the position pointer 1B can be transmitted from the position pointer 1B to the position detection apparatus 200B. Accordingly, in an electronic apparatus which includes the position detection apparatus 200B, by detecting the ID signal of the electronic ink cartridge 20 or the position pointer 1B, a predetermined process corresponding to the particular electronic ink cartridge or the position pointer can be allocated. This is very convenient. Further, there is a merit that, by detecting the ID signal of the electronic ink cartridge 20 or the position pointer 1B, management of a failure or the like of the electronic ink cartridge 20 or the position pointer 1B is facilitated.

Besides, if the position detection apparatus 200B starts its operation, then it urges the position pointer 1B to transmit an ID signal provided by the position pointer 1B. If an ID signal is received once, then operation control is carried out such that the ID transmission circuit 300 is electrically disconnected from the resonance circuit of the position pointer 1B and detection of a pointed position and detection of writing pressure by the position pointer 1B are carried out in a normal use state. Further, also when it is determined that an ID signal cannot be received even if the position pointer 1B is urged by a predetermined number of times to transmit an ID signal provided therefor, operation control is carried out such that detection of a pointed position and detection of writing pressure by the position pointer 1B can be carried out in a normal use state. Accordingly, also where a position pointer 1B which does not have a transmission function of an ID signal is used, a special processing operation is unnecessary, and an operation can be carried out free from a sense of discomfort.

It is to be noted that, in the example described above, when an electromagnetic induction signal of the high level from the position detection apparatus 200B is received by the parallel resonance circuit 20R, the switch controlling circuit 306 of the position pointer 1B generates a switch controlling signal for switching "on" the switch circuit 305 based on the received electromagnetic induction signal of the high level. Then, the power supply voltage Vcc is supplied to the IC 301 in response to the switch controlling signal.

However, the method by which the switch controlling circuit 306 of the position pointer 1B switches on the switch circuit 305 to supply the power supply voltage Vcc to the IC 301 is not limited to such a method as described above.

For example, as another example, it is also possible to adopt such a configuration that a predetermined digital signal is sent from the position detection apparatus 200B to the position pointer 1B so that the switch controlling circuit 306 receiving this digital signal generates a switch controlling signal for switching on the switch circuit 305.

In particular, for example, when the position detection apparatus 200B fails to detect the presence of the position pointer 1B because it cannot detect a pointed position by the position pointer 1B, the position detection apparatus 200B signals the predetermined digital signal as an electromagnetic induction signal through the loop coil groups 211X and 212Y. The parallel resonance circuit 20R of the position pointer 1B receives the electromagnetic induction signal which has a signal-envelope corresponding to the digital signal and supplies the received electromagnetic induction signal to the switch controlling circuit 306.

The switch controlling circuit 306, for example, waveform-shapes this signal to envelope-detect the signal to extract the digital signal. Then, the switch controlling circuit 306 generates a switch controlling signal for switching on the switch circuit 305 when the digital signal coincides with a digital signal set in advance. The power supply voltage Vcc is supplied to the IC 301 in accordance with the switch controlling signal.

The IC 301 starts operation in response to turning on of the power supply voltage Vcc and sends an ID signal of the position pointer 1B to the position detection apparatus 200B through the parallel resonance circuit 20R. When the ID signal is received, the position detection apparatus 200B stops the signaling of the predetermined digital signal and changes the operation mode from the ID signal detection mode to the normal use mode, in which a pointed position by the position pointer 1B is detected so that a detection operation of the pointed position by the position pointer 1B is carried out. If it has become impossible to receive the predetermined digital signal, then the switch controlling circuit 306 of the position pointer 1B switches off the switch circuit 305 to stop the supply of the power supply voltage Vcc to the IC 301. Consequently, the signaling of the ID signal is stopped, and the ID transmission circuit 300 is placed into a high impedance state, in which the ID transmission circuit 300 is electrically disconnected from the connection end to the parallel resonance circuit 20R.

It is to be noted that, when the position pointer 1B cannot be detected any more, the position detection apparatus 200B resumes outputting the predetermined digital signal.

It is to be noted that, since it is only necessary for the ID transmission circuit 300 to be connected in parallel to the coil 24, the ID package 320 need not be provided between the capacitor circuit 28 and the cap 19. For example, the ID transmission circuit 300 may be provided between the connection member 27 and the capacitor circuit 28.

Further, a different connector connected to the second end 1824b of the terminal member 1824 and the second end 1825b of the terminal member 1825 of the second capacitor circuit 282 may be provided on the cap 19 in addition to the connector 194. Meanwhile, a circuit section similar to the ID package which includes the ID transmission circuit 300 is provided in the different connector outside the tubular member 50.

Third Embodiment

In the first and second embodiments described above, the pressure sensor is configured such that the inductance, which forms a resonance circuit, varies in response to pressure applied to the core member. In contrast, in a third embodiment to be described below, the pressure sensor is configured such that the capacitance of the capacitor, which forms a resonance circuit, varies in response to pressure applied to the core member. Further, in the position pointer of the present third embodiment, the pressure sensor wherein the capacitance varies in response to pressing force applied to the core member is configured from a pressure sensing semiconductor device of the capacitive type which is manufactured in accordance with a MEMS (Micro Electronic Mechanical System) technology.

FIGS. 15A and 15B are views depicting an example of a configuration of an electronic ink cartridge 30 of a position pointer of the present third embodiment. FIG. 15A is a sectional view depicting an internal configuration of the electronic ink cartridge 30. Meanwhile, FIG. 15B is an exploded perspective view depicting a general configuration of the electronic ink cartridge 30. It is to be noted that, also in the present example, for the convenience of description, some of the internal component parts of a tubular member 5' of the electronic ink cartridge 30 are not depicted in cross-section in FIG. 15A.

Further, the configuration of the housing of the position pointer of the present third embodiment and the attachment structure of the push switch 7 to the housing are similar to those in the first embodiment, and therefore, illustration and description of them are omitted. Further, also in the description of the present third embodiment, like components to those in the first embodiment are denoted by like reference symbols, and description of them is omitted.

The tubular member 5' is configured from a first tubular member 5C and a second tubular member 5D as two separate members separate from each other in the direction of the center axis similarly as in the first embodiment. The first tubular member 5C and the second tubular member 5D have a narrow shape having an outer diameter of, for example, 2.5 mm and an inner diameter of, for example, 1.5 mm to 2 mm. Further, the tubular member 5' is configured from a material of a nonmagnetic substance such as a nonmagnetic metal, a resin material, glass or ceramics, in the present example, from a material having conductivity such as, for example, SUS305 or SUS310S.

The first tubular member 5C has a configuration similar to that of the first tubular member 5A of the first embodiment described hereinabove. In particular, on a first end side of the first tubular member 5C in the direction of the center axis, an opening 5Ca for allowing a distal end of a core member 31 to extend outwardly therethrough is provided. Further, in an opening 5Cb on the second end side of the first tubular member 5C, a threaded portion 5Cc for being screwed with the second tubular member 5D is formed. Also the second tubular member 5D has a configuration similar to that of the second tubular member 5B in the first embodiment described hereinabove. In particular, at an opening portion on the first end side of the second tubular member 5D, a threaded portion 5Da for being screwed with the first tubular member 5C is formed. Further, on the second end side of the second tubular member 5D, a cut-out 5Db is formed in the direction of the center axis and a ring-shaped protrusion 5Dc for being screwed with a ring-shaped grooved portion 19a formed on a reduced diameter portion 19b of a cap 19C is formed.

As depicted in FIGS. 15A and 15B, also in the electronic ink cartridge 30 of the present third embodiment, principal parts which form the position pointer of the electromagnetic induction type are all accommodated in the tubular member 5'. However, as shown in FIGS. 15A and 15B, a coil spring 32, the core member 31, a pressure sensing semiconductor device 35, a ferrite core 34 as an example of a magnetic member on which a coil 33 is wound and a connection member 36 are juxtaposed in order as viewed from the opening 5Ca side and accommodated in the first tubular member 5C, and a capacitor circuit 18C is accommodated in the second tubular member 5D in such a state that the directions of the center axes of the parts coincide with the direction of the center axis of the first tubular member 5C and the second tubular member 5D. Further, the cap 19C is inserted in the opening on the second end side of the second tubular member 5D to close up the opening of the tubular member 5'. The capacitor circuit 18C is configured from a first capacitor circuit 181C and a second capacitor circuit 182C and is configured quite similarly to the capacitor circuit 18 in the first embodiment except that it has s smaller diameter than that of the capacitor circuit 18 in the first embodiment.

It is to be noted that, in the present third embodiment, at a point of time at which the coil spring 32, core member 31, pressure sensing semiconductor device 35, ferrite core 34 on which the coil 33 is wound and connection member 36 are accommodated into the first tubular member 5C, a side peripheral face position of the first tubular member 5C corresponding to a side peripheral face of the connection member 36 is constricted (caulked) in the direction of the center axis to form protrusions 5Cd and 5Ce on an inner peripheral face of the first tubular member 5C, so that the connection member 36 is pressure contacted with and bound by the first tubular member 5C to restrict the position of the connection member 36 so as not to move in the direction of the center axis. Then, the pressure sensing semiconductor device 35 and the ferrite core 34 on which the coil 33 is wound are prevented from rattling in the direction of the center axis by biasing force of the coil spring 32 disposed between the opening 5Ca side of the first tubular member 5C and the pressure sensing semiconductor device 35.

Thereafter, similarly as in the first embodiment described hereinabove, the capacitor circuit 18C is coupled to the connection member 36 and the second tubular member 5D is screwed with and coupled to the first tubular member 5C, and then the opening at the second end of the second tubular member 5D is closed up with the cap 19C.

Configuration of the components accommodated in the inside of the tubular member 5' and assembly of the electronic ink cartridge 30 as well as adjustment of the resonance frequency are described furthermore.

The core member 31 in the present third embodiment is configured of a rod-like member made of, for example, resin as depicted in FIGS. 15A and 15B. Further, in the present third embodiment, the core member 31 is inserted as a pressing member into the pressure sensing semiconductor device 35.

The ferrite core 34 has a cylindrical shape having, in the present third embodiment, a fixed diameter, and the coil 33 is wound on the ferrite core 34. A recessed portion 352 is provided on a bottom face 351b side of a package member 351 of the pressure sensing semiconductor device 35 on the opposite side from an upper face 351a into which the core member 31 is inserted, and a first end side of the ferrite core 34 in the direction of the center axis is fitted into the recessed portion 352.

Further, a second end side of the ferrite core 34 in the direction of the center axis is fitted with and coupled to the connection member 36 made of, for example, resin. A recessed hole 34a into which a protrusion 361 of the connection member 36 is to be fitted is formed at the center of an end face of the ferrite core 34 on the connection member 36 side.

Example of the Configuration of the Pressure Sensing Semiconductor Device 35

The position pointer of the present third embodiment detects writing pressure as a variation of the capacitance of a capacitor, which forms a resonance circuit together with a coil as described hereinabove. The position pointer of the present third embodiment uses a semiconductor device (pressure sensing chip) fabricated in accordance with a MEMS technology and proposed formerly in Japanese Patent Application No. 2012-015254 co-assigned to the applicant of the present invention as a pressure sensor whose capacitance varies in response to writing pressure.

The pressure sensing semiconductor device 35 is configured such that a pressure sensing chip 400 is accommodated in the package member 351 made of, for example, resin in such a state that the pressure sensing chip 400 can be pressed by a pressing member from the outside. The pressing member is called, in the present example, core member 31. The pressure sensing semiconductor device 35 of the present example has an integrated structure wherein the pressure sensing semiconductor device 35 removably holds the core member 31, and the ferrite core 34 on which the coil 33 is wound is held by the package member 351.

FIGS. 16A and 16B are views depicting a configuration of the pressure sensing semiconductor device 35 of the present example. FIG. 16A is a vertical sectional view of the pressure sensing semiconductor device 35. Meanwhile, FIG. 16B is a view depicting the pressure sensing chip 400 accommodated in the pressure sensing semiconductor device 35.

The pressure sensing semiconductor device 35 is made of a resin material which has elasticity and is an electric insulating material, for example, silicon rubber. The pressure sensing semiconductor device 35 is configured such that the pressure sensing chip 400 is sealed in the package member 351, for example, of a cylindrical shape.

The pressure sensing chip 400 of the present example is formed from a first electrode 401, a second electrode 402, and an insulating layer (dielectric layer) 403 between the first electrode 401 and the second electrode 402 as depicted in FIG. 16B. The first electrode 401 and the second electrode 402 are configured from a conductor made of single crystal silicon (Si). The insulating layer 403 is configured from an insulating film formed from, in the present example, an oxide film ($SiO_2$).

A recessed portion 404 of, for example, a circular shape is formed on the insulating layer 403, and a space 405 is formed between the insulating layer 403 and the first electrode 401. A bottom face of the recessed portion 404 is formed as a flat face and has a diameter R of, for example, R=1 mm. The depth of the recessed portion 404 is, in the present example, approximately several tens of microns to several hundreds of microns. If the first electrode 401 is pressed from a face 401a side, then it can be displaced so as to be deflected toward the space 405.

The pressure sensing chip 400 having such a configuration as described above is a capacitor by which a capacitance Cv is formed between the first electrode 401 and the second electrode 402. If pressure P is applied to the first electrode 401 from the face 401a side of the first electrode 401 as depicted in FIG. 16B, then the first electrode 401 is deflected as indicated by a broken line in FIG. 16B. Thereupon, the distance between the first electrode 401 and the second electrode 402 decreases to increase the capacitance Cv. The deflection amount of the first electrode 401 varies in response to the magnitude of the pressure P applied. Accordingly, the capacitance Cv varies in response to the magnitude of the pressure P applied to the pressure sensing chip 400. The pressure can be detected based on the variation of the capacitance Cv.

In the pressure sensing semiconductor device 35 in the present embodiment, the pressure sensing chip 400 having such a configuration as described above is accommodated in the package member 351 in a state in which the face 401a of the first electrode 401 upon which the pressure acts is opposed to the upper face 351a of the package member 351 in FIG. 16A.

A communication hole 353 having, for example, a circular cross section is formed in the package member 351 such that it extends from the upper face 351a to a location in the proximity of the face 401a of the first electrode 401. Into the communication hole 353, the core member 31 is inserted as a pressing member for pressing the pressure sensing chip 400 as depicted in FIG. 15A and FIG. 16A. A tapered portion 351c is formed on an opening portion side (upper face 351a side) of the communication hole 353 of the package member 351, and an opening of the communication hole 353 has a trumpet shape so that the core member 31 as a pressing member can be easily inserted into the communication hole 353.

Further, as shown in FIG. 16A, protrusions 354a and 354b of a shape of an O-snap ring for holding the core member 31 of a shape of a round rod are provided on an inner wall face of the communication hole 353. In this instance, the inner diameter of the communication hole 353 is equal to or a little larger than the diameter of a contacting portion of the core member 31. Meanwhile, the inner diameter of the protrusions 354a and 354b in the shape of an O-snap ring is selected smaller than the diameter of the contacting portion of the core member 31.

Accordingly, when the core member 31 is inserted into the communication hole 353 under the guidance of the tapered portion 351c provided on the opening side (upper face 351a side) of the package member 351, it is retained by the protrusions 354a and 354b of a shape of an O-snap ring. However, the core member 31 can be pulled out from the communication hole 353 by predetermined force. Accordingly, the core member 31 can be readily exchanged.

The first electrode 401 of the pressure sensing chip 400 is connected to a first lead terminal 356 formed of a conductor by a gold wire 355, and the second electrode 402 contacts with and is connected to a second lead terminal 357 formed of a conductor. In the present third embodiment, distal end portions of the first and second lead terminals 356 and 357 are led out such that they extend perpendicularly to the bottom face 351b of the package member 351 as depicted in FIGS. 16A and 16B.

On the bottom face 351b of the package member 351, the circular recessed portion 352 having a diameter substantially equal to the diameter of the ferrite core 34 is formed. The depth of the recessed portion 352 is set such that a first end portion of the ferrite core 34, on which the coil 33 is wound, in the direction of the center axis is fitted in the recessed portion 352. The ferrite core 34 is inserted into the recessed portion 352 and coupled to the package member 351, for example, by bonding agent. The first and second lead terminals 356 and 357 are led out from a periphery of the recessed portion 352 through the bottom face 351b.

The first lead terminal 356 and the second lead terminal 357 are electrically connected to terminal members 362 and 363 of the connection member 36 by gold wires, lead wires or the like as hereinafter described. Also, a first end 33a and a second end 33b of the coil 33 wound on the ferrite core 34 are electrically connected to the terminal members 362 and 363 of the connection member 36, respectively.

An example of a configuration of the connection member 36 is depicted in FIGS. 17A to 17C. FIG. 17A is a view of the connection member 36 as viewed from the side on which the connection member 36 is coupled to the ferrite core 34 in the direction of the center axis of the connection member 36. FIG. 17B is a sectional view taken along line F-F of FIG. 17A, and FIG. 17C is a view depicting an end face of the connection member 36 as viewed from the capacitor circuit 18C side in the direction of the center axis of the connection member 36.

As described hereinabove, the connection member 36 includes a main body portion 360 made of an electric insulating material such as, for example, resin and having a cylindrical shape of an outer diameter equal to the inner diameter of the first tubular member 5C. As depicted in FIGS. 17A and 17B, a recessed hole 364, into which part of the cylindrical portion of the ferrite core 34 is to be fitted, is provided on an end face of the main body portion 360 of the connection member 36 on the side on which the main body portion 360 is coupled to the ferrite core 34. Further, the protrusion 361, which fits with the recessed hole 34a formed on an end face of the ferrite core 34, is formed at the center of the bottom face of the recessed hole 364.

Further, as shown in FIGS. 17A and 17B, recessed grooves 365 and 366 extending in the direction of the center axis of the cylinder are formed at positions of a peripheral side face of the main body portion 360 of the connection member 36 spaced by an angular distance of 180 degrees from each other. In the recessed grooves 365 and 366, first end portions 362a and 363a of the terminal members 362 and 363 are erected in a direction perpendicular to the peripheral direction, respectively. At the first end portions 362a and 363a of the terminal members 362 and 363 in the erected state, V-shaped notches 362c, 362d and 363c, 363d are formed as depicted in FIG. 17A, respectively.

The V-shaped notches 362c and 362d of the terminal member 362 are provided for connection of the first electrode 401 of the pressure sensing chip 400 of the pressure sensing semiconductor device 35 and the first end 33a of the coil 33. Meanwhile, the V-shaped notches 363c and 363d of the terminal member 363 are provided for connection of the second electrode 402 of the pressure sensing chip 400 of the pressure sensing semiconductor device 35 and the second end 33b of the coil 33.

On an end face of the main body portion 360 of the connection member 36 on the connection side to the capacitor circuit 18C, a recessed portion 368 into which part of the capacitor circuit 18C is to be fitted is provided as shown in FIG. 17B. On a side peripheral face of the recessed portion 368, a ring-shaped recessed groove 368a, into which a ring-shaped protrusion 181Ca (refer to FIG. 15B) formed on a peripheral portion of the first capacitor circuit 181C of the capacitor circuit 18C is to be fitted, is formed.

Further, on a bottom face of the recessed portion 368, a ring-shaped electrode conductor 362b is formed as shown in FIGS. 17B and 17C as a second end portion of the terminal member 362 of the connection member 36. This ring-shaped electrode conductor 362b meshes with a first end 1814a of a terminal member 1814 of the first capacitor circuit 181C of the capacitor circuit 18 (refer to FIG. 4).

Further, a recessed hole 367 is formed at the center of the bottom face of the recessed portion 368 of the connection member 36 in a state displaced from the ring-shaped electrode conductor 362b. A second end portion 363b of the terminal member 363 of the connection member 36 is formed such that it is positioned in the recessed hole 367, and a bent portion of the second end portion 363b of the terminal member 363 having elasticity positioned in the recessed hole 367 defines an insertion hole 363e. A first end 1815a of a rod-shaped terminal member 1815 of the first capacitor circuit 181C of the capacitor circuit 18C is inserted in the insertion hole 363e and connected to the second end portion 363b of the terminal member 363.

The connection member 36 is coupled by adhesion to the ferrite core 34, for example, by bonding agent in a state in which the protrusion 361 is fitted in the recessed hole 34a on the end face of the ferrite core 34. Further, lead wires connected to the first and second lead terminals 356 and 357 connected to the first electrode 401 and the second electrode 402 of the pressure sensing chip 400 of the pressure sensing semiconductor device 35 are inserted and connected to the V-shaped notch 362c or 362d of the first end portion 362a of the terminal member 362, and the V-shaped notch 363c or 363d of the first end portion 363a of the terminal member 363 of the connection member 36, respectively. Further, the first end 33a and the second end 33b of the coil 33 are inserted and connected to the V-shaped notch 362c or 362d of the first end portion 362a of the terminal member 362, and the V-shaped notch 363c or 363d of the first end portion 363a of the terminal member 363 of the connection member 36, respectively.

In this manner, in the present third embodiment, the pressure sensing semiconductor device 35, ferrite core 34 on which the coil 33 is wound and connection member 36 are coupled to each other so that they can be handled as a single unitized component part.

Further, in the present third embodiment, the coil spring 32 is inserted into the hollow portion of the first tubular member 5C from the opening 5Cb side, which is opposite from the opening 5Ca side, toward the opening 5Ca side. Then, an integrated component part, in which the pressure sensing semiconductor device 35, ferrite core 34 on which the coil spring 33 is wound and connection member 36 are connected into a single unit, is inserted such that the first end side of the coil spring 32 is abutted against the upper face 351a of the pressure sensing semiconductor device 35. The core member 31 may be inserted and fitted into the pressure sensing semiconductor device 35 in advance and then accommodated into the first tubular member 5C or may be inserted and fitted into the pressure sensing semiconductor device 35 from the opening 5Ca side later.

It is to be noted that the first electrode 401 and the second electrode 402 of the pressure sensing chip 400 of the pressure sensing semiconductor device 35 and the first end 33a and the second end 33b of the coil 33 are connected, for example, to the first end portions 362a and 363a of the terminal members 362 and 363 in the recessed grooves 365 and 366 of the connection member 36, respectively. Therefore, lead portions of the first electrode 401 and the second electrode 402 of the pressure sensing chip 400 and the first end 33a and the second end 33b of the coil 33 do not contact with the inner wall face of the first tubular member 5C.

To the connection member 36 accommodated in the first tubular member 5C in such a manner as described above, the coil 33 and the capacitor circuit 18C, which configures a parallel resonance circuit together with a capacitor formed of the pressure sensing chip 400, are connected as hereinafter described. The capacitance of the capacitor circuit 18C is set to a predetermined value as hereinafter described.

In this instance, part of the first capacitor circuit 181C of the capacitor circuit 18C is accommodated into the recessed portion 368 of the connection member 36 and the ring-shaped protrusion 181Ca of the first capacitor circuit 181C is fitted into the ring-shaped recessed groove 368a of the recessed portion 368 to couple the capacitor circuit 18C to the connection member 36. In this coupled state, the first end 1814a of the terminal member 1814 of the first capacitor circuit 181C is abutted against and electrically connected to the ring-shaped electrode conductor 362b at the second end portion of the terminal member 362 of the connection member 36. Further, the rod-like first end 1815a of the terminal member 1815 of the first capacitor circuit 181C is inserted into the insertion hole 363e of the terminal member 363 of the connection member 36 and electrically connected to the second end portion 363b.

Then, the capacitor circuit 18C is accommodated into the inside of the second tubular member 5D. Further, the threaded portion 5Da formed on the inner wall face of the opening on the first end side of the second tubular member 5D and the threaded portion 5Cc formed on an outer peripheral side face of the opening 5Cb of the first tubular member 5C are screwed with each other to form an integrated tubular member 5'.

Then, the reduced diameter portion 195 of the cap 19C is fitted into the second tubular member 5D to engage the protrusion 19c with the positioning groove 5Db. At this time, in the present third embodiment, part of the second capacitor circuit 182C of the capacitor circuit 18C is inserted into a recessed portion 198 provided on the reduced diameter portion 195 of the cap 19C to establish electric connection between them.

Figure 18A:
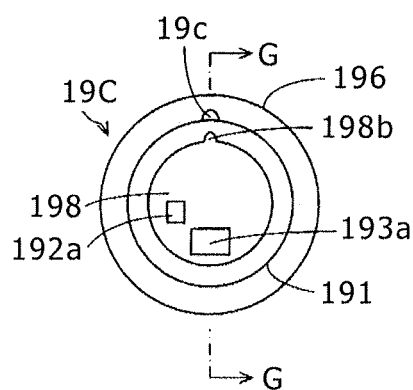
FIGS. 18A to 18C are views depicting an example of components of the electronic ink cartridge according to the third embodiment.
Figure 18B:
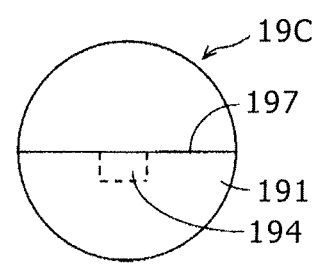
Figure 18C:
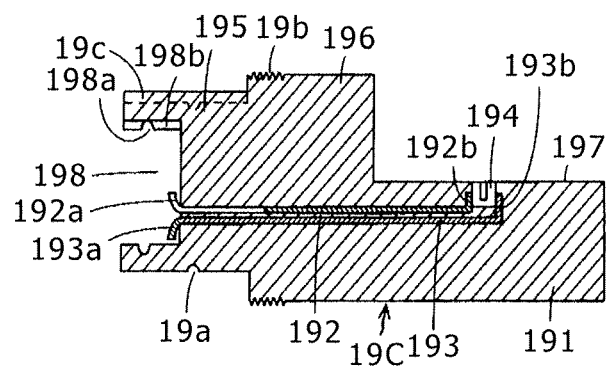

An example of the configuration of the cap 19C in the present third embodiment is depicted in FIGS. 18A to 18C. FIG. 18A is a view of the cap 19C as viewed from the face side opposing the capacitor circuit 18C, and FIG. 18B is a view of the cap 19C as viewed from the side opposite from the face side opposing the capacitor circuit 18C. FIG. 18C is a sectional view taken along line G-G of FIG. 18A.

The cap 19C has a configuration similar to that of the cap 19 in the first embodiment. However, the cap 19C is different in configuration of the connection portion to the capacitor circuit 18C having a diameter smaller than that of the capacitor circuit 18 in the first embodiment. In FIGS. 18A to 18C, like components to those of the cap 19 in the first embodiment are denoted by like reference symbols.

In particular, on an end face of the reduced diameter portion 195 of the cap 19C in the present third embodiment opposing the second capacitor circuit 182C, the recessed portion 198, into which part of the second capacitor circuit 182C of the capacitor circuit 18C is to be fitted, is formed as depicted in FIGS. 18A and 18C. The recessed portion 198 is a circular recessed hole of a diameter substantially equal to the diameter of the second capacitor circuit 182C. On a side wall of the recessed portion 198, a ring-shaped recessed groove 198a, into which a ring-shaped protrusion 182b of the second capacitor circuit 182C is to be fitted, is formed and a center axis direction recessed groove 198b, into which a center axis direction protrusion 182a formed on the second capacitor circuit 182C is to be fitted, is formed.

Further, on a bottom face of the recessed portion 198 of the cap 19C, the first end portions 192a and 193a of the terminal members 192 and 193 are provided in an exposed relationship such that they are elastically abutted against the second end 1825b of the terminal member 1825 and the second end 1826b of the terminal member 1826 on the end face of the second capacitor circuit 182C. The second end 192b of the terminal member 192 is connected to the first end of the connector 194 similarly as in the first embodiment, and the second end 193b of the terminal member 193 is connected to the second end of the connector 194.

The reduced diameter portion 195 of the cap 19C configured in such a manner as described above is inserted into the second tubular member 5D such that the protrusion 19c is engaged with the positioning groove 5Db and the protrusion 182a of the second capacitor circuit 182C is engaged with the groove 198b of the recessed portion 198 of the cap 19C. Consequently, the ring-shaped grooved portion 19a of the cap 19C and the ring-shaped protrusion 5Dc of the second tubular member 5D are fitted with each other to lock the cap 19C in the second tubular member 5D. At this time, an end portion of the second capacitor circuit 182C is inserted into the recessed portion 198 of the cap 19C, and the ring-shaped protrusion 182b is fitted into the ring-shaped recessed groove 198a of the recessed portion 198 to couple the capacitor circuit 18C to the cap 19C. Then, in this coupled state, the second end 1825b of the terminal member 1825 and the second end 1826b of the terminal member 1826 of the second capacitor circuit 182C are connected to the first end 193a of the terminal member 193 and the first end 192a of the terminal member 192 on the bottom face of the recessed portion 198 of the cap 19C, respectively. The electronic ink cartridge 30 is assembled in such a manner as described above.

Setting of the Capacitance Value of the Capacitor Circuit 18C

As described hereinabove, on the opening 5Cb side of the first tubular member 5C in which the connection member 36 is accommodated, the ring-shaped electrode conductor 362b at the second end portion of the terminal member 362 and the second end portion 363b of the terminal member 363 of the connection member 36 are exposed for contact from the outside. Further, the ring-shaped electrode conductor 362b and the second end portion 363b are connected to the first end and the second end of the parallel resonance circuit configured from the coil 33 and a capacitor configured from the pressure sensing chip 400, respectively. Accordingly, an electric characteristic of the parallel resonance circuit configured from the coil 33 and the capacitor configured from the pressure sensing chip 400 can be extracted from the ring-shaped electrode conductor 362b of the terminal member 362 and the second end portion 363b of the terminal member 363.

In the present embodiment, the ring-shaped electrode conductor 362b of the terminal member 362 and the second end portion 363b of the terminal member 363 which can be contacted from the outside in this manner are used to set the capacitance of the first capacitor circuit 181C and the capacitance of the second capacitor circuit 182C which configure the capacitor circuit 18C in the following manner.

Figure 19:
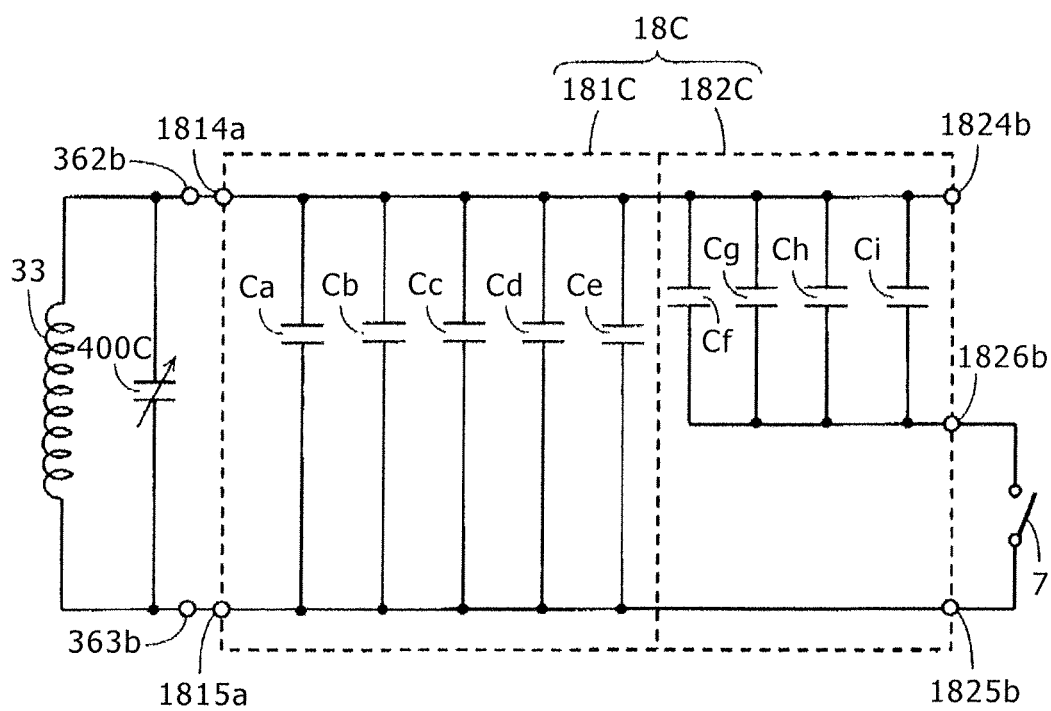
FIG. 19 is a circuit diagram depicting an example of an equivalent circuit of the electronic ink cartridge according to the third embodiment.

Setting of a capacitance value of the capacitor circuit 18C is described with reference to an equivalent circuit of FIG. 19. As described hereinabove, the parallel circuit of the coil 33 wound on the ferrite core 34 and a variable capacitor 400C, which forms the pressure sensing chip 400 accommodated in the pressure sensing semiconductor device 35, is connected between the ring-shaped electrode conductor 362b at the second end portion of the terminal member 362 and the second end portion 363b of the terminal member 363 of the connection member 36. At this time, no writing pressure is applied to the core member 31, and it is assumed that the inductance Lc of the coil 33 at this time and the capacitance CVo of the capacitor 400C configured from the pressure sensing chip 400 have values each including a dispersion arising from manufacturing process.

Therefore, the resonance frequency $f_1$ of the resonance circuit configured from the inductance Lc of the coil 33 and the capacitance CVo of the capacitor 400C configured from the pressure sensing chip 400 is measured first using the ring-shaped electrode conductor 362b at the second end portion of the terminal member 362 and the second end portion 363b of the terminal member 363. Then, a capacitor having a known capacitance value Co is connected to the ring-shaped electrode conductor 362b at the second end portion of the terminal member 362 and the second end portion 363b of the terminal member 363 to measure a resonance frequency $f_2$ similarly. It is to be noted that a resonance frequency $f_0$ to be set is known, and the capacitance value to be set to the first capacitor circuit 181C of the capacitor circuit 18C is represented by Cx.

$$f_1{}^2 = 1/\{4\cdot\pi^2\cdot Lc\cdot CVo\}$$

$$f_2{}^2 = 1/\{44\cdot\pi^2\cdot Lc\cdot(CVo+Co)\}$$

$$f_0{}^2 = 1/\{4\cdot\pi^2\cdot Lc\cdot(CVo+Cx)\}$$

From these equations, $$Cx = Co\cdot(f_2/f_0)^2\cdot(f_1{}^2 - f_0{}^2)/(f_1{}^2 - f_2{}^2)$$

is obtained.

As described above, even if the inductance Lc of the coil 33 and the capacitance of the capacitor 400C configured from the pressure sensing chip 400 are unknown or are values which include some dispersion, the value Cx of the capacitance connected further in parallel to the parallel circuit of the coil 33 and the capacitor 400C in accordance with the resonance frequency fo to be set can be calculated. In other words, the capacitance, with which the resonance frequency of the resonance circuit of the position pointer when the push switch 7 is off is made equal to the target frequency $f_0$ (capacitance of the first capacitor circuit 181C of the capacitor circuit 18C), can be calculated. Thus, a number of chip capacitors 183 with which the calculated capacitance is obtained are accommodated into the first capacitor circuit 181C of the capacitor circuit 18C to set the capacitance of the first capacitor circuit 181C.

Similarly, the capacitance for making the resonance frequency of the resonance circuit, which is configured from the coil 33, pressure sensing chip 400 and first capacitor circuit 181C, of the position pointer when the push switch 7 is on, equal to a target frequency $f_4$ (the capacitance value to be set to the second capacitor circuit 182C of the capacitor circuit 18C is represented by Cx2) is calculated in the following manner.

Where the capacitance value set for the first capacitor circuit 181C is represented by Cx1 (this value is equal to or approximate to Cx), the first capacitor circuit 181C whose capacitance value is set to Cx1 is connected to the ring-shaped electrode conductor 362b at the second end portion of the terminal member 362 and the second end portion 363b of the terminal member 363, in place of the capacitor whose capacitance value Co is known, so as to similarly measure a resonance frequency $f_3$.

$$f_1{}^2=1/\{4\cdot\pi^2\cdot Lc\cdot CVo\}$$

$$f_3{}^2=1/\{4\cdot\pi^2\cdot Lc\cdot(CVo+Cx1)\}$$

$$f_4{}^2=1/\{4\cdot\pi^2\cdot Lc\cdot(CVo+Cx1+Cx2)\}$$

From these equations, $$Cx2=Cx1\cdot(f_1/f_4)^2\cdot(f_3{}^2-f_4{}^2)/(f_1{}^2-f_3{}^2)$$

is obtained.

Then, the capacitance Cx2 of the second capacitor circuit 182C of the capacitor circuit 18C is set so as to become equal to the calculated capacitance Cx2.

By measuring the resonance frequency in the same state as an actual use state in such a manner as described above, the value of the capacitance of the first capacitor circuit 181C of the capacitor circuit 18C can be calculated. Then, a value equal to or proximate to the calculated value of the capacitance is set.

Further, since the value to which the resonance frequency value is to be changed by operating the push switch 7 (side switch) is known, also the value of the capacitance of the second capacitor circuit 182C which depends upon the value of the capacitance of the first capacitor circuit 181C of the capacitor circuit 18C can be calculated.

In the electronic ink cartridge 30 of the present third embodiment, the resonance frequency of the parallel resonance circuit configured from the coil 33 accommodated in the tubular member 5', capacitor 400C of the pressure sensing chip 400 and capacitance (Cx1, Cx2) set to the capacitor circuit 18C is in an adjusted state, regardless of whether the push switch 7 is in the off state or the "on" state. Accordingly, in the case of the present third embodiment also, when the electronic ink cartridge 30 is accommodated into the housing 2 of the position pointer, adjustment of the resonance frequency is no longer required.

Further, in the present third embodiment, the core member 31, ferrite core 34 on which the coil 33 is wound and pressure sensing semiconductor device 35 are coupled into an integrated structure and accommodated in the hollow portion of the first tubular member 5C. Further, the terminals for connection to the capacitor circuit 18C, to which the first end and the second end of the coil 33 and the first end and the second end of the variable capacitor 400C configured from the pressure sensing chip 400 are connected, are provided on the end face of the connection member 36 so as to be exposed such that they can be contacted from the outside.

Therefore, the resonance frequency of the resonance circuit configured from the coil 33 in a state in which it is accommodated in the first tubular member 5C and the capacitance of the pressure sensing chip 400 accommodated in the pressure sensing semiconductor device 35 can be measured using the connection terminals provided on the end face of the connection member 36. Consequently, the capacitance value of the capacitor circuit 18C, which is connected in parallel to the parallel resonance circuit of the coil 33 and the pressure sensing chip 400 to thereby form another parallel resonance circuit, can be calculated in such a manner as described above.

Further, in the embodiment described above, only by coupling the capacitor circuit 18C to the connection member 36 such that the first electrode and the second electrode of the capacitor circuit 18C having capacitance set to the desired value are connected to the connection terminals of the connection member 36, the electronic ink cartridge 30 can be formed in a significantly simplified configuration.

Furthermore, in the present third embodiment, the core member 31, ferrite core 34 on which the coil 33 is wound, pressure sensing semiconductor device 35 as a pressure sensor and capacitor circuit 18C are inserted in the electronic ink cartridge 30, and the electronic ink cartridge 30 is in an assemble state in which adjustment of the resonance frequency has been carried out already. Accordingly, the position pointer can be configured only by accommodating the electronic ink cartridge 30 into the housing of the position pointer. Consequently, the position pointer can be achieved, in which the electronic ink cartridge 30 can be handled like a so-called replacement core of a ballpoint pen or the like.

Further, similarly as in the embodiments described hereinabove, the component parts are disposed in order in the direction of the center axis in the tubular member 5' of the electronic ink cartridge 30 and electrically connected to each other while being mechanically coupled with each other. Therefore, advantageously, a configuration of an electronic ink cartridge having a narrow (thin) profile as having a diameter of, for example, 2.5 mm can be readily implemented.

Modifications to the Third Embodiment

Also in the third embodiment described above, by accommodating an ID package which accommodates the ID transmission circuit 300 similar to that of the second embodiment into the tubular member 5', it becomes possible to transmit information such as identification information of the electronic ink cartridge 30 to a position detection apparatus similarly as in the second embodiment. In this instance, since it is only necessary to connect the ID package, in which the ID transmission circuit 300 is accommodated, in parallel to the coil 33, the ID package may be disposed at a position between the connection member 36 and the capacitor circuit 18C or another position between the capacitor circuit 18C and the cap 19C in the tubular member 5' as can be recognized from the equivalent circuit of FIG. 19.

Further, in the third embodiment described above, while the pressure sensing chip 400 of the pressure sensing semiconductor device 35 is pressed by the core member 31, the configuration for transmitting pressure applied to the core member 31 to the pressure sensing chip 400 of the pressure sensing semiconductor device 35 is not limited to this configuration. For example, though not depicted, the following configuration may be adopted. In particular, the core member is provided in a coupled state to the ferrite core as in the second embodiment, and the pressure sensing semiconductor device is disposed on the opposite side from the coupling side of the ferrite core to the core member. Further, the pressing member of the pressure sensing chip is provided on the opposite side from the coupling side of the ferrite core to the core member such that the pressure sensing chip of the pressure sensing semiconductor device is pressed by the pressing member.

Further, while, in the third embodiment described above, the pressure sensing semiconductor device 35 and the ferrite core 34 on which the coil 33 is wound are coupled integrally, the pressure sensing semiconductor device 35 and the ferrite core 34 on which the coil 33 is wound may be connected to each other through a different connection member.

Figure 20:
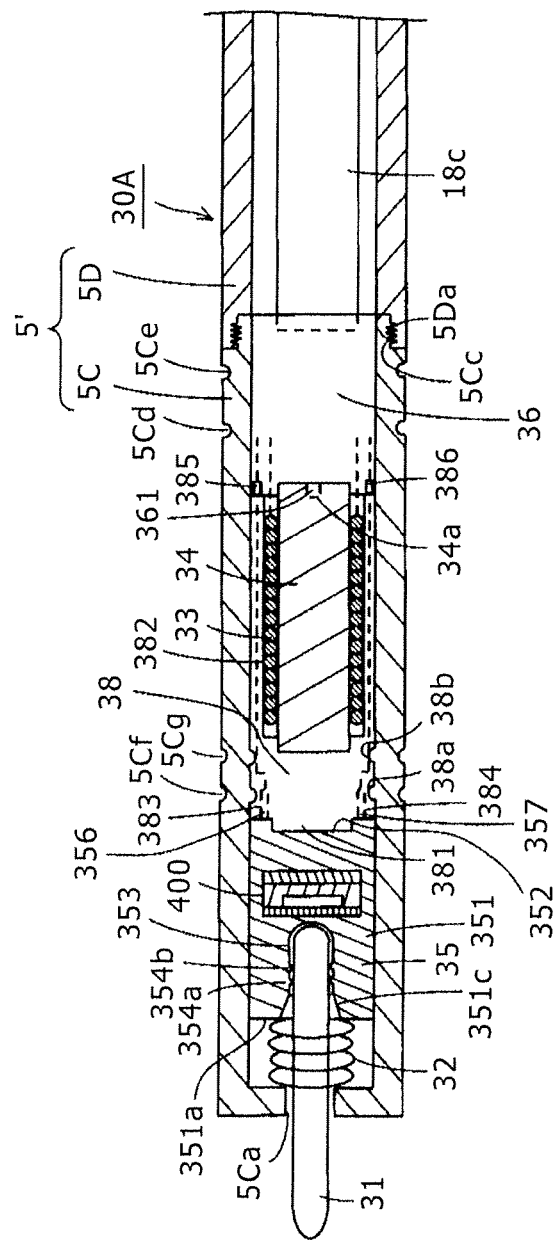
FIG. 20 is a view depicting a modification to the electronic ink cartridge of the third embodiment.

FIG. 20 is a view depicting an example of a configuration of part of an electronic ink cartridge 30A in the case just described.

In particular, in the example of FIG. 20, a different connection member 38 is provided between the pressure sensing semiconductor device 35 and the ferrite core 34, on which the coil 33 is wound, in addition to the connection member 36. The connection member 38 includes a protrusion 381 accommodated in the recessed portion 352 of the pressure sensing semiconductor device 35 and includes a tubular portion 382 defining a hollow portion, in which the ferrite core 34 on which the coil 33 is wound is accommodated. The tubular portion 382 has a length such that an end face at its opening side abuts against the connection member 36 connected to the capacitor circuit 18C.

Further, the connection member 38 includes fitting portions 383 and 384 provided on an end face of the tubular portion 382 opposing the pressure sensing semiconductor device 35, such that the fitting portions 383 and 384 are fitted with the first and second lead terminals 356 and 357 of the pressure sensing semiconductor device 35.

On an end face of the tubular portion 382 formed on the connection member 38 which abuts against the connection member 36, connection terminals 385 and 386 are provided, which are electrically connected, for example by gold wires, to the fitting portions 383 and 384 fitted with the first and second lead terminals 356 and 357 of the pressure sensing semiconductor device 35, respectively. For example, gold wires are connected to the connection terminals 385 and 386 such that they are electrically connected to the V-shaped notches 362c and 363c of the terminal members 362 and 363 of the connection member 36.

Further, the connection member 38 includes ring-shaped recessed grooves 38a and 38b, which are fitted with ring-shaped protrusions 5Cf and 5Cg formed on the first tubular member 5C to fix the connection member 38 to the first tubular member 5C so that the connection member 38 does not move in the direction of the center axis. Accordingly, in the example of FIG. 20, the pressure sensing chip 400 of the pressure sensing semiconductor device 35 can detect the pressure applied to the core member 31 because, since the connection member 38 is fixed to the first tubular member 5C, the pressure sensing semiconductor device 35 does not move against the pressure applied to the core member 31 in the direction of the center axis. Besides, the ferrite core 34, on which the coil 33 that forms a resonance circuit together with the pressure sensing semiconductor device 35 is wound, is accommodated in the tubular portion 382 formed on the connection member 38 and is electrically connected in parallel to the pressure sensing semiconductor device 35 and is further connected to the terminal members 362 and 363 provided on the connection member 36.

It is to be noted that, while, in the third embodiment described above, the pressure sensing semiconductor device is used as a pressure sensor whose capacitance varies in response to pressure (writing pressure) applied to the core member, the pressure sensor is not limited to this type. For example, it is also possible to use, as the pressure sensor, a variable capacitor whose capacitance changes in response to pressure (writing pressure) applied to a core member, as disclosed in Japanese Patent Application No. 2012-151357 co-assigned to the applicant of the present invention.

In the variable capacitor disclosed in Japanese Patent Application No. 2012-151357, a film electrode of a predetermined shape is formed by disposition on an inner wall face of a hollow portion of an outer side member formed from a cylinder having the hollow space. Meanwhile, also on an outer peripheral face of an inner side member of a post shape, a film electrode of a predetermined shape is formed. The inner side member is accommodated in the hollow space of the outer side member such that it is movable in a direction of the center axis. In this instance, the electrode on the inner wall face of the outer side member and the electrode on the outer peripheral face of the inner side member are opposed to each other with a dielectric interposed therebetween so that a capacitor is formed, which exhibits capacitance corresponding to the area over which the electrodes are opposed to each other.

According to this configuration, when pressure is applied in the direction of the center axis to the inner side member from the outside, the inner side member moves relative to the outer side member in the direction of the center axis. Thereupon, the area over which the electrode on the inner wall face of the outer side member and the electrode on the outer peripheral face of the inner side member oppose each other with the dielectric interposed therebetween varies. Accordingly, the capacitance of the capacitor formed between the electrode on the outer side member and the electrode on the inner side member exhibits a capacitance conforming to the applied pressure in response to the variation of the opposing area of the electrodes.

A variable capacitor having such a configuration as described above can be formed in the form of a narrow rod, and an electronic ink cartridge in which the variable capacitor is used as a pressure sensor in place of the pressure sensing semiconductor device 35 described above can be configured.

Fourth Embodiment

In the embodiments described above, a pressure sensor for detecting writing pressure is configured such that it is implemented using an inductance circuit or a capacitor circuit, which configures a resonance circuit provided in a position pointer. On a position detection apparatus side, a frequency displacement (phase displacement) of an electromagnetic induction signal from the position pointer is detected to detect the writing pressure applied to the position pointer.

However, by using an IC circuit of the information transmission circuit in the embodiments described above, it is also possible to transmit information of writing pressure as a digital signal from a position pointer to a position detection apparatus, like identification information (ID) of an electronic ink cartridge or a position pointer in the examples described above. A position pointer of the present fourth embodiment is an example which uses such a configuration.

Figure 21:
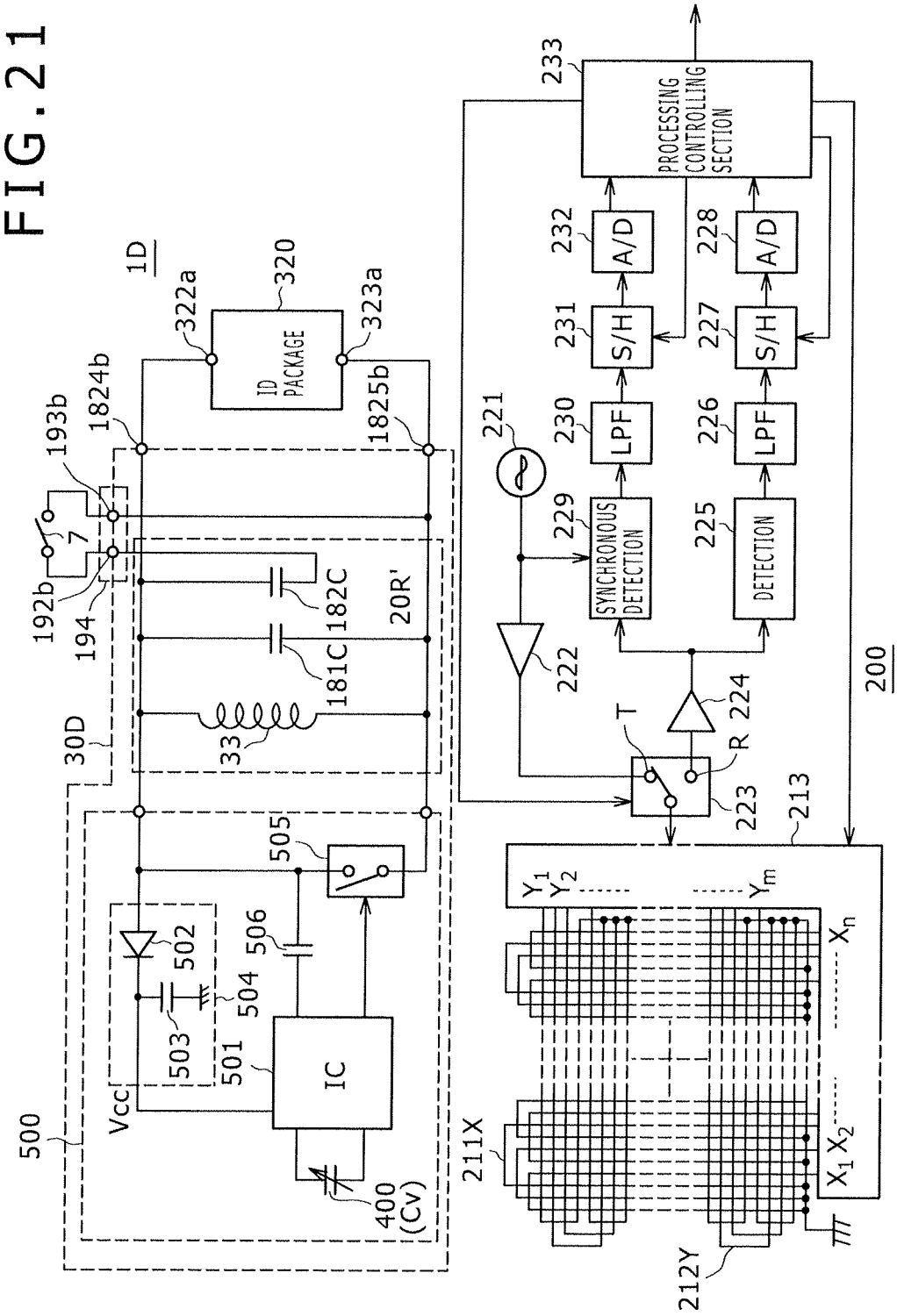
FIG. 21 is a view depicting an electronic ink cartridge according to a fourth embodiment.

A circuit depicted on the upper side in FIG. 21 is an equivalent circuit of the position pointer 1D of the present fourth embodiment. A position detection apparatus which carries out position detection and writing pressure detection through electromagnetic coupling to the position pointer 1D is the position detection apparatus 200 depicted in FIG. 7 in the case of the first embodiment described hereinabove.

A mechanical arrangement configuration of principal components of an electronic ink cartridge 30D, which configures the position pointer 1D of the present fourth embodiment, is similar to that of the electronic ink cartridge 30 in the third embodiment described hereinabove with reference to FIGS. 15A and 15B or the electronic ink cartridge 30A of the modification to the third embodiment depicted in FIG. 20. However, the electronic ink cartridge 30D in the present fourth embodiment is different from the electronic ink cartridges 30 and 30A of the third embodiment and the modification to the third embodiment in the following points. In particular, the first difference is that the ID package 320 in the example of FIGS. 9A and 9B described as a modification to the first embodiment is provided between the capacitor circuit 18C and the cap 19C. Further, the second difference is that a control circuit 500, which controls so as to send writing pressure information detected by the pressure sensing chip 400 to the position detection apparatus 200 through electromagnetic coupling, is accommodated in the package member 351 of the pressure sensing semiconductor device 35 together with the pressure sensing chip 400.

In the electronic ink cartridge 30D of the present fourth embodiment, a parallel resonance circuit 20R' is configured from the coil 33 in the tubular member 5' of the electronic ink cartridge 30D and the first capacitor circuit 181C and the second capacitor circuit 182C of the capacitor circuit 18C as depicted in FIG. 21. A first end and a second end of the parallel resonance circuit 20R' are connected to a first end and a second end of the ID package 320, respectively.

In the electronic ink cartridge 30D of the present fourth embodiment, the control circuit 500 is provided between the first end and the second end of the coil 33 as depicted in FIG. 21. The control circuit 500 includes a controlling IC 501. To the IC 501, a capacitor (capacitance Cv) configured from the pressure sensing chip 400 is connected. Consequently, the IC 501 can detect the capacitance Cv corresponding to the writing pressure. The IC 501 detects writing pressure applied to the position pointer 1D from the value of the capacitance Cv.

The IC 501 is configured such that it operates by a power supply voltage Vcc obtained by rectification of an AC signal received through electromagnetic coupling from the position detection apparatus 200 by the parallel resonance circuit 20R' by a driving signal generation circuit 504. The driving signal generation circuit 504 includes a rectification circuit configured from a diode 502 and a capacitor 503. Further, in the control circuit 500, a switch circuit 505 is connected in parallel to the parallel resonance circuit 20R'. The switch circuit 505 is configured so as to be controlled between on and off by the IC 501. It is to be noted that, to the IC 501, an electromagnetic induction signal transmitted from the position detection apparatus 200 is supplied as a synchronizing signal for transfer of an electromagnetic induction signal to and from the position detection apparatus 200 through a capacitor 506.

Further, the IC 501 of the control circuit 500 in the present fourth embodiment detects a value of the capacitance Cv of the variable capacitor configured from the pressure sensing chip 400 as information of writing pressure to the position pointer 1D. The IC 501 converts the detected writing pressure into a digital signal of, for example, 8 bits and controls the switch circuit 505 using the digital signal corresponding to the writing pressure.

Position detection operation and writing pressure detection operation of the position pointer 1D and the position detection apparatus 200 configured in such a manner as described above are described.

The processing controlling section 233 first carries out driving of the drive circuit 222, selection of the selection circuit 213 and changeover control of the switch circuit 223 in a similar manner as in the embodiments described hereinabove to carry out transfer of an electromagnetic induction signal to and from the position pointer 1D to determine an X coordinate value and a Y coordinate value of a position pointed to by the position pointer 1D.

After the pointed position of the position pointer 1D is detected in such a manner as described above, in order to detect writing pressure information of 8 bits from the position pointer 1D, the processing controlling section 233 carries out transmission of a signal for synchronization of the loop coil in the proximity of the location of the position pointer 1D for a predetermined period of time. Then, the processing controlling section 233 carries out transmission and reception successively by eight times at timings similar to those used for coordinate detection. In particular, the processing controlling section 233 controls the selection circuit 213 to select a loop coil nearest to the position pointer 1D (which may be either one of an X axis direction loop coil and a Y axis direction loop coil) in accordance with the detected coordinate values of the position pointer 1D and then transmits and receives a signal to and from the selected loop coil.

Meanwhile, the IC 501 of the control circuit 500 of the position pointer 1D converts writing pressure obtained corresponding to the capacitance Cv of the pressure sensing chip 400 into a digital signal of 8 bits. Further, the IC 501 controls the switch circuit 505 on and off in synchronism with transmission and reception of a signal from the position detection apparatus 200 based on the digital signal of 8 bits. When the switch circuit 505 is off, the parallel resonance circuit 20R' can transmit a signal transmitted thereto from the position detection apparatus 200 back to the position detection apparatus 200. Therefore, the loop coil of the position detection apparatus 200 receives this signal. On the other hand, when the switch circuit 505 is on, the parallel resonance circuit 20R' is in a state in which operation thereof is inhibited. Therefore, the parallel resonance circuit 20R' does not transmit a signal back to the position detection apparatus 200. Consequently, the loop coil of the position detection apparatus 200 does not receive a signal.

The processing controlling section 233 of the position detection apparatus 200 carries out detection of presence or absence of a reception signal by eight times to receive the digital signal of 8 bits corresponding to the writing pressure, and consequently can detect writing pressure information from the position pointer 1D.

Other Embodiments and Modifications

In the first to third embodiments described hereinabove, the capacitor circuits 18 and 18C are configured such that chip capacitors are stacked and configured such that capacitance is set by the number of capacitors to be stacked. However, the configuration of the capacitor circuit is not limited to this type. For example, a capacitor as disclosed in Japanese Patent Application No. 2012-128834, co-assigned to the applicant of the present application and configured such that a dielectric sheet on which electrodes of a predetermined pattern shape are formed is wrapped into a rod can be used. In the capacitor disclosed in Japanese Patent Application No. 2012-128834, a capacitor of a shape of a rod is configured such that some of electrode patterns can be cut (severed) or coupled (connected) later to allow later setting of the capacitance.

Further, in the embodiments described hereinabove, two connection terminals for establishing electric connection between the first end and the second end of the coil 16, 24 or 33 and the first end and the second end of the capacitor circuit 18, 28 or 18C to each other, respectively, are provided on an end face of the connection member 17, 27 or 36, which is disposed between the coil 16, 24 or 33 and the capacitor circuit 18, 28 or 18C, on the capacitor circuit 18, 28 or 18C side. However, where the tubular member 5, 50 or 5' is made of a material of a nonmagnetic substance having conductivity such as SUS310 in the example described hereinabove, at least one of the two connection terminals described above needs to be disposed on an end face of the connection member 17, 27 or 36 while the conductive tubular member 5, 50 or 5' is used as the other connection terminal.

For example, in the first embodiment described hereinabove, only the second end portion 173*c* of the terminal member 173 is provided on the end face of the connection member 17 opposing the capacitor circuit 18 such that the insertion hole 173*d* is exposed. Further, the ring-shaped electrode conductor 172*c* of the terminal member 172 is exposed not to the end face described above but to a peripheral portion of the main body portion 171 of the connection member 17 so as to be electrically coupled to the first tubular member 5A.

On the other hand, in the first capacitor circuit 181 of the capacitor circuit 18, the first end 1815*a* of the rod-like member of the terminal member 1815 is formed similarly as in the embodiments described hereinabove. However, the first end 1814*a* of the terminal member 1814 is exposed to a peripheral portion of the holder 1810 so as to be electrically coupled to the second tubular member 5B.

Where such a configuration as described above is applied, the capacitor circuit 18 and the connection member are connected to each other and the first tubular member 5A and the second tubular member 5B are screwed with and connected to each other to establish electric connection therebetween. In this instance, the tubular member 5 may be used, for example, as a ground electrode.

Also in the second embodiment, for example, the second end portion of the terminal member 273 is formed as the circular conductor 273*c* as in the embodiments described hereinabove on the end face of the connection member 27 on the capacitor circuit 28 side. Meanwhile, the second end portion 272*c* of the terminal member 272 is exposed not to the end face but on a peripheral portion of the main body portion 271 so as to be electrically coupled to the tubular member 50 similarly.

Further, the first end 1815*a*' of the terminal member 1815 of the first capacitor circuit 281 of the capacitor circuit 28 is formed as an electrode of a circular shape which abuts against the circular conductor 273*c* on the end face of the connection member 27 as in the example described hereinabove. However, the first end 1814*a* of the terminal member 1814 is exposed to a peripheral portion of the holder 1810 so as to be electrically coupled to the tubular member 50.

In the case of the present second embodiment, the capacitor circuit 28 is inserted into the tubular member 50 to electrically connect the first end 1814*a* of the terminal member 1814 exposed to the peripheral portion of the holder 1810 to the tubular member 50.

Further, in the third embodiment, the connection member 36 and the capacitor circuit 18C are configured such that they are modified similarly to the connection member 17 and the capacitor circuit 18 in the first embodiment, respectively. By this configuration, the tubular member 5' can be used as one of the connection electrodes.

Further, as described hereinabove, in the electronic ink cartridge of the present invention, a ferrite core on which a coil is wound and a pressure sensor are disposed between an end portion of a tubular member on the side on which a core member is positioned and a connection member. Further, as described hereinabove in connection with the first embodiment or the second embodiment, as an order in which the ferrite core on which the coil is wound and the pressure sensor are arrayed in the direction of the center axis of the tubular member, whichever one of the ferrite core and the pressure sensor may be positioned on the connection member side. Further, the three members including the connection member, ferrite core on which the coil is wound, and pressure sensor may be formed as independent members of each other and connected to each other or may be combined into a unitary member or else two of the three members may be combined into a unitary member.

In particular, the electronic ink cartridge can be configured in any of eight combinations of:

(1) the sequential connection of the ferrite core on which the coil is wound, pressure sensor, and connection member formed as independent members of each other;

(2) the sequential connection of the pressure sensor, ferrite core on which the coil is wound, and connection member formed as independent members of each other;

(3) the sequential connection of the ferrite core on which the coil is wound, pressure sensor, and connection member formed in an integrated structure;

(4) the sequential connection of the pressure sensor, ferrite core on which the coil is wound, and connection member formed in an integrated structure;

(5) connecting the connection member, as an independent member, to the sequential connection of the ferrite core on which the coil is wound and the pressure sensor formed in an integrated structure;

(6) connecting the connection member, as an independent member, to the sequential connection of the pressure sensor and the ferrite core, on which the coil is wound, formed in an integrated structure;

(7) connecting the connection member provided integrally on the pressure sensor as a unitary member, to the ferrite core on which the coil is wound and which is disposed toward the core member side; and (8) connecting the connection member provided integrally on the ferrite core, on which the coil is wound, as a unitary member, to the pressure sensor which is disposed toward the core member side.

It is to be noted that, as described hereinabove, the electronic ink cartridge of the present invention can be handled similarly to an ink cartridge (refill lead) accommodated in a housing, like a ballpoint pen of any writing equipment. As a ballpoint pen, a ballpoint pen of the knock type or the rotary type is known wherein the ink cartridge can be in a state in which the pen tip is accommodated (received) in the housing and another state in which the pen tip projects outwardly of the housing. Also, another type of ballpoint pen is known which permits switching between a plurality of ink cartridges, for example, for different colors, wherein the pen tip thereof is projected from the housing.

Thus, the position pointer of the present invention also can be configured in a structure of the knock type or the rotary type for switching an electronic ink cartridge between a state in which the core member is accommodated in the housing and another state in which the core member projects outwardly of the housing. Further, it is also possible for the position pointer of the present invention to adopt a configuration wherein switching between a plurality of electronic ink cartridges, which are different in thickness of their core member, can be carried out or wherein switching between an ink cartridge of a ballpoint pen and an electronic ink cartridge can be carried out.

The various embodiments described above can be combined to provide further embodiments. All of the patents, patent application publications, and patent applications referred to in this specification are incorporated herein by reference, in their entirety. Aspects of the embodiments can be modified, if necessary to employ concepts of the various patents, publications and applications to provide yet further embodiments.

DESCRIPTION OF REFERENCE SYMBOLS

1 . . . Position pointer, 2 . . . Housing, 5, 5', 50 . . . Tubular member, 7 . . . Push switch (side switch), 10, 20, 30 . . . Electronic ink cartridge, 11, 21, 31 . . . Core member, 13, 26 . . . Ferrite chip, 14, 25 . . . O-snap ring, 15, 23, 34 . . . Ferrite core, 16, 24, 33 . . . Coil, 17, 27, 36, 38 . . . Connection member, 18, 18C . . . Capacitor circuit, 19, 19C . . . Cap, 35 . . . Pressure sensing semiconductor device.

The invention claimed is:

1. A position pointer that transmits a first signal that enables a position detection apparatus to detect a position pointed to by a core member of the position pointer on an input surface of the position detection apparatus, the position pointer comprising:
a first tubular housing having a first coupling portion;
a second tubular housing having a second coupling portion that is couplable with the first coupling portion of the first tubular housing;
wherein the core member, in operation, extends outwardly from an axial end of the first tubular housing along the axial direction to point to the input surface of the position detection apparatus;
a first circuitry housed in the first tubular housing, wherein the first circuitry, in operation, generates the first signal that enables the position detection apparatus to detect the position of the position pointer on the input surface of the position detection apparatus, the first circuitry includes a resonance circuit, and an electric characteristic of the resonance circuit varies according to pressure applied to the core member;
a second circuitry housed in the second tubular housing, wherein the second circuitry includes an integrated circuit (IC) storing identification (ID) information that identifies the position pointer; and
a connection member that is electrically connected to the first circuitry housed in the first tubular housing for electrical connection with the second circuitry housed in the second tubular housing;
wherein the second circuitry housed in the second tubular housing is driven by a power supply circuit which, in operation, generates Direct Current (DC) power using Alternating Current (AC) power supplied by the resonance circuit of the first circuitry housed in the first tubular housing,
wherein the DC power to drive the IC housed in the second tubular housing is suppliable from the power supply circuit via the connection member when the second tubular housing and the first tubular housing are coupled with each other,
wherein the second circuitry, in operation, generates a second signal by controlling the resonance circuit, the second signal is different from the first signal that enables the position detection apparatus to detect the position of the position pointer on the input surface of the position detection, and the second signal enables the position detection apparatus to identify the position pointer, and
wherein the second circuitry is controlled by a signal transmitted from the position detection apparatus and received via the resonance circuit.

2. The position pointer of claim 1, wherein, the ID information of the position pointer is transmittable to the position detection apparatus when the first circuitry and the second circuitry are electrically coupled with each other.

3. The position pointer according to claim 1, wherein the second tubular housing and the first tubular housing are mated with each other in threaded manner.

4. The position pointer of claim 1, wherein, when the second tubular housing and the first tubular housing are coupled with each other, the connection member is partially disposed within the first tubular housing and is partially disposed within the second tubular housing.

5. The position pointer of claim 1, wherein a coupling portion for removably coupling the connection member and the second circuitry is disposed in a recessed portion of the connection member.

6. The position pointer of claim 5, wherein the coupling portion for removably coupling the connection member and the second circuitry is a recessed groove.

7. The position pointer of claim 6, wherein the recessed groove is a ring-shaped recessed groove.

8. The position pointer of claim 1, wherein the resonance circuit includes a coil and a capacitor, and inductance of the coil varies according to the pressure applied to the core member.

9. The position pointer of claim 1, wherein the resonance circuit includes a coil and a capacitor, and capacitance of the capacitor varies according to the pressure applied to the core member.

10. The position pointer of claim 1, further comprising:
a switch coupled to the resonance circuit, wherein the second circuitry controls the switch to open and close according to the ID information stored by the IC.

11. A position pointer that transmits a first signal that enables a position detection apparatus to detect a position pointed to by a core member of the position pointer on an input surface of the position detection apparatus, the position pointer comprising:
a first tubular housing having a first coupling portion;
a second tubular housing having a second coupling portion that is couplable with the first coupling portion of the first tubular housing;
wherein the core member, in operation, extends outwardly from an axial end of the first tubular housing along the axial direction to point to the input surface of the position detection apparatus;
a first circuitry housed in the first tubular housing, wherein the first circuitry, in operation, generates the first signal that enables the position detection apparatus to detect the position of the position pointer on the input surface of the position detection apparatus, and the first circuitry includes a resonance circuit;
a second circuitry housed in the second tubular housing, wherein the second circuitry includes an integrated circuit (IC) storing identification (ID) information that identifies the position pointer; and
a connection member that is electrically connected to the first circuitry housed in the first tubular housing for electrical connection with the second circuitry housed in the second tubular housing;
wherein the second circuitry housed in the second tubular housing is driven by a power supply circuit which, in operation, generates Direct Current (DC) power using Alternating Current (AC) power supplied by the resonance circuit,
wherein, the DC power to drive the IC housed in the second tubular housing is suppliable from the power supply circuit via the connection member when the second tubular housing and the first tubular housing are coupled with each other, wherein the second circuitry, in operation, generates a second signal which is different from the first signal that enables the position detection apparatus to detect the position of the position pointer on the input surface of the position detection, and the second signal enables the position detection apparatus to identify the position pointer, and wherein the second circuitry is controlled by a signal transmitted from the position detection apparatus and received via the resonance circuit.

\* \* \* \* \*